United States Patent [19]

Chen et al.

[11] Patent Number: 5,104,674
[45] Date of Patent: Apr. 14, 1992

[54] MICROFRAGMENTED IONIC POLYSACCHARIDE/PROTEIN COMPLEX DISPERSIONS

[75] Inventors: Wehn-Sherng Chen, Glenview; George A. Henry, Wilmette; Susan M. Gaud, Evanston; Mark S. Miller, Arlington Heights; John M. Kaiser, Glenview; Estela A. Balmaceda, Winnetka; Ronnie G. Morgan, Northbrook; Cynthia C. Baer, Arlington Heights; Rajendra P. Borwankar, Elmhurst; Lorraine C. Hellgeth, Chicago; John J. Strandholm, Morton Grove; Gerard L. Hasenhuettl, Highland Park; Phillip J. Kerwin, Wilmette; Chyi-Cheng Chen, Morton Grove; John F. Kratochvil, Oak Brook, all of Ill.; Wennie L. Lloyd, Marengo, Ohio; Gerard Eckhardt, Bay Shore, N.Y.; Adam P. De Vito, Chicago; Alice A. Heth, Evanston, both of Ill.

[73] Assignee: Kraft General Foods, Inc., Glenview, Ill.

[21] Appl. No.: 548,950

[22] PCT Filed: Apr. 28, 1989

[86] PCT No.: PCT/US89/01813
§ 371 Date: Jul. 20, 1990
§ 102(e) Date: Jul. 27, 1990

[87] PCT Pub. No.: WO89/10068
PCT Pub. Date: Nov. 2, 1989

Related U.S. Application Data

[63] Continuation-in-part of Ser. No. 292,568, Dec. 30, 1988, abandoned, which is a continuation-in-part of Ser. No. 188,283, Apr. 29, 1988, abandoned, and a continuation-in-part of Ser. No. 177,184, Apr. 4, 1988, Pat. No. 4,885,179, which is a continuation-in-part of Ser. No. 24,507, Mar. 1, 1987, Pat. No. 4,762,726, which is a continuation-in-part of Ser. No. 567,096, Dec. 30, 1983, Pat. No. 4,563,360, and a continuation-in-part of Ser. No. 567,277, Dec. 30, 1983, Pat. No. 4,559,233, and a continuation-in-part of Ser. No. 81,115, Aug. 3, 1987, abandoned, which is a continuation-in-part of Ser. No. 307,069, Feb. 6, 1989, abandoned, which is a continuation-in-part of Ser. No. 658,618, Oct. 9, 1984, Pat. No. 4,684,533.

[51] Int. Cl.$^5$ .................................................. A23L 1/05
[52] U.S. Cl. ..................................... 426/573; 426/575; 426/576; 426/577; 426/565; 426/602; 426/611; 426/613; 426/653; 426/656; 426/657; 426/589; 426/496; 426/610; 426/658
[58] Field of Search ............... 426/573, 574, 575, 496, 426/576, 577, 610, 611, 646, 602, 613, 653, 658, 656, 657, 589, 565

[56] References Cited

U.S. PATENT DOCUMENTS

| | | | |
|---|---|---|---|
| 3,353,966 | 11/1967 | Hagenberg et al. | 426/610 |
| 3,600,186 | 8/1971 | Mattson et al. | 426/611 |
| 4,559,233 | 12/1985 | Chen et al. | 426/104 |
| 4,563,360 | 1/1986 | Soucie et al. | 426/656 |
| 4,762,726 | 8/1988 | Soucie et al. | 426/602 |

*Primary Examiner*—Jeanette Hunter
*Attorney, Agent, or Firm*—Fitch, Even, Tabin & Flannery

[57] ABSTRACT

Microfragmented ionic polysaccharide/protein complex dispersions which are suitable for use as fat substitute compositions in food products such as ice cream, salad dressings, dips, spreads and sauces and methods for preparing such dispersions and food products.

55 Claims, 39 Drawing Sheets

0 PASS 13,000X

—— 1 μm

9 PASS 13,000 X

——— 1 μm

I PASS 11,000 X

— 1μm

5 PASS 22,500 X

—— 1μm

9 PASS 11,000 X

— 1 μm

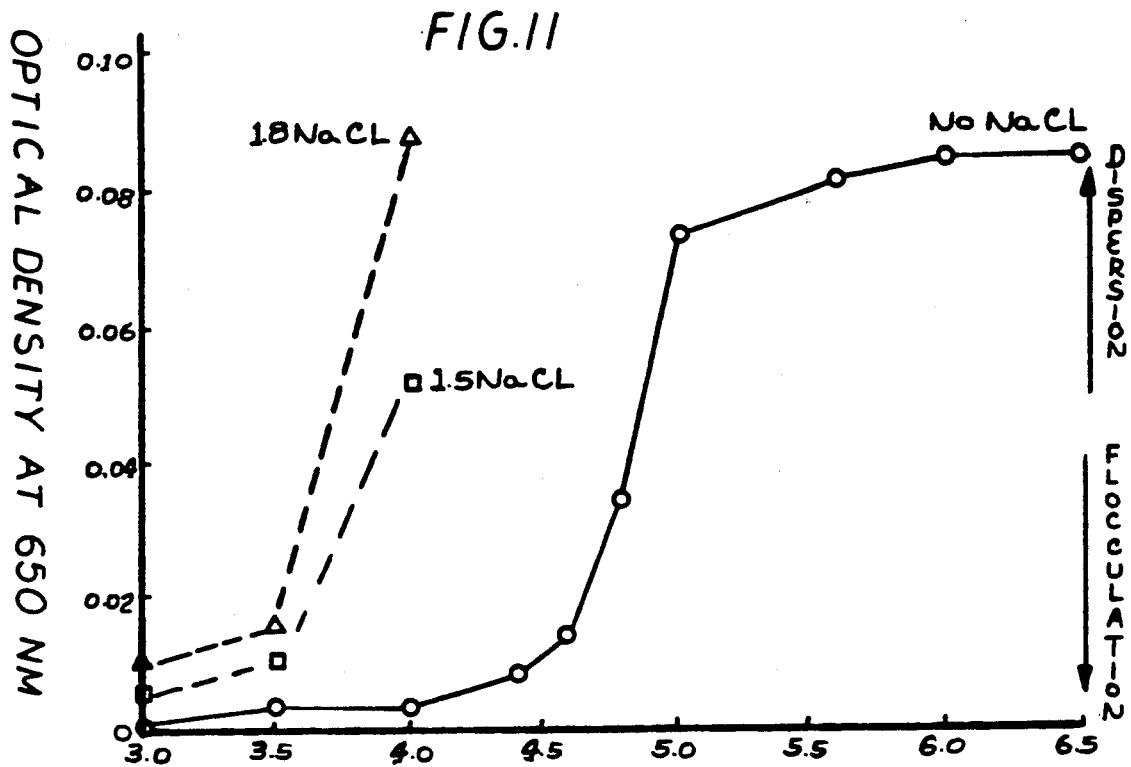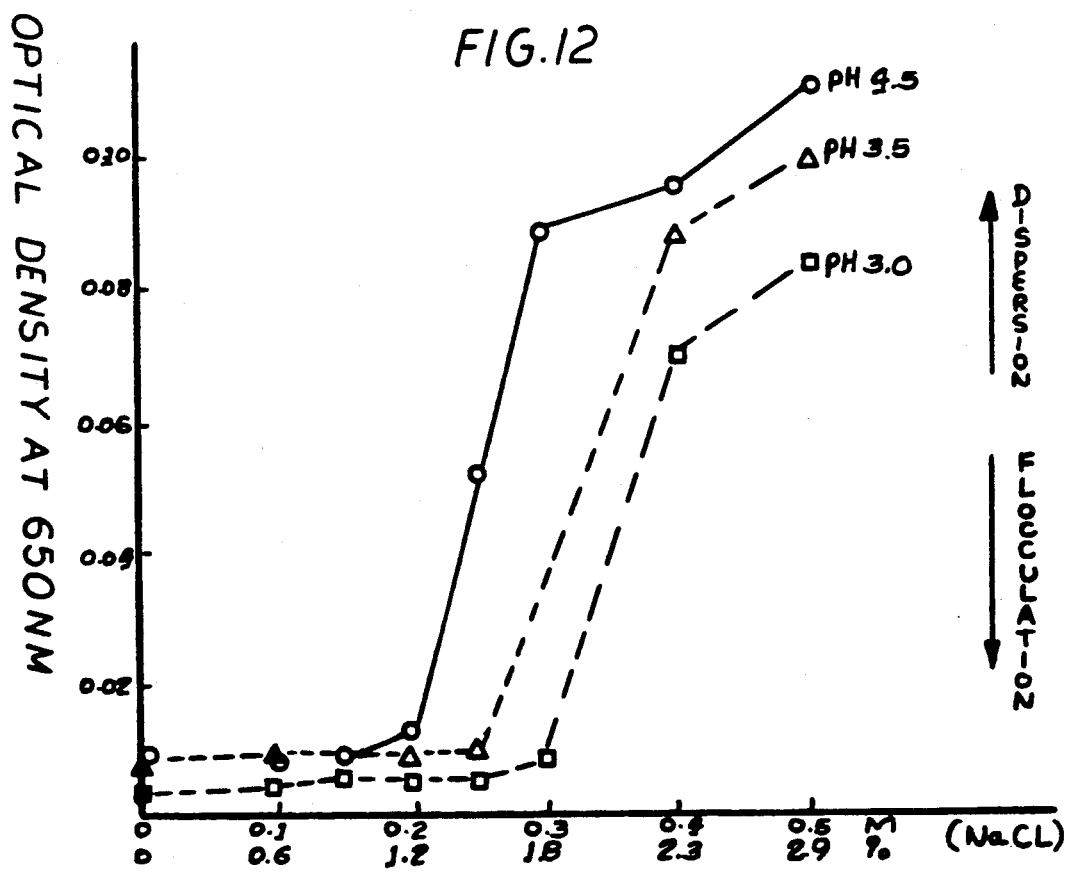

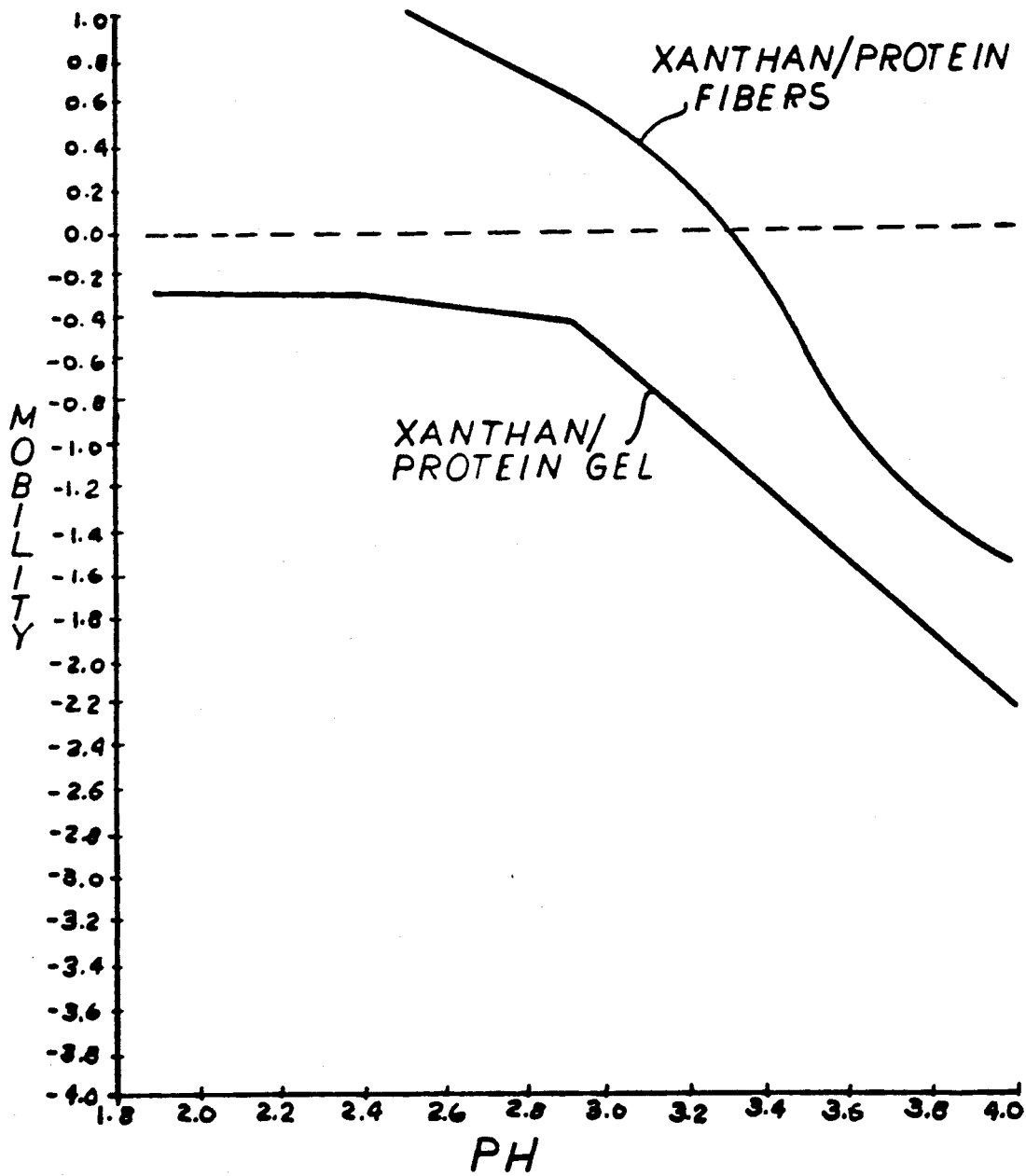

FIG.23 ELECTROPHORETIC MOBILITY/pH RELATIONSHIPS OF MICROFRAGMENTED XANTHAN- AND CMC-EGG WHITE WHEY PROTEIN COMPLEXES, RESPECTIVELY. THE MOBILITY UNIT IS 10E-8 METER/SEC/VOLT/METER.

CMC PROTEIN COMPLEX         8,000X

—1 μm

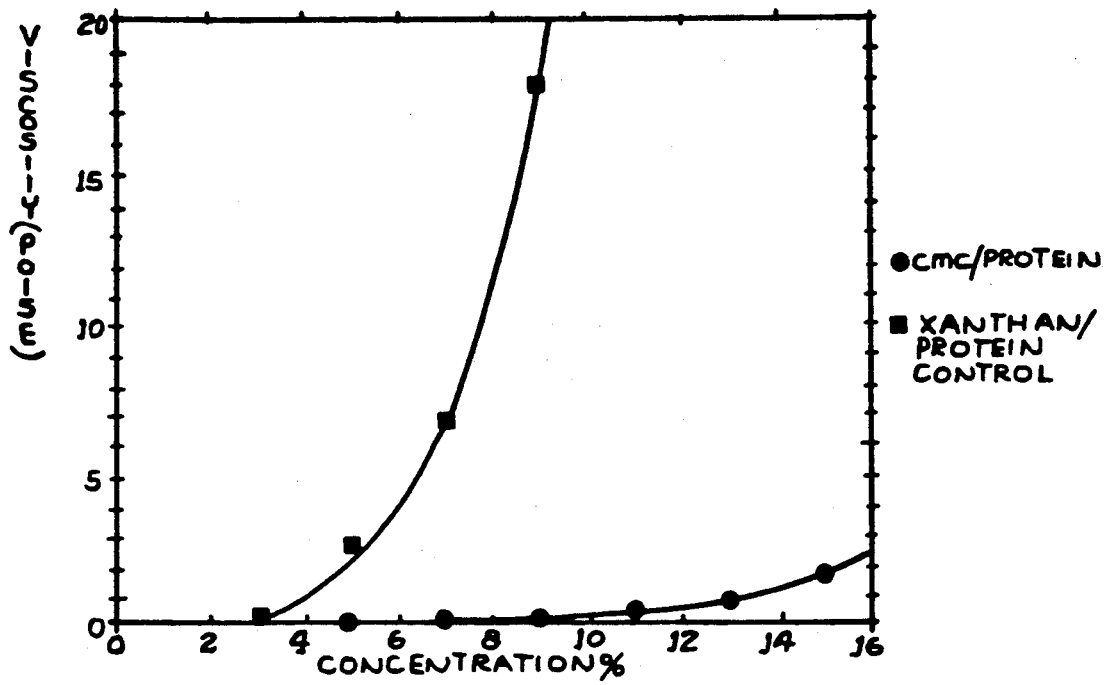
FIG. 27 — VISCOSITY VS. CONCENTRATION CMC/PROTEIN COMPLEX
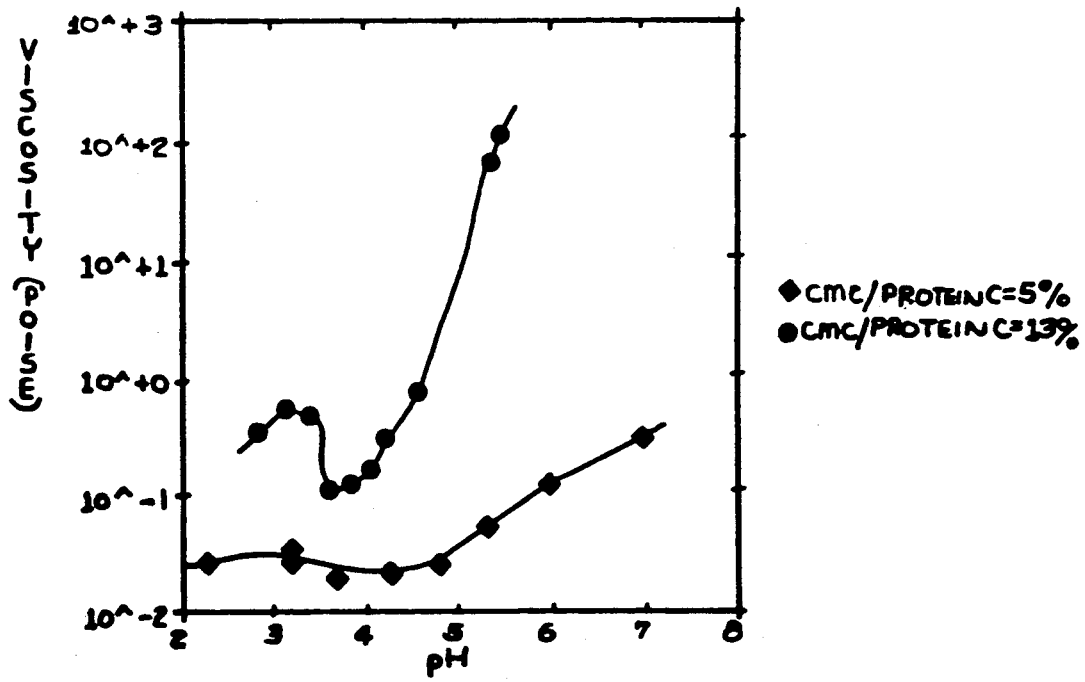
FIG. 28 — VISCOSITY VS. pH CMC/PROTEIN COMPLEX

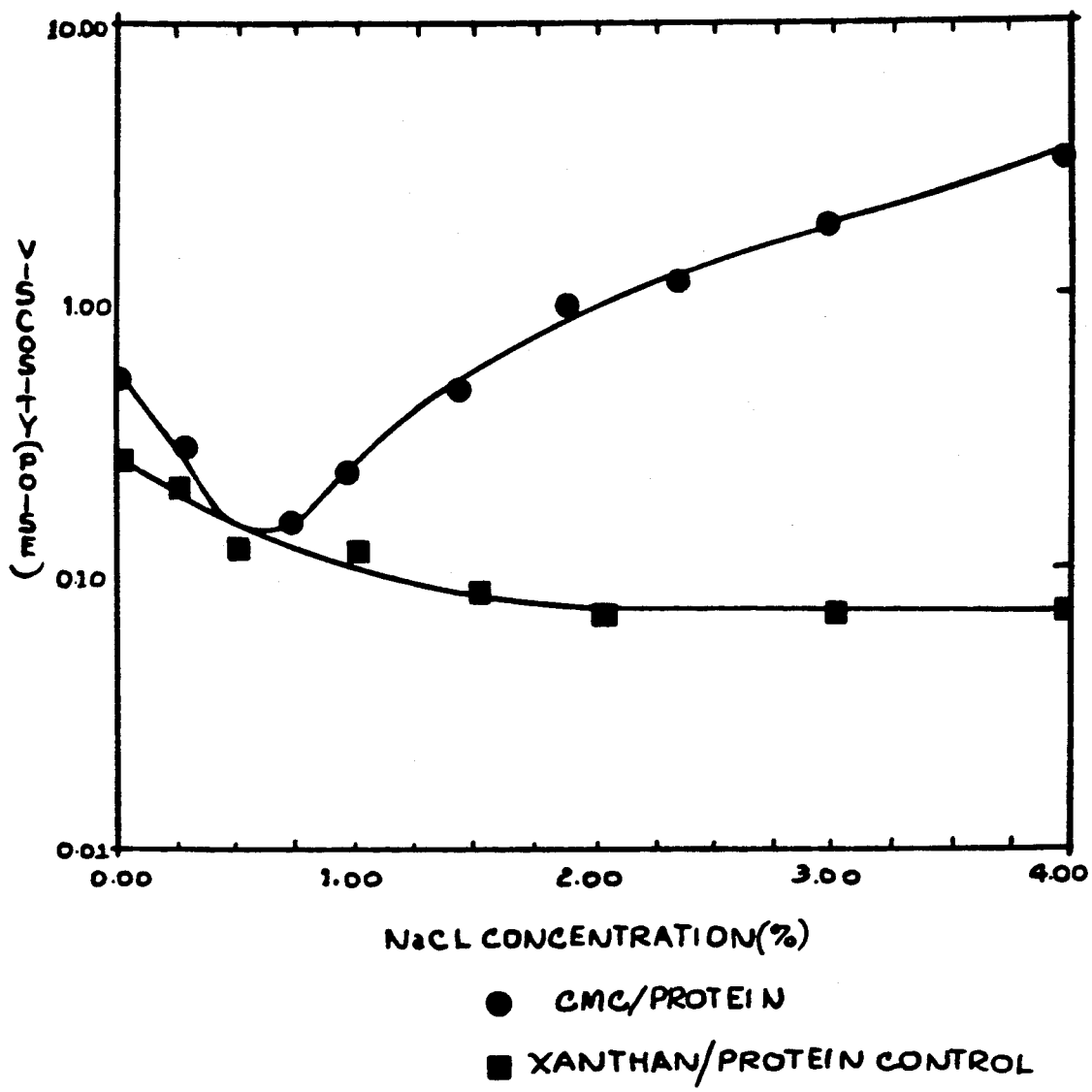

FIG.30 TURBIDITY OF CHITOSAN-PROTEIN-COMPLEX SUPERNATE
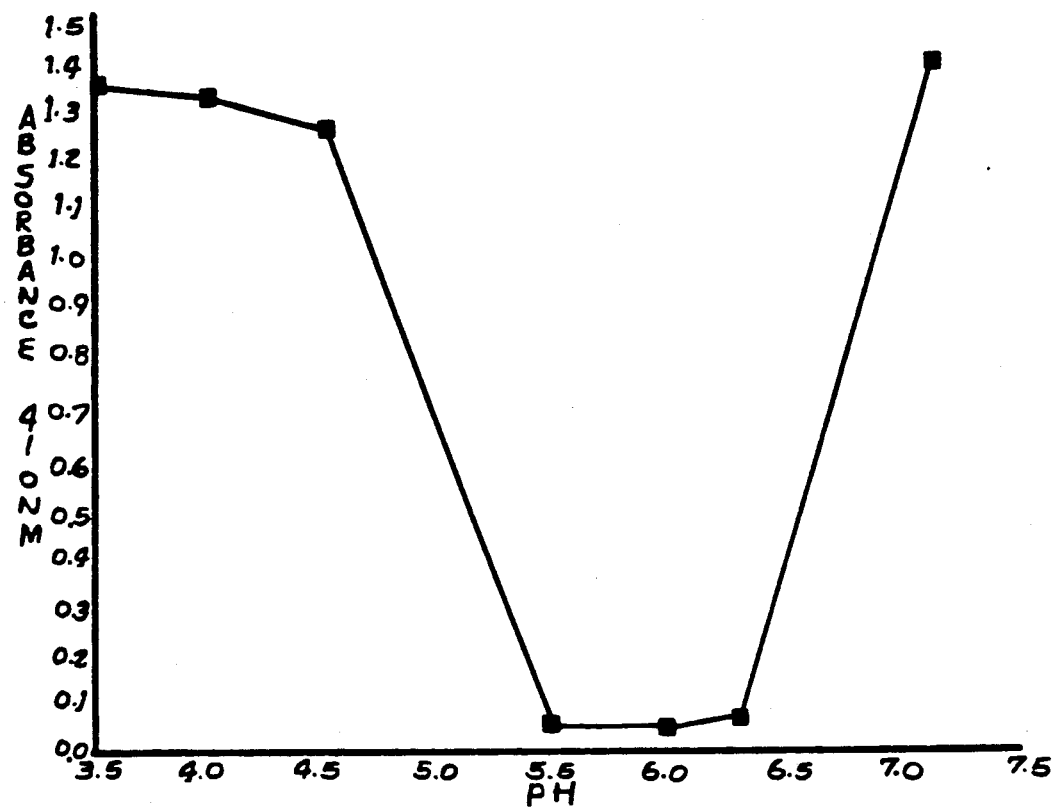
FIG.31 PROTEIN CONC. OF CHITOSAN-PROTEIN-COMPLEX SUPERNATE
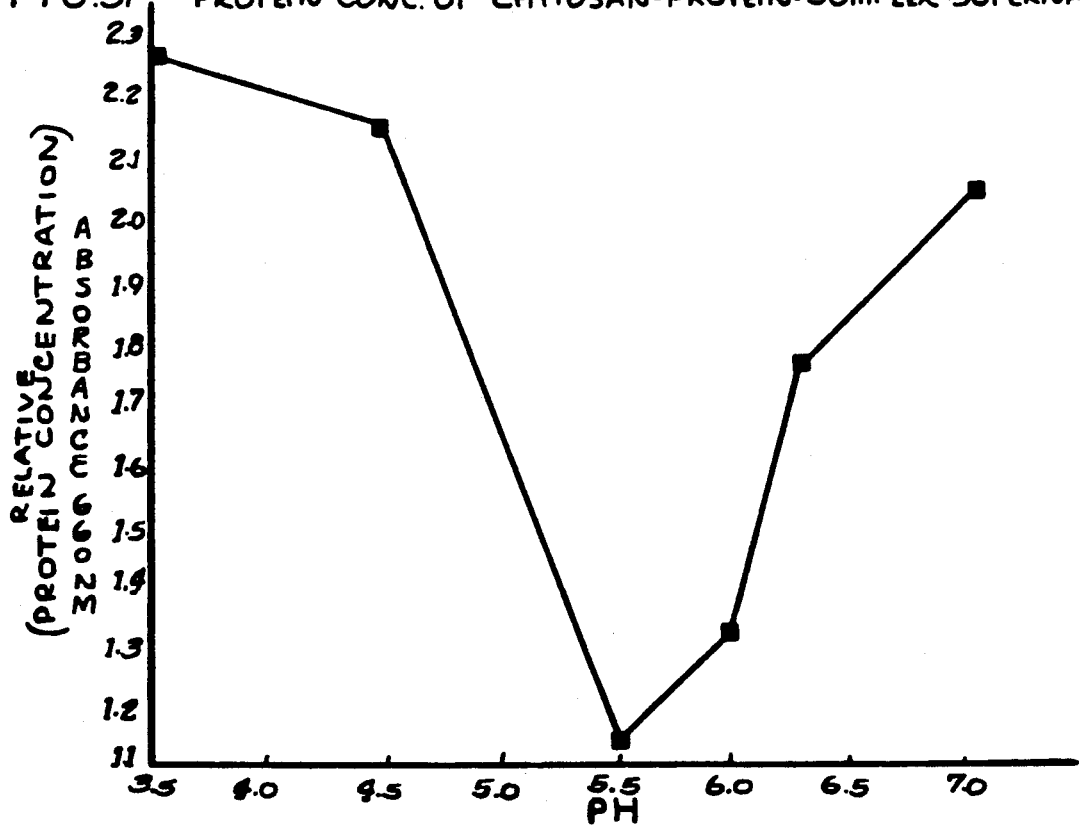

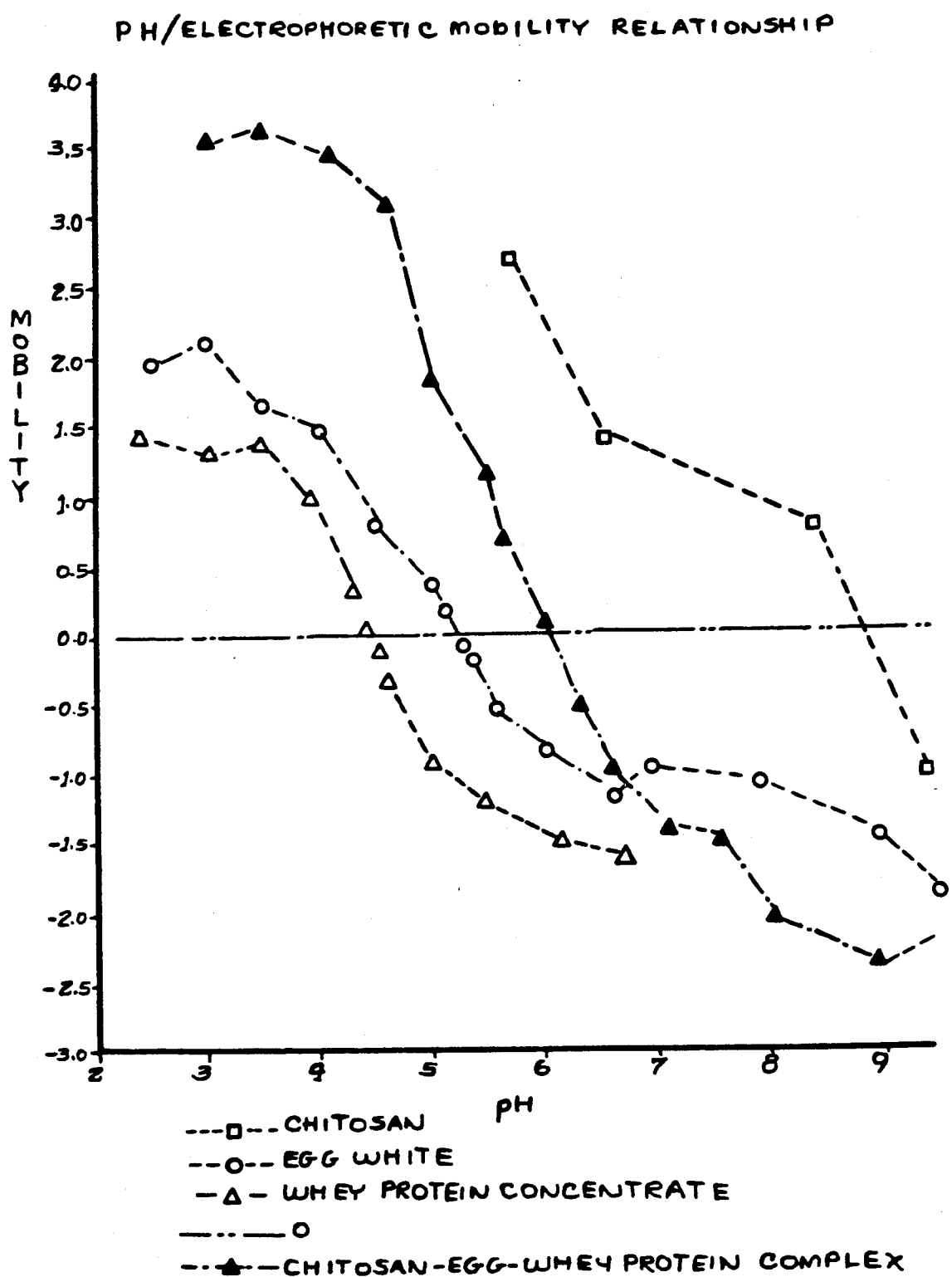

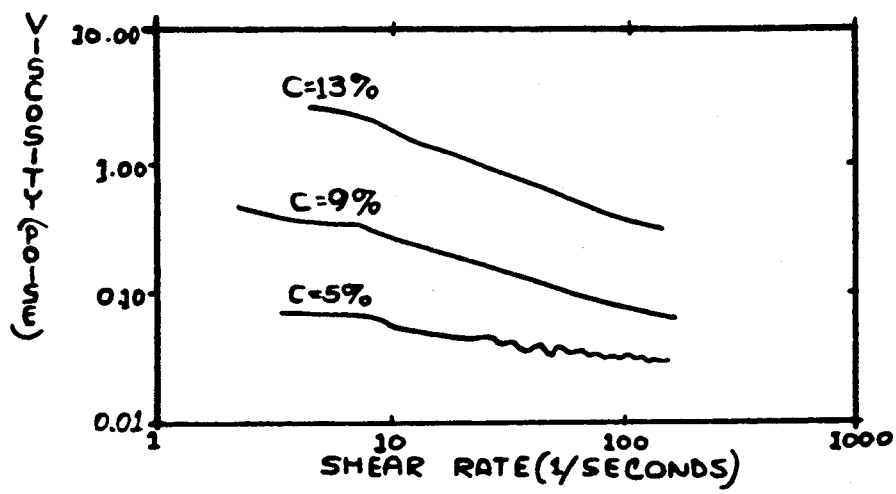
FIG.39A — FLOW CURVES OF CMC/PROTEIN COMPLEX SUSPENSIONS AT DIFFERENT CONCENTRATIONS
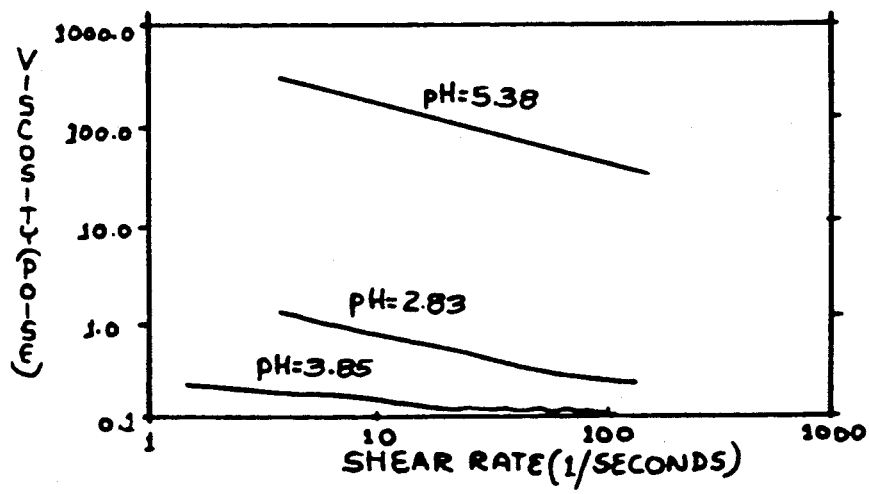
FIG.39B — FLOW CURVES OF CMC/PROTEIN COMPLEX SUSPENSIONS AT DIFFERENT pH
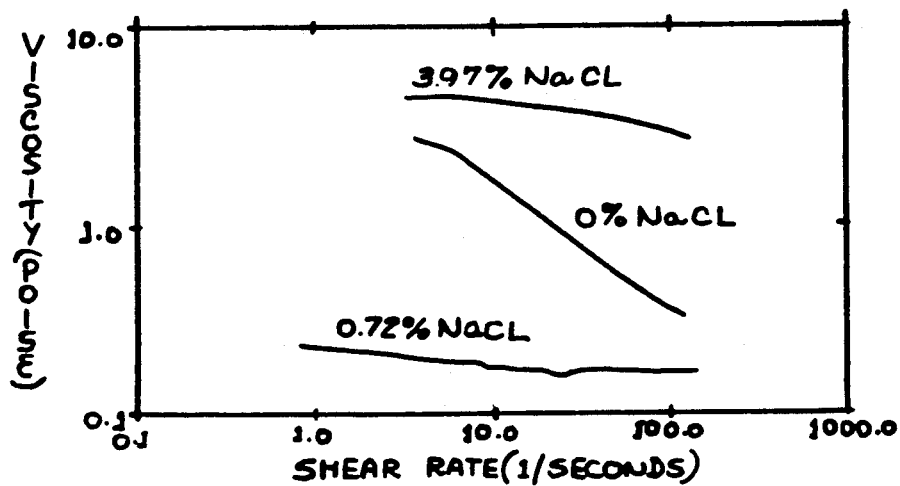
FIG.39C — FLOW CURVES OF CMC/PROTEIN COMPLEX AT C=13% SHOWING THE EFFECT OF ADDING NaCL

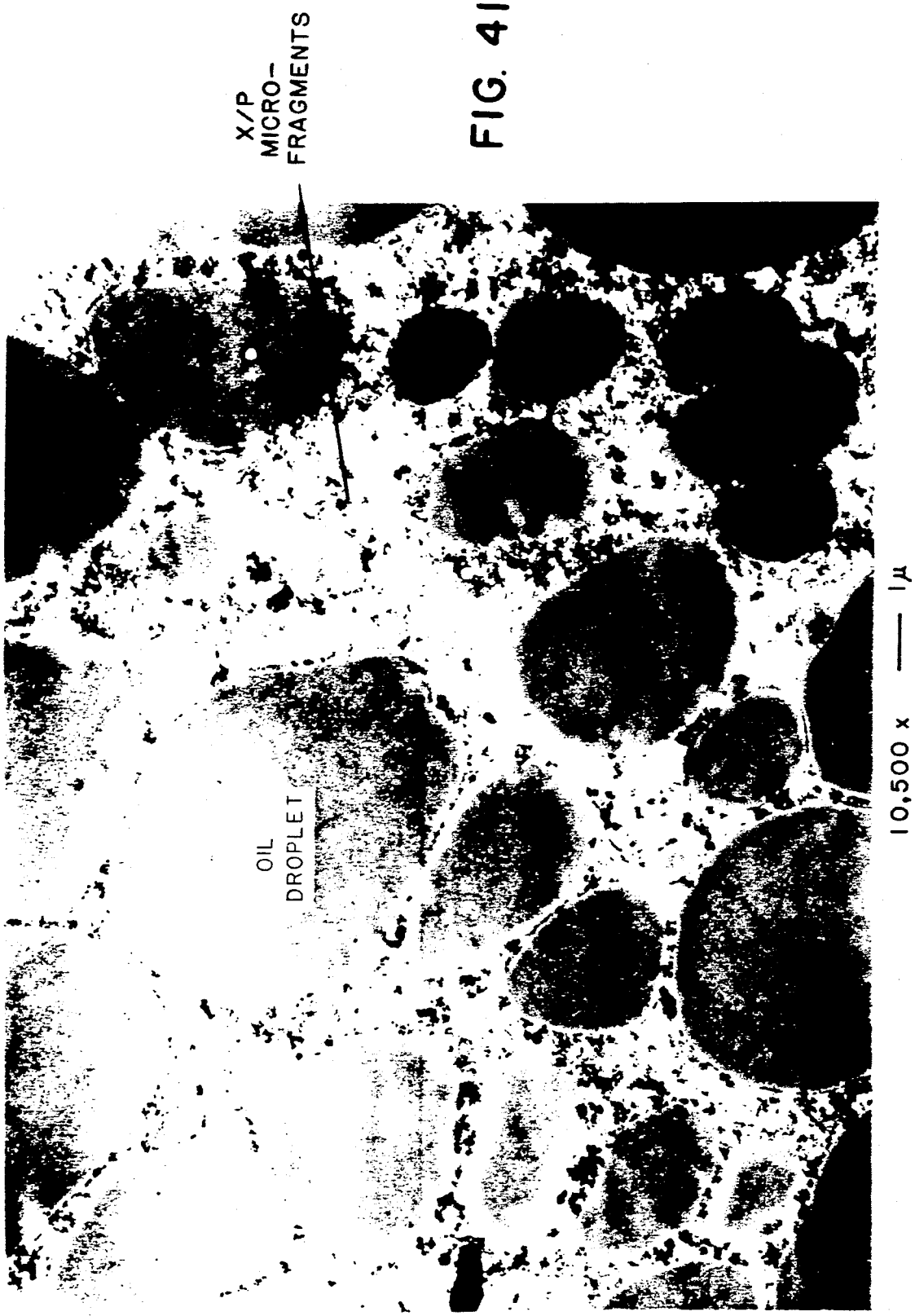

MICROFRAGMENTED IONIC POLYSACCHARIDE/PROTEIN COMPLEX DISPERSIONS

CROSS-REFERENCES TO RELATED APPLICATIONS

This application is a continuation-in-part of U.S. application Ser. No. 292,568 filed Dec. 30, 1988, now abandoned, which is a continuation-in-part of U.S. patent application Ser. No. 188,283 filed Apr. 29, 1988 now abandoned, and U.S. patent application Ser. No. 177,184, now U.S. Pat. No. 4,885,179, filed Apr. 4, 1988, now abandoned, which is a continuation-in-part of U.S. patent application Ser. No. 024,507 filed as PCT application US85/01265 on Jul. 1, 1985, which entered national stage in the United States on Mar. 1, 1987, now U.S. Pat. No. 4,762,726, which is a continuation-in-part of U.S. patent application Ser. No. 567,096 filed Dec. 30, 1983, now U.S. Pat. No. 4,563,360, and U.S. patent application Ser. No. 567,277 filed Dec. 30, 1983, now U.S. Pat. No. 4,559,233, and is a continuation-in-part of U.S. application Ser. No. 081,115 filed Aug. 3, 1987, abandoned in favor of continuation-in-part application Ser. No. 307,069 filed Feb. 6, 1989, now abandoned which is a continuation-in-part of U.S. application Ser. No. 658,618 filed Oct. 9, 1984, now U.S. Pat. No. 4,684,533, which are incorporated by reference herein.

BACKGROUND OF THE INVENTION

The present invention is directed to insolubilized, microfragmented ionic polysaccharide/protein complex aqueous dispersions suitable for utilization as nutritious bulking, viscosity or texture control agents in both conventional and novel food products. The microfragmented ionic polysaccharide/protein complex dispersions, have desirable rheological properties including a stable lubricity and creamy mouthfeel which may be utilized in a wide variety of novel, as well as otherwise conventional food products. The microfragmented xanthan/protein complex dispersions may, for example, serve as a fat or oil substitute in food products such as frozen desserts, spreads, dressings, baked goods and sauces. The present invention is also directed to methods for preparing such microfragmented anisotropic xanthan/protein complex dispersion compositions and food products comprising such dispersions.

Substantial technical effort has been directed to the development of oil replacement compositions which possess a smooth or oily mouthfeel, texture and lubricity, for use as a full or partial replacement for edible triglycerides in food products such as margarine, salad dressings such as mayonnaise, and desserts such as toppings, aerated desserts and ice cream, which have reduced calorie content. In this regard, synthetic fatty esters such as sucrose polyesters and polyglycerol polyesters such as described in U.S. Pat. Nos. 3,353,966 and 3,600,186 have been proposed as undigestible fat substitutes for various food products.

Significant research effort has also been directed to the study of complexes of proteins with other polymeric components including various polysaccharides. For example, alginates have been complexed with proteins including casein, edestin, yeast protein, gelatin and soy protein. Gelatin, bovine serum albumen, lysozyme and soy proteins have been complexed with sodium dextran sulfate, sunflower seed albumen has been complexed with alginate or pectin, and whey protein has been recovered from whey through the use of various hydrocolloids. Soybean whey-gum fibers are also known, and it is known that certain proteins will form fibers in the presence of specific polysaccharides, as disclosed in U.S. Pat. No. 3,792,175. As disclosed in the above referred to U.S. Pat. Nos. 4,559,233 and 4,563,360, meat simulating fibers may be prepared from xanthan gum complexed under appropriate conditions with solubilized proteins. It would be desirable to provide food products utilizing such xanthan/protein complexes having a smooth, creamy texture and mouthfeel for utilization in a wide variety of food products as a full or partial fat replacement. It would also be desirable to provide methods for preparing xanthan/protein complex compositions having a smooth, creamy mouthfeel together with high thermal and dispersion stability, which are capable of imparting oil-like or creamy organoleptic properties to specific food products incorporating such xanthan/protein complex products.

As described in the previously identified U.S. Pat. Nos. 4,563,360 and 4,559,233, xanthan/protein fibrous complexes having desirable characteristics may be provided by solution coprecipitation techniques. However, xanthan gum is relatively expensive and may have limited efficiency for complexing certain protein materials. Accordingly, other fibrous protein complexes of high food quality utilizing less expensive and/or more efficient components would be desirable, and the present invention is also directed to methods for preparing stable, edible, fibrous polysaccharide/protein complexes in addition to fibrous xanthan/protein complexes which may be utilized in a wide variety of food products. In this regard, while xanthan/protein complexes have certain desirable properties, edible polysaccharide complexes which provide a further range of characteristics, would also be desirable, as would complexes which may have improved economics of manufacture through use of a less expensive or more efficient ionic polysaccharide component in the provision of stable, aqueous microfragmented dispersions having a stable lubricity and smooth, creamy mouthfeel. It would be desirable to provide such dispersions which may, for example, serve as a fat or oil substitute in food products such as frozen desserts, spreads, dressings, baked goods and sauces.

It is an object of the present invention to provide methods for the manufacture of novel, nutritious, low calorie food compositions which have desirable, smooth, oil-like texture and mouthfeel characteristics, as well as desirable stability and functionality characteristics. It is a further object to provide novel food compositions which utilize such complex dispersions. These and other objects of the invention will become apparent from the following detailed description and the accompanying drawings.

DESCRIPTION OF THE DRAWINGS

FIG. 11 is a graphical representation of the turbidity remaining after centrifugation at 1600×g for 10 minutes at room temperature, of a microfragmented xanthan/protein complex aqueous dispersion of FIGS. 9 and 10 at 100 fold dilution as a function of dispersion pH, for various levels of salt content;

FIG. 12 is a graphical representation of the turbidity remaining after centrifugation at 1600×g for 10 minutes at room temperature, of the microfragmented xanthan/protein complex dispersion of FIG. 9 and 10 at 100 fold dilution as a function of sodium chloride concentration for dispersions of different pH;

FIG. 28 is a graphic representation of viscosity vs. pH for an aqueous carboxymethyl cellulose/protein complex dispersion at weight percent levels of 5 and 13 percent, respectively;

FIG. 29 is a graphic representation of the effect of added sodium chloride on the viscosity of xanthan/protein and carboxymethyl cellulose/protein complex dispersions;

FIG. 30 is a graphical representation of the turbidity of a chitosan/protein complex supernate;

FIG. 31 is a graphical representation of the protein concentration of the chitosan/protein complex of FIG. 30;

FIG. 32 is a graphical representation of the relationship of electrophoretic mobility of a chitosan/egg white/whey protein complex as a function of PH, together with the respective mobilities of the individual components;

FIGS. 39a, 39b and 39c are flow curves of aqueous CMC/protein complex dispersions under various conditions of complex concentration, pH and added salt concentration;

FIG. 41 is a photomicrograph of a reduced fat (50%) model mayonnaise emulsion containing a microfragmented xanthan/protein gel complex dispersion at a magnification of 10,500×.

DESCRIPTION OF THE INVENTION

Figure 1:
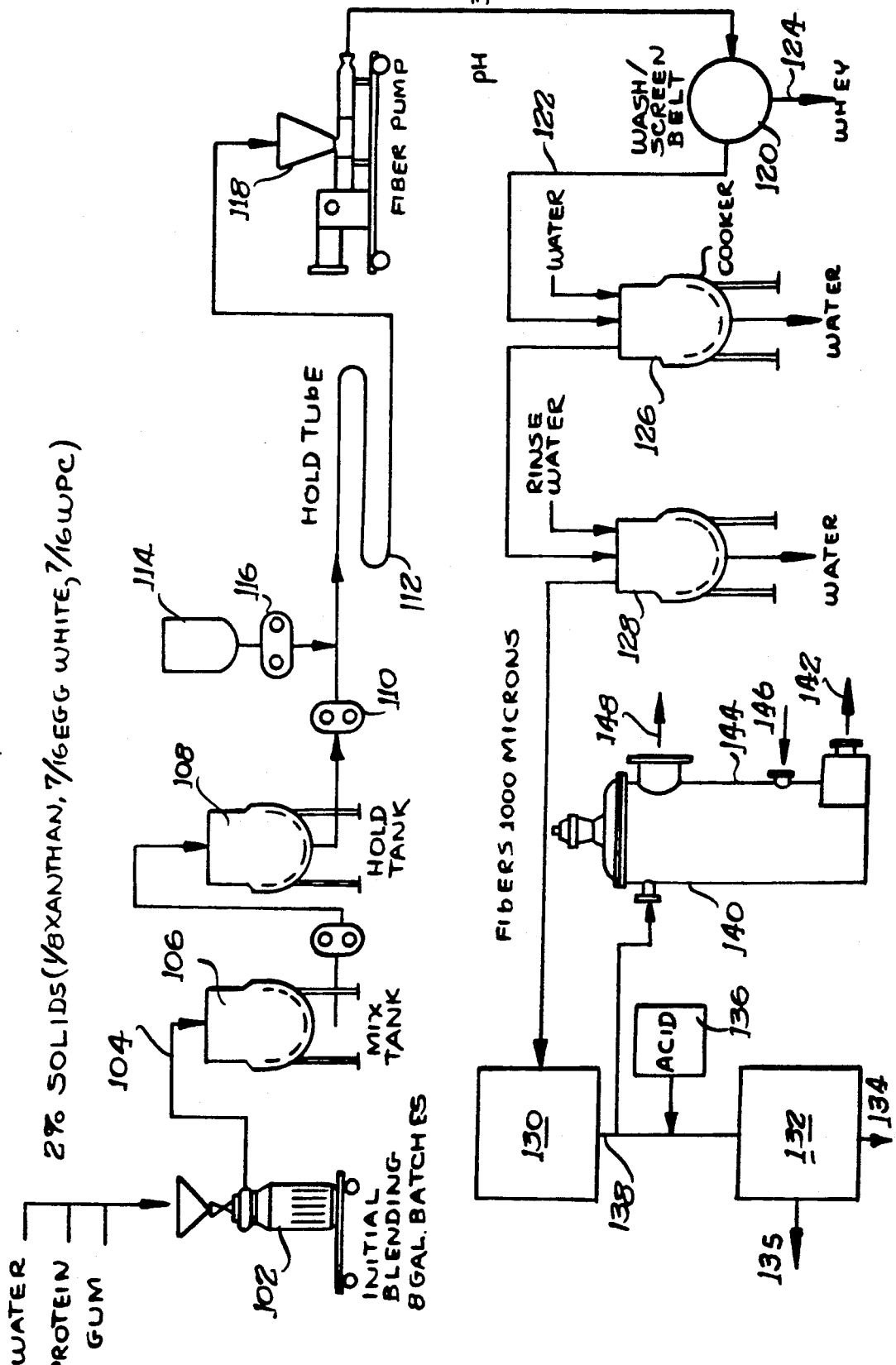
FIG. 1 is a schematic diagram illustrating a specific embodiment of a continuous method for manufacture of xanthan/protein complex aqueous dispersion, by continuously forming relatively large fibers, fragmenting the fibers under high shear conditions to form a microfragmented dispersion, and concentrating the resulting microfragmented dispersion.

The present invention is directed to the provision of aqueous dispersions of insolubilized, microfragmented polysaccharide/protein complexes which are useful as a nutritious bulking, viscosity or texture control agent and having desirable rheological characteristics of stable lubricity and creamy mouthfeel. Such aqueous, microfragmented polysaccharide/protein complex dispersions may comprise from about 1 to about 50, and typically from about 2 to about 25 weight percent of an insolubilized, hydrated, microfragmented ionic polysaccharide/protein complex discontinuous phase dispersed throughout a continuous aqueous phase, the discontinuous microfragmented ionic polysaccharide/protein complex phase comprising irregularly shaped microfragments of a hydrated complex having an ionic polysaccharide to protein weight ratio in the range of from about 2:1 to about 1:20, with the ionic polysaccharide/protein microfragments having a particle size distribution such that substantially all of said microfragments have a maximum dimension of less than about 15 microns. The microfragmented ionic polysaccharide/protein complex dispersions are preferably of a syneresed, molecularly intimately entangled interaction product of an ionic polysaccharide and a protein. Desirably, at least about 90 percent by weight of hydrated microfragments of the aqueous dispersion have a volume of less than $5 \times 10^{-10}$ cubic centimeters and have a maximum linear dimension in the range of from about 2 to about 10 microns and preferably less than about 7 microns.

Methods for producing such microfragmented ionic polysaccharide/protein dispersions are provided comprising the steps of forming an aqueous suspension of a syneresed molecularly intimately entangled complexed ionic polysaccharide/protein complex precipitate, conducting said syneresed complex suspension through a zone of high shear to fragment the complex under sufficient conditions of shear and duration to reduce substantially all of said complex to ionic polysaccharide/protein complex microfragments having a maximum dimension of less than about 15 microns. The high shear zone should best have a shear rate of at least about 37,000 inverse seconds, with a turbulent energy dissipation rate sufficient to raise the temperature of the suspension at least about 5° C. through viscous dissipation of input energy to heat. Substantially higher shear rates may be appropriate for various complexes. The complexed precipitate which is conducted through the high shear zone, as will be described in more detail hereinafter, desirably comprises at least about 5 and more preferably at least about 8 weight percent of ionic polysaccharide and at least about 20, preferably at least about 25, and more preferably for certain uses, at least about 50 weight percent of protein, based on the total (dry) solids weight of the complexed, syneresed precipitate.

The polysaccharide component may desirably be an edible anionic polysaccharide such as polysaccharides having pendant carboxylic acid groups, and polysaccharides having pendant sulfate groups. Examples of edible polysaccharides having pendant carboxylic acid groups include water soluble carboxymethyl cellulose, pectins, algin and alginates, and microbial gums such as gellan, as well as xanthan gum. Examples of edible polysaccharides having pendant sulfate groups include iota, kappa and lambda carrageenan, and various agaroid gums and gum components.

The polysaccharide may also be a cationic polysaccharide. An example of a cationic polysaccharide includes chitosan, which is a polyaminoglucose derived from natural chitin.

Various precipitated polysaccharide/protein complexes, which may or may not initially be in the form of large fibers, may be subjected to conditions of intense shear, to fragment the solid, complex particles (e.g., small fibers, curd-like pieces, etc.) to produce an aqueous dispersion having smooth, creamy characteristics. Such polysaccharide/protein complexes are desirably, but not necessarily, heat denatured, syneresed, reticulated polysaccharide complexes. In this regard, by "heat-denatured" is meant the loss of the native secondary and tertiary protein structure through the effect of heat. By "syneresed" is meant that the polysaccharide/ protein complex components are formed by expulsion of water by molecularly intimately entangled polysaccharide and protein components which are ionically complexed in a network having a solids density of at least about 10 weight percent total solids at 25° C. at the isoelectric point pH of the complex. Desirably, the complexes may have an intermolecular ionic bond energy between the ionic polysaccharide and the protein components of at least about 0.25 and more desirably at least about 0.5 calories per gram of the complex (dry basis), at the isoelectric point pH of the complex, under conditions of substantially complete ionic bond formation. Upon heating, the stability of the entanglement of the ionic polysaccharide with protein component may be further influenced by additional interactive bonding effects. By "reticulated" is meant that the molecularly intimate complex of protein and polysaccharide is formed in a network structure which is observable at a magnification of 10,000, and will desirably have a wide volume of at least 10 volume percent in which the complex is absent.

Such solid polysaccharide/protein complexes may be formed from an appropriate complex forming solution comprising a suitable, solubilized polysaccharide component and a solubilized protein component, by adjusting the pH to precipitate a polysaccharide/protein complex.

By appropriate selection of the ionic polysaccharide component and the protein component and the interaction conditions, a wide variety of syneresed ionic polysaccharide/protein complex precipitation may be provided ranging from substantially isotropic gels to fibrous anisotropic products, as will be described in detail.

The aqueous complex generating solution will include vegetable or animal proteins, or mixtures thereof. Such a complex generation solution may, for example, comprise a solubilized edible protein polymer component such as soy protein (particularly including soy protein isolate), casein, egg protein, peanut protein (particularly including peanut protein isolate), cottonseed protein (particularly including cottonseed protein isolate), sunflower protein (particularly including sunflower protein isolate), pea protein (particularly including pea protein isolate), whey protein, fish protein, crustacean protein and other seafood protein, animal protein and mixtures thereof. Cereal and grain proteins alone or in combination with other cereal, grain or other proteins, which may be solubilized in water, are useful protein components. In this regard, the water soluble proteins (albumens), salt soluble proteins (globulins), alcohol soluble proteins (prolamins and gliadins) and acid and alkali soluble proteins (glutelins) of cereals and grains such as corn, barley, wheat, buckwheat and oats are contemplated herein as protein sources. For example, zein, the prolamin protein of corn, may be readily obtained by dissolution in aqueous alcohol from corn gluten, and becomes soluble in dilute aqueous alkali (e.g., 0.02 to 0.2 normal NaOH). The various protein components may be utilized to produce aqueous microfragment dispersions of varied properties. For example, polysaccharide complexes with egg albumen readily denature at elevated temperature to stabilize the complex. The high proportion of nonpolar and acid amide side chains of prolamins such as zein may be utilized alone or with other proteins in forming polysaccharide complexes, to provide aqueous dispersions of varied, useful properties. One or more of these aqueous solubilized undenatured protein components may desirably comprise at least about 50 weight percent of the solubilized proteins, based on the total weight of the solubilized protein, for preparing microfragmented complex dispersions for a variety of uses. Gelatin may also be included in amounts (e.g., 20 weight percent based on the total dry weight of the protein component) which do not prevent fiber formation (when fiber formation is desired), particularly when it is desired to minimize the presence of sulfhydryl groups on the surface of the microfragments. Fish and shellfish proteins and single cell proteins are also contemplated. Egg white protein, casein (e.g., as sodium caseinate), soy protein isolate and mixtures of soy protein isolate and egg albumen are particularly preferred edible protein polymer components. Whey protein is a readily available protein which may be used alone or in combination with other proteins.

A particularly preferred protein component for preparing bland, high quality microfragmented complex aqueous dispersions is a mixture of skim milk and egg white protein. The skim milk and/or egg white proteins may be diafiltered or concentrated such as by methods such as ultrafiltration. Typically, the weight ratio of skim milk protein to egg white protein will be in the range of from about 4:1 to about 1:4, on a solids basis.

By "solubilized protein" is meant a protein that is hydrated by existing either in true solution (single phase) or in a stabilized dispersion which upon initial dispersion in water may appear to be a single phase but after a period of time may separate into two phases. By "solubilized undenatured protein" is meant a solubilized protein having its natural secondary and tertiary structure substantially intact. The solubilized undenatured edible protein component will desirably have an isoelectric point(s) greater than about 3, preferably in the range of from about 4 to about 10. Particularly useful proteins may have an isoelectric point in the range of from about 4 to about 7. In this regard, typically soy protein isolate may have an isoelectric point of about 4.5, egg albumen of about 4.7 and casein of about 4.5. It is noted that various constituents of the solubilized edible protein component may have different isoelectric points. However, it is important that the various protein components when complexed with the ionic polysaccharide component may form fibrous or gel-like complex precipitates at a preselected reaction pH which is determined by the isoelectric point of the fibrous complex. In this regard, particularly preferred compositions in accordance with the present invention include multiple protein complex fibers such as fibers of xanthan gum complexed with skim milk protein together with egg white protein. Very bland casein, whey protein or soy protein, may also be used together with egg albumen.

A protein is desirably solubilized at a pH of at least about 1 pH unit from its isoelectric point, and preferably at 2 pH units or greater from its isoelectric point. The complex generating solution further includes an ionic polysaccharide component which will be described in more detail.

The polysaccharide/protein complex may be formed by adjusting the pH of a solution of the dissolved protein and polysaccharide components to a pH at which the complex precipitates, without necessarily forming a fibrous precipitate.

A wide variety of complexes may be prepared, having a variety of unique specific characteristics which are desirable or essential to specific uses. For example, fibrous anisotropic xanthan/protein complexes such as xanthan/skim milk-egg white complexes have specific rheological food product compatibility, mouthfeel and bland flavor properties which are particularly desirable for food products such as frozen desserts and salad dressings. Carrageenan-, CMC (carboxymethyl cellulose)-, chitosan-, and gellan- egg white/whey protein complexes may be designed and prepared which have high protein utilization efficiencies and other respectively desirable properties, by adjusting the pH of dissolved polysaccharide/protein mixtures near the isoelectric points of the complexes, as determined by electrokinetic analysis. Although the various types of complexes are described herein as having certain common end uses or methods of preparation, they are not regarded as equivalent materials in view of the different characteristics which may be provided.

The complex forming solution may also include water solubilized, substantially nonionic edible polysaccharides such as dissolved starch, solubilized agar and agaroids, dissolved guar gum, dissolved carob gum, water soluble dextrans, water or alkali soluble edible grain bran and/or hemicellulose constituents such as solubilized wheat gum, solubilized wheat bran, solubilized oat bran and solubilized corn bran constituents, as well as mixtures of such nonionic polysaccharides. Such nonionic polysaccharide components, which may be dissolved in the complex forming solution together with the ionic polysaccharide and protein polymer components, may become entangled and enmeshed with the ionic polysaccharide/protein complex which is formed upon pH adjustment of the complex forming solution. The nonionic polysaccharide component may typically tend to increase the water content of the polysaccharide/protein complex. It is desirable that the hydrated complex itself contain at least about 10 weight percent of solids, and preferably for a variety of uses, at least about 15 weight percent solids, and preferably from about 20 to about 40 weight percent solids. For example, when an ionic polysaccharide/protein complex having 40 weight percent solids is dispersed as microfragments in an equal weight of water, a 20 weight percent solids dispersion is prepared which has a total solid content of 20 weight percent and a thick consistency resulting from its limited 50 weight percent continuous aqueous phase. The amount and type of nonionic polysaccharide may be adjusted to provide a desired solids level for a particular complex.

Starch may be included in relatively high quantities, while high viscosity water retaining materials such as agar may best be included in relatively small amounts, such as from about 0.1 to about 2 percent based on the total weight (dry basis) of the complex.

Solubilized starch is a particularly desirable nonionic polysaccharide component in view of its relatively bland taste, relatively low caloric content when hydrated, and its price-performance effectiveness. Starch may desirably be included in the complex forming solutions, and in the precipitated complexes, in amounts of from about 1% to about 75% by weight, based on the total weight of the polysaccharide/protein complex on a dry basis. For various uses, the starch will preferably be included in the precipitated complexes in an amount in the range of from about 10 percent to about 50 percent by weight, based on the total weight of the complex on a dry basis.

Starch components may include amylose, amylopectin and mixtures thereof. Useful starch components, include corn starch, potato starch and tapioca starch. Amylopectin and high amylopectin starches such as waxy maize starch and waxy milo starch may be dissolved or fully gelatinized and introduced into the fiber generating solution prior to pH adjustment for complex formation, to provide high molecular weight starch components which entangle readily with the other components upon precipitation. Fully gelatinized amylose and high amylose starch sources such as obtained from high amylose corn varieties containing at least 75% by weight amylose based on the total starch content, may also be utilized. Such amylose has a linear structure which is subject to retrogradation. The linear amylose molecules can interact and associate with one another to contribute to the interlacing network extending through the xanthan/protein complex, and contribute to the syneresis of water from the complex. Corn starch, which is a mixture of amylose and amylopectin, may be desirably included in the fiber forming solution in amounts ranging up to about three times the total weight of the ionic polysaccharide components, although from about 0.25 to about 2 times the weight of the ionic polysaccharide weight is a preferred range.

As indicated, such nonionic polysaccharide components should best be solubilized in the complex forming solution, and in this regard, polysaccharides such as starches which require elevated temperatures for dissolution should best be dissolved in water at elevated temperature and at least partially cooled below the respective denaturation temperature before mixing with any undenatured protein components. The ionic polysaccharide, however, may be dissolved with the starch at elevated temperature, and will tend to prevent gel formation or retrogradation upon cooling. The nonionic polysaccharide solution of the ionic polysaccharide and nonionic polysaccharide solution should best be mixed with the protein component at a temperature below a temperature at which any substantial portion of the protein is denatured. In this manner, the dissolved starch or other nonionic polysaccharide, the protein and the ionic polysaccharide may be fully intermixed in solution prior to pH adjustment to form the polysaccharide/protein complex. It is noted that microfragmentation of various undissolved polysaccharide materials with the formed complex may, however, serve to provide an aqueous dispersion having a desirable smooth, creamy texture in which the undissolved polysaccharide materials are fragmented into particles having a major dimension less than, for example, 10 microns in length.

The weight ratio of ionic polysaccharide to solubilized protein in the complex forming solution will generally be in the range of from about 1:2 to about 1:15, and preferably from about 1:4 to about 1:10. The preferred weight ratios of the precipitated complexes will generally be in the same ranges, although as described hereinafter, the ratio of ionic polysaccharide to protein may be substantially greater in the complex precipitate than in the solution, if protein recovery is not complete.

The total solids content of the complex forming solution will best be in the range of from about 1 to about 30 weight percent, and preferably in the range of from about 1.5 to about 10 percent by weight (typically about 2-3 percent by weight), based on the total weight of the complex forming solution.

The precipitated polysaccharide-protein complexes may be stabilized by boiling or other high temperature denaturation treatment. Any off-flavor components associated with the complexes may be removed by washing. Such boiled and washed polysaccharide-protein complexes may be microfragmented by subjecting an aqueous slurry or suspension of the complex to intense shear to provide microfragmentation treatment. Effective results have been achieved by using a CD150 or a MC15 cell disruptor using a knife edge homogenization element within a closely surrounding impact ring (A.P.Z. Gaulin Corp., Boston, Mass.) at an inlet pressure of at least about 3000 psig and preferably at least 10,000 psig to obtain microfragments smaller than fifteen microns preferably smaller than 5 microns in maximum dimension. The dispersion may be passed through a cell disruptor or other high shear zone, a sufficient number of times to provide a desired particle size. The microfragmented dispersion will desirably have a total solids content of the ionic polysaccharide/protein complex particles in the range of from about 1 to about 30 percent and typically from about 1 to about 10 percent, by weight, solids basis, based on the total weight of the aqueous dispersion. Microfragmentation of dispersions over about 10 weight percent solids content may be difficult. If a low solids content dispersion is formed by high pressure shearing, the resulting dispersion may be concentrated by ultrafiltration, thin film evaporation or centrifugation procedures, if desired. After concentration, these microfragmented polysaccharide/protein complexes are found to be smooth, creamy, bland, white, and have a fat-like mouthfeel, and can be used as a fat replacer in a variety of food products. For example, mayonnaise products prepared with 50 weight percent of the oil replaced by these microfragmented polysaccharide/protein complexes are stable, smooth, and creamy.

Insolubilized, microfragmented, anisotropic xanthan/protein complex dispersions are preferred compositions having a creamy mouthfeel, as well as specific desirable stability, functional and other characteristics, which may be utilized in various food products. For example, such microfragmented xanthan/protein complex dispersions may function as low calorie, nutritious, full or partial oil or fat replacements in a variety of food products such as frozen desserts, spreads, dips, dressings, sauces, processed and analog cheese products, cultured dairy products, processed meat products such as hot dogs and luncheon meats and baked goods. Such microfragmented xanthan/protein complex dispersions may also contribute desirable mouthfeel, moisture control, texture, stabilizing, enrichment, hydrating and bulking properties under a broad range of conditions for a wide range of food applications.

Microfragmented anisotropic xanthan/protein complex dispersions in accordance with the present invention may typically comprise from about 1 to about 50 weight percent of an insolubilized, hydrated microfragmented anisotropic xanthan/protein complex discontinuous phase dispersed throughout a continuous aqueous phase, based on the total solids content of the xanthan/protein complex in the dispersion. In particularly preferred embodiments, the discontinuous anisotropic xanthan/protein complex phase will generally comprise irregularly shaped microfragments of an anisotropic, hydrated xanthan/protein complex having a particle size distribution, such that substantially all of the xanthan/protein complex microfragments of the dispersion have a maximum dimension of less than about 15 microns. The anisotropic xanthan/protein complex is a molecularly intimate interaction product of xanthan and a protein in proportions which produce a material having physical and functional properties differing substantially from either the protein component or the xanthan component alone. Desirably, at least about 90 percent by weight of the hydrated microfragments of the aqueous dispersion have a volume of less than about $5 \times 10^{-10}$ cubic centimeters, and a maximum linear dimension of less than about 7 microns. Xanthan/protein microfragments having a mean maximum dimension in the range of from about 2 to about 10 microns provide desirable, creamy mouthfeel and other properties, although smaller microfragments may also be utilized. Fibers or other particles larger than 20 microns in length, which may be utilized, for example, for the purpose of introducing properties such as fibrous or chewy texture in a specific food product in addition to the creamy texture, are not included in this calculation of weight percent. The hydrated, molecularly intimately combined xanthan/protein complex microfragment particles of the aqueous dispersion will desirably have a xanthan/ protein weight ratio of from about 2:1 to about 1:20, more preferably in the range of from about 1:2 to about 1:10. Xanthan/protein complex fiber formation may occur only at an intermediate range of xanthan/protein ratio, while xanthan/protein complex gels, which may also be utilized in the preparation of microfragmented xanthan/protein complex dispersions, may be formed over a relatively wider or different range of conditions and ratios. At least about 5 weight percent, and preferably at least 10 weight percent, based on the dry weight of the xanthan/protein molecularly intimate complex should be the xanthan gum component, in order to provide substantial properties of the complex, as compared with the properties of the protein itself. As indicated, the insolubilized xanthan/protein complex microfragments are desirably anisotropic, and in this regard, by "anisotropic" is meant that the insoluble microfragments have irregular particle shapes having a significant statistical deviation from sphericity.

Such microfragmented anisotropic xanthan/protein dispersions have particularly desirable shelf-life, thermal, pH and dispersion stability, and a high functionality to weight percent of solids ratio together with smooth, creamy texture and mouthfeel characteristics, and a bland taste which is generally compatible with a wide variety of food products.

The irregularity of the microfragments and their significant departure from sphericity, together with their bulk and surface properties are believed to provide a wide degree of stable functionality at a relatively low total solids content. The high bulk stability of the xanthan/protein complex is also believed to contribute significant thermal stability and storage stability in respect to product properties and bland taste to the microfragment dispersion.

Food products comprising such xanthan/protein complex dispersions may be provided which have novel and particularly desirable characteristics, as will be more particularly described hereinafter. Such products may comprise from about 1 to about 20 percent by weight (solids basis) of the xanthan/protein complex dispersion, from about 10 to about 90 percent by weight moisture, from about 0 to about 80 percent carbohydrate, from about 0 to about 35 percent by weight protein (other than the xanthan/protein complex) and from about 0 to about 50 percent by weight of fat, as well as salt, flavoring agents and other food components. Various specific food applications will be described in more detail hereinafter.

The microfragmented anisotropic xanthan/protein complex dispersions may be prepared by initially forming relatively large xanthan/protein complex fibers under fiber-forming conditions in which an anisotropic complex is formed, and subsequently shearing an aqueous slurry of such fibers under high energy shear conditions to comminute the fibers to smaller anisotropic fiber microfragments having a maximum dimension of 15 microns or less. As described in U.S. Pat. Nos. 4,563,360 and 4,559,233, xanthan/protein complex fibers may be formed from aqueous fiber-generating solutions of xanthan gum and protein under specific fiber-forming conditions. It is desirable that the pre-formed xanthan/protein complex fibers, particularly those fibers prepared from protein sources such as whey protein concentrate which may contain undesired flavor components, be washed with water after formation. At least an equal volume of water to the volume of the fibers should be used, desirably in a countercurrent process. In this regard, in such methods of microfragmented xanthan/protein complex dispersion manufacture which utilize an initial relatively large fiber formation step, it is desirable to separate at least a portion of the fiber whey solution formed by the fiber generating solution under fiber formation. The whey separation step not only increases the concentration of the fibers for subsequent processing, but may also remove undesirable flavor components which could interfere with subsequent food product formulation. Desirably, at least about 50 volume percent and more preferably at least about 75 volume percent of the fiber whey solution is separated from the fibers. In addition, the xanthan/protein complex fibers may desirably be washed with at least an amount of water equal to, and more preferably, at least about two times the volume of the fibers, before subsequent microfragmentation. It is also particularly desirable that the xanthan/protein complex fibers be heated to a temperature sufficient to denature at least about 50 weight percent of the protein, and more preferably at least about 80 percent of the protein, prior to microfragmentation. The washing step may desirably be carried out subsequent to, or concomitantly with the denaturation stabilization step, for example, by boiling the preformed fibers in a quantity from the clean wash water.

By "relatively large" or "pre-formed" fibers is meant fibers having a length of at least about 20 microns. Such xanthan/protein complex fibers may have significant physical integrity, which varies anisotropically, such that high shear forces are required to tear the fibers into microfragments, preferentially along zones or surfaces of weaker integrity, thereby producing irregularly shaped microfragments. The high shear comminution may be carried out in an aqueous slurry without other food components. Alternatively, the high shear treatment step may be carried out with other food product components which are dissolved in the aqueous phase, or which are also intended to be emulsified or otherwise thoroughly dispersed in the preparation of the food product containing the xanthan/protein complex dispersion, as will be described in more detail hereinafter.

As indicated, high shear microfragmentation in aqueous dispersion may be utilized to produce anisotropic microfragmented xanthan/protein complex dispersions in accordance with the present disclosure. Such high shear treatment may be carried out in any suitable manner, such as by hydroshear mixers, ultrasonic mixers, and colloid mills, and mixer homogenizers, as will also be described in more detail. High energy hydroshear mixers such as described in U.S. Pat. No. 4,533,254 have been demonstrated to be particularly desirable for xanthan/protein complex microfragment dispersion formation from preformed xanthan/protein fibers.

In a preferred method of microfragmenting the preformed anisotropic xanthan/protein complex fibers, an aqueous xanthan/protein fiber slurry is subjected to high levels of shear rate and kinetic energy dissipation. For example, a slurry containing from about 4 to about 5 percent by weight of preformed, relatively large xanthan/protein complex fibers (solids basis) with a viscosity not exceeding 1000 centipoise may be conducted through a high shear zone at initial linear velocities of at least about 1000 feet per second, and more preferably at least about 1300 feet per second, and then rapidly decelerated to achieve fragmentation of the fibers.

The preformed anisotropic fibers should best be conducted through a high shear zone having a shear rate of at least about 37,000 seconds$^{-1}$ and preferably at least about $5 \times 10^6$ (e.g., $1 \times 10^7$) seconds$^{-1}$ at a specific turbulent energy dissipation rate of at least about $8.5 \times 10^5$ ergs per cubic centimeter of the high shear zone. Preferably, all of the fiber slurry is conducted through the high velocity and shear fragmentation zone. In a flow through system with continuous high shear treatment, the specific energy requirement (the energy dissipation rate per unit throughput of product stream) may desirably be at least about $1 \times 10^8$ ergs per gram. Preferably, a turbulent energy dissipation rate of at least about $4 \times 10^{11}$ ergs per pound of aqueous dispersion is provided per pass through the high shear, high velocity zone. The kinetic and shearing forces are dissipated and converted viscously to heat and fragmentation of the complex, and the temperature of the dispersion may rise at least about 10° C. such as at least about 30° C. upon conduction through the high velocity and shear microfragmentation zone. The high shear and rapid deceleration tears and fragments the larger fibrous xanthan/protein complex fibers into irregularly shaped microfragments, preferentially along surfaces of weakness of its fibers.

In methods of microfragmented anisotropic xanthan/protein dispersion formation utilizing an initial aqueous slurry of preformed anisotropic fibers, the aqueous slurry will desirably comprise less than about 20 and preferably in the range of from about 2 to about 10 weight percent of xanthan/protein fibers (solids basis), in order to provide effective fiber comminution to the desired irregular particle size distribution. The preformed fibers to be subjected to subsequent microfragmentation may be provided from an aqueous protein fiber generating solution of vegetable or animal proteins, or mixtures thereof, as previously described.

The fiber generating solution further includes a solubilized xanthan gum hydrocolloid polymer component selected from the group consisting of xanthan gum, xanthan gum/hydrocolloid adducts and mixtures thereof, as will be discussed hereinafter, various other polysaccharide components may be utilized alone, or with xanthan gum, to provide complex dispersions having a variety of characteristics and properties. Soy protein isolate and mixtures of soy protein isolate and egg albumen are particularly preferred edible protein polymer components. For xanthan-protein complex microfragment dispersion manufacture, it is particularly desirable that the fiber-forming protein be substantially fully dissolved. Protein such as egg white protein, whey protein in undenatured condition and mixtures thereof readily form a true solution in water and are particularly desirable for microfragment dispersion preparation in accordance with the present disclosure. The edible protein polymer component will desirably have an isoelectric point(s) greater than about 3, preferably in the range of from about 4 to about 10. Particularly useful proteins may have an isoelectric point in the range of from about 4 to about 7. In this regard, typically soy protein isolate may have an isoelectric point of about 4.5, egg albumen of about 4.7, whey protein of about 4.5, and casein of about 4.5. It is noted that various constituents of the solubilized edible protein component may have different isoelectric points. However, it is important in the provision of fibers comprising xanthan complexed with a plurality of proteins that the isoelectric point of the various protein components, when complexed with the xanthan gum component, form fibrous precipitates at a preselected reaction pH which is determined by the isoelectric point of the fibrous complex. In this regard, particularly preferred compositions in accordance with the present invention include anisotropic multiple-protein complex fibers such as xanthan/(whey protein and egg albumen protein) complex fibers, xanthan/(soy protein+egg albumen) complex fibers, xanthan/(whey protein+soy protein) complex fibers and xanthan/(whey protein, soy protein and egg protein) complex fibers.

The solubilization of the protein and the xanthan gum under non-fiber forming conditions is believed to be important to the formation of molecularly intimate xanthan/protein complexes having properties differing from the xanthan or the protein components in significant characteristics. A protein is desirably solubilized at a pH of at least about 1 pH unit from its isoelectric point, and preferably at least 2 pH units or greater from its isoelectric point. Such solubilized proteins may preferably include dairy whey protein, egg albumen protein and vegetable protein isolates. By "vegetable protein isolate" such as "soy protein isolate" and "peanut protein isolate" is meant a protein preparation containing at least about 90% protein.

By "xanthan gum" is meant the heteropolysaccharide produced by fermentation of the microorganism of the genus Xanthomonas. A discussion of the physical and chemical properties may be found in Industrial Gums, R. L. Whistler, Ed., Academic Press, N.Y. (1973), p. 473.

Xanthan gum in aqueous solution with an appropriate counterion such as sodium or potassium is highly negatively charged because its side chains are composed of charged glucuronic acid, mannose and its pyruvate derivative. In aqueous solution, the highly charged mutually repelling and relatively bulky side chains, which are regularly disposed along the relatively narrow backbone, are believed to provide hydrated xanthan gum with a relatively linear structure, which is further believed to be an important factor in the provision of the desirable properties and functionality of the molecularly intimate complexes which may be formed with solubilized protein components, in the preparation of microfragmented xanthan/protein complex dispersions, and food products containing such complexes, as will be further discussed.

By xanthan gum adduct is meant a complex of xanthan gum with another hydrocolloid. Xanthan gum forms adducts with other hydrocolloids such as carob gum in which it is believed that the extended linear nature of the xanthan gum in solution is preserved. Desirably, the xanthan gum adducts should comprise at least about 20 weight percent of xanthan gum, based on the total weight of the xanthan gum and the adduct component.

The fiber forming solution may also include substantially fully hydrated, substantially nonionic edible polysaccharides such as fully gelatinized dissolved starch, solubilized agar and agaroids, dissolved guar gum, dissolved carob gum (in addition to that which may be complexed with the xanthan gum component), water soluble dextrans, water or alkali soluble edible grain bran and/or hemicellulose constituents such as solubilized wheat gum, solubilized wheat bran, solubilized oat bran and solubilized corn bran constituents, as well as mixtures of such nonionic polysaccharides, as previously described. It is desirable that the fibers themselves contain at least about 15 weight percent of solids, and preferably for a variety of uses, at least about 20 weight percent solids, and the amount and type of nonionic polysaccharide may be adjusted to provide a desired solids level.

Substantially fully hydrated starch is a particularly desirable nonionic polysaccharide component in view of its relatively bland taste, relatively low caloric content when hydrated, and its price-performance effectiveness. Starch may desirably be included in amounts of from about 1% to about 75%, and preferably for various uses, from about 25 to about 60 weight percent based on the total weight of the fiber (dry basis), as previously described.

The protein fiber generating solution may be provided in any suitable manner, as by preparing and subsequently combining separate protein components and xanthan gum polymer solutions, and by initially preparing a solution comprising both components. In methods in which fibers are formed which are subsequently comminuted by shear to form an anisotropic xanthan/protein complex microfragment dispersion, the fiber generating solution may contain a solubilized protein component and xanthan component in a particular range to produce anisotropic fibers, and in this regard, the total solubilized protein and xanthan components should best be in the range of from about 0.1 weight percent to about 20 weight percent and preferably in the range of from about 2 weight percent to about 10 weight percent, based on the total weight of the aqueous fiber generating solution. The aqueous fiber forming solution may further include other components, including other dissolved or suspended protein components, flavoring agents, preservatives and hydrocolloids provided they do not interfere with the desired anisotropic complex formation. However, as will be discussed hereinafter in respect to various other aspects of the present disclosure, xanthan/protein gel complex compositions may also be formed which may find utility in various food products and manufacturing methods.

Further in accordance with xanthan/protein dispersion manufacture methods, the pH of the fiber generating solution is adjusted to a pH at which the components form a complex, which is preferably within about 2 pH units, and more preferably within about 1 pH unit, of an optimum isoelectric pH for the desired complex, to form a fibrous complex under conditions of mixing which may be utilized in the preparation of xanthan/protein microfragment dispersions. The fiber formation may occur over a range of pH approaching the isoelectric point of the xanthan gum - protein complex. In this regard, for example, for a soy protein isolate-xanthan gum fiber complex formation, fiber formation may begin near neutral pH and increases as the pH is adjusted to or near to the isoelectric point of the hybrid soy protein-xanthan gum complex, which typically may be in the range of from about 2 to about 5. The fiber formation is spontaneous and does not require the use of spinning equipment. Once the fibers are formed, they are made relatively stable to a range of salt and pH conditions by heat treatment as will be more fully discussed hereinafter. Moreover, the fibrous network synereses (exudes water), which is desirable in the minimization of energy intensive drying steps, if drying is desired. The separation of the fibrous hybrid protein complexes from the liquid phase, which may contain low molecular weight solutes, effectively removes salts from the protein-complex while at the same time concentrating the protein component.

The adjustment of pH to form fibers from the xanthan/protein solution mixture may be carried out in a variety of ways. In this regard, the protein fiber generating solution may be provided at a pH significantly above the isoelectric point of the protein complex fibers, and subsequently reduced in pH toward the isoelectric point. This pH reduction may be carried out for example by removal of a cationic counterion (e.g., Na+) of the solubilized xanthan gum and/or protein component as by electrophoresis, or by addition of an edible or food grade acid such as hydrochloric acid, phosphoric acid, lactic acid, acetic acid, citric acid, ascorbic acid, carbonic acid or mixtures thereof. The acid appears to protonate both the carboxylate and the amino groups of the protein to make the protein less negatively charged so as to link the polymeric chains of the very negatively charged xanthan gum, to form a gum protein complex that has a fibrous network. Adjustment of pH may also be carried out by other appropriate techniques such as by combining an aqueous solution of the protein component at a predetermined pH at which the protein component is solubilized with an aqueous solution of the xanthan gum component at a predetermined pH at which it is solubilized, such that upon combination the resulting solution has a predetermined pH at or near the isoelectric point of the desired protein/xanthan gum fibrous complex. In this regard, it will be appreciated that the protein component may be provided in aqueous solution in broad ranges of pH at higher and lower pH than its protein isoelectric point(s), and the xanthan gum, which has substantially only anionic carboxylic groups, may also be provided in aqueous solution over a broad range of pH. It will also be appreciated that the pH may be adjusted by selective anion removal from a combined solubilized protein and xanthan component solution having low pH, as discussed in U.S. Pat. Nos. 4,559,233 and 4,563,360, in order to raise the pH to a value approximating the isoelectric point of a desired protein component-xanthan gum fibrous complex, or an edible food grade base, such as sodium hydroxide may be added to such solubilized acidic mixtures.

The fibrous complex forming reaction is best completed or maximized under complex-forming conditions when the gum-protein mixture is adjusted to a pH at which the electrophoretic mobility of a desired gum-protein mixture is substantially zero. Electrophoretic mobility may be measured using conventional analytical instruments such as a System 3000 electrokinetic analyzer manufactured by PenKem, Inc., Bedford Hills, N.Y.

Optimal points for hybrid complex formation may be determined by measuring the isoelectric points of desired complexes, which may be carried out by measuring the isoelectric point values separately for the reactants, and adjusting the mixture pH to a value intermediate to the individual pI to form a sample of the desired complex. The pI of the complex thus formed may be measured to determine a desired pH for the complex formation as the control point of the reaction to maximize product yields and achieve the desired fibrous food texture. The isoelectric point of a protein-xanthan complex may be selected depending upon the respective proportions of the components of the complex, and upon the isoelectric points of the components.

Anisotropic xanthan/protein complex fibers, upon formation, and without further (e.g., denaturation) treatment, are stable in acidic and neutral media, but may be dissolved in an alkaline solution (i.e., pH 9.0 or higher). The complexes tend to redissolve when the pH is greater than about one pH unit above the pI of the protein component. The stability of the complex and of microfragmented dispersions produced therefrom may be enhanced by heat treatment, as will be more fully discussed hereinafter.

The texture of the xanthan/protein complex may be controlled by varying the ratio of the gum versus the protein. As indicated, the xanthan gum to protein weight ratio of the complex is desirably within the range of from about 2:1 to about 1:15, and for reasons of economy, may be in the range of from about 1:4 to about 1:0 Percentages given herein are weight percentages, and ratios are weight to weight ratios, unless otherwise indicated.

Xanthan gums and proteins may also be utilized to form gels when the xanthan/protein weight ratio in the complex forming solution is relatively large upon acidification (i.e., a relatively high level of the ionic polysaccharide) such as from about 1:3 to about 2:1 xanthan:protein ratios in the complex forming solution and preferably about 1:2 for xanthan/egg white-whey protein complexes. Other polysaccharides and proteins, as previously described, may also form gels when the polysaccharide/protein ratios are similarly relatively high. Microfragmentation of these polysaccharide/protein gels yields a smooth, creamy and fat-like foodstuff, which can be used as a fat replacer in a variety of food products. For example, it has been found that the microfragmented xanthan/egg white/caseinate (1:1:1) complex-based mayonnaise was bland, smooth and creamy and the microfragmented xanthan/egg white/caseinate (1:1:1) complex based frozen dessert was also bland, smooth and creamy, indicating that these microfragmented polysaccharide/protein gels may be used as desirable fat replacers in various food products. It is an advantage of using this type of polysaccharide protein complex that the protein utilization yield from the complex forming solution is high and that heating may not be required for stabilization for use in a variety of food products.

Having generally described manufacture of microfragment dispersions, various aspects of the invention will be further described with respect to methods and apparatus schematically illustrated in FIG. 1. As shown in FIG. 1, an aqueous fiber-forming solution 102 may be prepared by dissolving suitable protein sources such as whey protein concentrate (WPC, which is approximately ⅓ whey protein) and egg albumen mixtures and xanthan gum in a suitable blending mechanism 102 to provide a fiber generating solution 104 having about 2 weight percent total solids at a xanthan/whey protein concentrate/egg white weight ratio of 1:4:4, and a pH of about 6.5.

The temperature at which the protein-gum interaction is carried out may be utilized to affect the properties of the complex. Softer and finer fibers may be obtained, if desired, when the gum and the protein are heated to or above 70° C. before the two polymers are mixed and acidified. In any event, fiber formation should best be carried out at a temperature of from about 4° C. to less than about 100° C. or the temperature at which the particular protein component(s) is denatured under the processing time conditions used.

The blended component may be progressively transferred along tanks 106, 108, and pumped by means of a suitable pump 110 through a holding complex formation tube 112, into which is also metered a suitable edible acid 114 by means of metering pump 116, to initiate anisotropic, xanthan/protein fiber formation. The formed fibers are conducted into a relatively low shearing screw type pump 118 and from there to a wash/-screen belt 120 where the fibers 122 are separated from the remaining whey solution 124 and water washed.

The whey 124 separated from the fiber composition 122 may contain inorganic salts resulting from the pH adjustment step, and may contain some unreacted protein, xanthan gum, lactose or other components.

The fibers are heated in cooker 126 to stabilize the fibers, water rinsed at ambient temperature in wash tank 128, and subjected to microfragmentation in aqueous slurry by means of high shear device 130. The washing of fibers prepared from a flavored source of protein such as whey protein concentrate is an important step in preparing bland microfragment dispersions, because undesired flavor components may be substantially removed by such washing. However, it is noted that such washing is unnecessary if only bland proteins (such as high-quality skim milk, sodium caseinate, egg white protein or mixtures thereof) are utilized in the complex formation, or if the flavor components are not objectionable in the food product which will incorporate the microfragment dispersion. The microfragmented dispersion having a solids concentration of 3-7 percent by weight is subsequently subjected to acidification from edible acid source 136 and centrifugation by centrifuge 132 to provide a microfragment-depleted supernatant 135 and concentrated, heat stable microfragmented dispersion 134 having a semisolid, creamy texture and bland taste, with a solids content in the range of from about 10 to about 25 weight percent. The acid component 136 may include alkaline earth salts to enhance centrifugation effects. Alternatively, the microfragmented aqueous dispersion 138 produced by the high shear device 130 containing from about 3 to about 7 weight percent solids, may be concentrated by thin film evaporation processes. In this regard, the dispersion 131 may be introduced into a thin film evaporator 140 such as a Model IST8-48 Turbafilm Processor evaporator of the Votator division of Weldon, Inc. of Clark, N.J. The Turbafilm processor 140 is a mechanically agitated thin film evaporator. The dispersion 131 is introduced into the top of the thin film evaporator 140, which has heated outer cylindrical walls 144 and an inner rotor. The microfragmented aqueous dispersion forms a thin film on the heated inner cylindrical wall and the rotor provides mechanical agitation of the falling product film on the thermal walls to achieve high heat and mass transfer rates with very viscous materials. The aqueous dispersion 131 to be processed enters through the inlet above the thermal section and is distributed in a thin uniform film by the centrifugal action of the rotor blades. A drying gas (which may be heated if desired) is continuously introduced into inlet 146, and moist gas containing water evaporated from the thin aqueous dispersion film is discharged at outlet 148. It is preferred that the system be internally under subatmospheric pressure, by connecting the discharge 148 to a partial vacuum system. Turbulence is imparted to the film as it spirals downward, inducing a high rate of heat transfer into the dispersion film coincident with vapor formation. The inner wall temperature is desirably maintained at a predetermined temperature in the range of from about 50° C. to about 90° C. and the dispersion processing rate and the drying gas flow coordinated to provide a concentrated aqueous dispersion having from about 10 to about 30 weight percent and preferably in the range of 15-25 weight percent total solids. The concentrated viscous dispersion 142 exits through the bottom discharge section while the evaporated water rises through the separator section and out the vapor outlet 148. The evaporator may be operated at ambient, or subatmospheric pressures.

The action of the rotor blades keeps the thin film of the aqueous microfragmented dispersion in continuous turbulent motion, preventing localized overheating. The Turbafilm processor generally operates with a rotor tip speed of approximately 30 to 50 feet per second.

A Hydrafilm plowing blade system for the Turbafilm evaporator is utilized in the embodiment 140. This plowing blade system has a notched blade design which produces a wall-scraping or film plowing action particularly suited to high viscosity materials. The plowing blade operates at moderate tip speed such that it swings outward by centrifugal force into contact with the liquid film. The combination of viscous drag, shear effect and instant release of blade pressure results in thorough agitation and film mixing.

Sufficient water is evaporated to provide an aqueous dispersion having a solids content in the range of from about 10 to about 30 weight percent solids, which dispersion may be a very high viscosity product. A rotary positive displacement pump is coupled to the discharge head of the Turbafilm processor, so that the concentrated product can be moved quickly and easily under positive pressure.

While centrifugation and thin film evaporation concentration processes have been described, other concentration methods may also be utilized. In this regard, the microfragmented aqueous dispersion may be subjected to ultrafiltration or reverse osmosis treatment utilizing a suitable permeable membrane, to remove water and low molecular weight dissolved salts and nonionic components. Diafiltration, in which fresh water is introduced into the dispersion, followed by ultra-filtration, may be used to wash the dispersion, if desired.

Although the method of FIG. 1 has been particularly described with respect to a microfragmented anisotropic dispersion of xanthan/whey protein-egg protein complex fibers, other water soluble proteins and polysaccharides as previously described, may also be utilized to prepare microfragmented dispersions in accordance with the present invention. In this regard, for example, casein such as provided by fresh skim milk, skim milk powder or as bland sodium caseinate, other vegetable proteins such as peanut protein isolate, such as provided by vegetable proteins and mixtures thereof may be utilized as the solubilized protein component to form gelled or fibrous hybrid protein complexes in accordance with the present disclosure. These complexed xanthan/protein fibers are relatively bland and may differ in color and texture. For example, xanthan/casein fibers are white and tough, while xanthan/peanut protein isolate and xanthan/soy protein fibers are somewhat softer than the xanthan/casein fibers.

Upon formation, the complexed xanthan gum-protein fibers may be readily separated from the remaining aqueous phase component in any suitable manner, as by filtration or centrifugation. For example, such fibers may be harvested by separating them from the aqueous phase, washing them with water, and pressing them in a cheese-press to provide meat-like fibers that contain generally from about 65 to about 80 weight percent moisture, and typically about 65 percent by weight moisture.

The fibers of xanthan gum—soy protein complex tend to soften and become slightly slimy above pH 5.5 perhaps because the gum-protein complex is very negatively charged and has more charge characteristics of xanthan gum at or above pH 5.5. An important feature of preferred microfragmented dispersions in accordance with the present invention is that substantial stability and other improved properties may be provided in the microfragmented xanthan/protein dispersion if the preformed fibers are subjected to a heat treatment, such as by boiling in water, for a time sufficient to denature at least about 50 percent of the protein components. It appears that such treatment denatures the protein or the complex as a whole so as to prevent the dissociation and/or dissolution of the gum-protein complex.

Heat treatment of the protein-gum complex not only results in stabilization of the complex to retain its firmness, but may also be utilized to pasteurize the complex. In addition, by varying the temperature and the time of heating, different degrees of firmness and stability of the complex can be obtained, as desired.

The protein complexing agent may also comprise suitable hydrocolloids in addition to xanthan gum. In this regard, for example, carob gum is very inexpensive compared to xanthan gum and is demonstrated to have strong interaction with xanthan gum. Fibrous ternary complexes of soy protein isolate, xanthan gum and carob gum may be prepared by mixing the two gums to form an aqueous suspension, and subsequently adding the desired protein.

The moisture content of the anisotropic, hydrated fibers will generally be in the range of 60 to about 90 percent by weight. However, the fibers, as precipitated, or after heat stabilization may be substantially reduced in moisture content to provide a low moisture fiber product which retains its fiber integrity. Fiber compositions having reduced moisture content may be provided which have longer shelf life and easier handling for shipping and storage. The dried complex may be readily rehydrated by contact with water.

The microfragmented xanthan/protein complex dispersion may be utilized in a wide variety of food products. The dispersions find particular utility in frozen desserts, dressings, spreads, baked goods, processed cheese and cheese analog products, cultured dairy products, comminuted meat products and analog comminuted meat products such as low fat hot dogs and luncheon meats, as well as sauces, soups and gravies.

Figure 13:
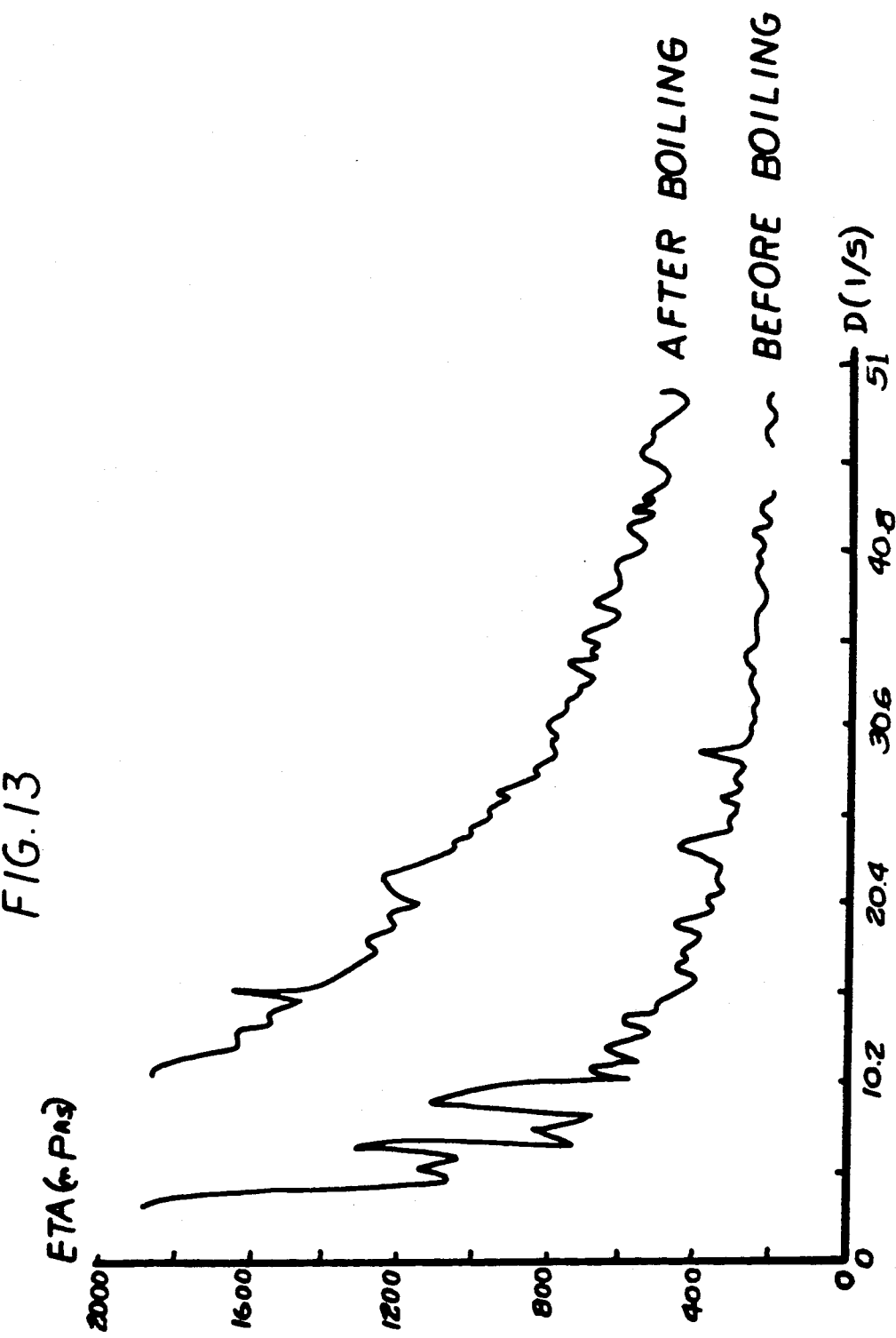
FIG. 13 is a graphical representation of the Haake viscosity of another embodiment of a partially denatured microfragmented xanthan/protein complex dispersion both before and after the heat treatment of the dispersion at its boiling point.

While microfragmented ionic polysaccharide/protein complex dispersions such as xanthan/protein complex dispersions of high quality may be prepared by methods such as illustrated in FIG. 1, other production methods may also be desirable. In this regard, illustrated in FIG. 13 is a schematic diagram illustrating a specific embodiment of a continuous method for manufacture of xanthan/protein complex microdispersions in which the solubilized xanthan and protein components are continuously conducted through a zone of high specific turbulent dissipation rate under complex forming conditions.

Figure 14:
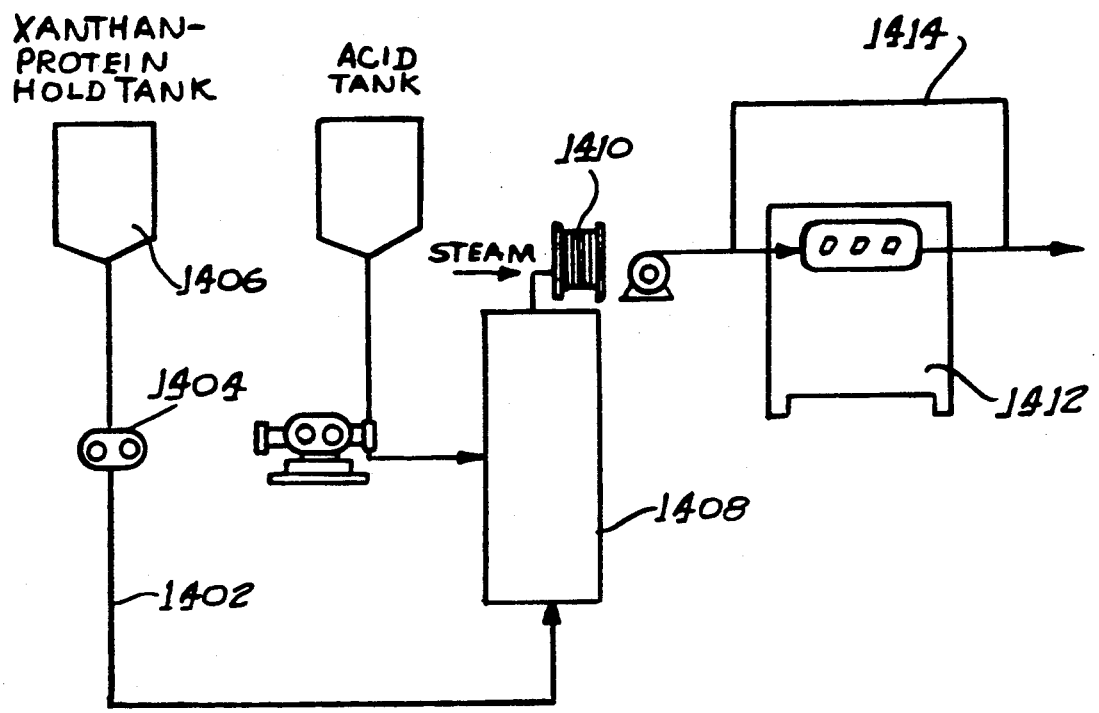
FIG. 14 is a schematic diagram illustrating a specific embodiment of a continuous method for manufacture of xanthan/protein complex microdispersions in which the solubilized xanthan and protein components are continuously conducted through a zone of high specific turbulent dissipation rate under compl

As shown in FIG. 14, in accordance with continuous processing methods, a continuous stream 1402 of a xanthan/protein solution having a xanthan to protein weight ratio in the range of from about 1:1 to about 1:20 is provided by metering pump 1404 from holding tank 1406 and into a shearing zone 1408 of high turbulent energy dissipation rate. The shearing zone may be a high pressure, fluidic, acoustic or mechanically driven mill zone, such as a colloid or pin mill high shear zone. Within the zone, the ionic polysaccharide/protein solution such as a xanthan/protein solution is acidified in order to initiate the formation of a complex precipitate under high shear conditions. The fragmented or microfragmented dispersion conducted from the high shear mixing zone may be heated to a denaturation temperature for the complex by heat exchanger 1410 and pumped under high pressure through one or more high pressure cell disrupter homogenizers 1412. As indicated, a plurality of high pressure homogenizers may be connected in series with charge dispersion recycle 1414 to achieve a desired degree of microfragmentation. An advantage of the method illustrated in FIG. 14 is that it may utilize relatively high solids content of the complex such as a xanthan/protein complex, so that the finished dispersion may be used directly without a concentration step.

Figure 15:
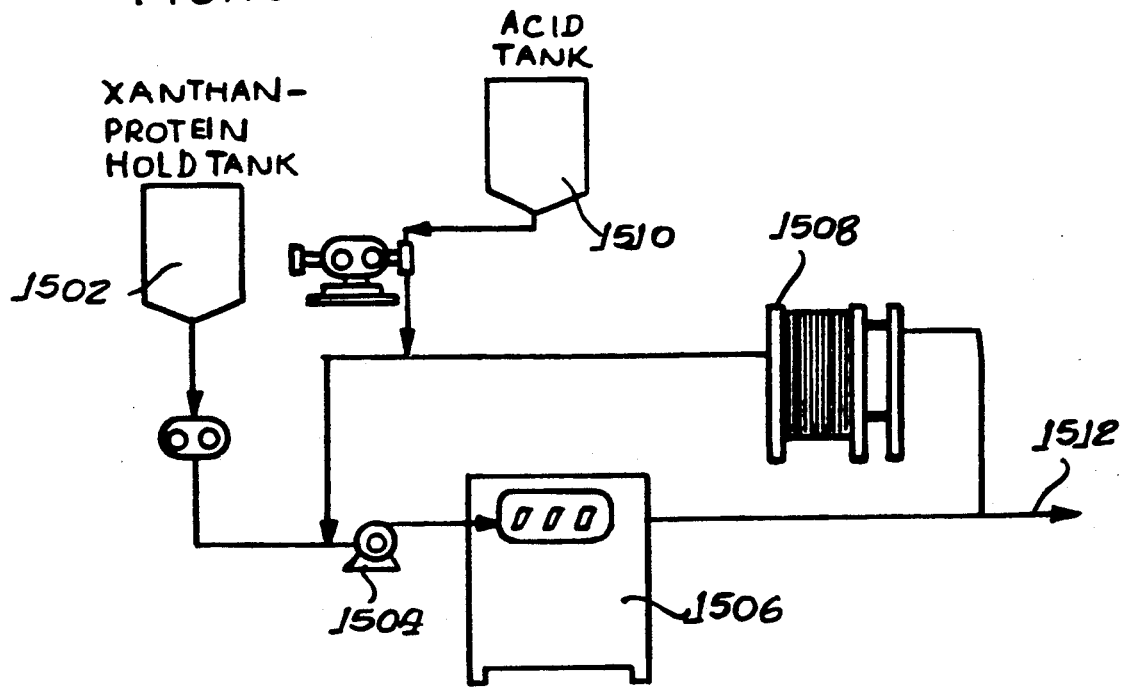

Similarly illustrated in FIG. 15 is a schematic diagram illustrating a specific embodiment of a batch-type method for manufacture of ionic polysaccharide/protein dispersions such as xanthan/protein complex microfragment dispersions in which the solubilized xanthan (or other ionic polysaccharide) and protein components are conducted through a zone of high specific turbulent dissipation rate as complex forming conditions are developed in the batch undergoing processing.

As shown in FIG. 15, a xanthan/protein solution prepared in a holding tank 1502 may be pumped initially into a homogenizer circuit including a pump 1504, a high pressure fluidic homogenizer 1506, a heat exchanger and storage tank 1508. After charging the circuit with the xanthan/protein solution, the solution is conducted through the homogenizer shear device 1506 while the pH is gradually lowered by metering of an acid stream from acid tank into the fluidic circuit. The heat exchanger 1508 is utilized to maintain a desired processing temperature. The batch processing illustrated in FIG. 14 may also be utilized with relatively high concentrations of xanthan gum and protein. Upon completion of the microfragmentation, the finished xanthan/protein complex dispersion may be discharged from outlet 1512 to begin the production process for incorporation into a variety of food products.

Xanthan gum is relatively expensive, and may have limited efficiency in complexing certain protein components, thereby involving relatively higher amounts of xanthan gum in complex formation and potentially leaving uncomplexed protein components in the fiber whey solution. The present invention is also directed to methods for manufacturing edible, stable polysaccharide/protein complex carboxymethyl cellulose fiber compositions which have a fibrous body and texture, through the use of high molecular weight, highly substituted food grade carboxymethyl cellulose as a protein complexing component. Such materials may be used to prepare microfragmented ionic polysaccharide/protein complex aqueous dispersions in accordance with the present invention.

In accordance with various aspects of the present disclosure, methods for edible carboxymethyl cellulose/protein fiber manufacture are provided comprising the steps of providing an aqueous protein fiber generating solution, as previously described.

The fiber generating solution for carboxymethyl cellulose/protein fiber generation further includes a solubilized high molecular weight, highly substituted food grade carboxymethyl cellulose polymer component. By high molecular weight, highly substituted food grade carboxymethyl cellulose is meant cellulose, which is a poly (glucose) saccharide, having an average degree of substitution of carboxymethyl groups on the hydroxyl groups of the anhydro-D-glucopyranose units of the cellulose in the range of from about 0.8 to about 1.0 per anhydro-D-glucopyranose unit, and preferably about 0.9 and having a weight average molecular weight of at least about 100,000 daltons. Commercial food grade sodium carboxymethyl cellulose may have an average degree of carboxymethyl substitution between 0.4 and 0.9; however, it has been determined that carboxymethyl cellulose having an average degree of carboxymethyl substitution of 0.7 or less does not readily form fibers under the conditions of the present methods. While a degree of substitution of up to 3.0 may be provided, materials having a degree of substitution over 0.9 are not approved for food use by the U.S. Food and Drug Administration. The properties of sodium carboxymethyl cellulose can be controlled by varying the uniformity of substitution, the degree of substitution and the molecular weight. A discussion of the physical and chemical properties of various carboxymethyl cellulose components may be found in Industrial Gums, R. L. Whistler, Ed., Academic pres, N.Y. (1973), p. 643.

As indicated, carboxymethyl celluloses having a relatively low degree of carboxymethyl group substitution do not provide fibrous protein complexes in accordance with the present invention. However, by utilizing carboxymethyl cellulose having a degree of substitution in the range of from about 0.8 to about 1.0, and more preferably about 0.9 stable fibrous complexes may be prepared in accordance with the method aspects of the present invention, which may be utilized to contribute a fibrous or meat analog characteristic to food products, or which may be microfragmented after stable fiber formation to provide smooth, creamy aqueous microfragment dispersions, as previously described.

A relatively high molecular weight is also believed to be an important factor in complex fiber formation. In this regard, carboxymethyl cellulose (albeit not a food grade material), having a degree of substitution of about 1.2, but a relatively low molecular weight of 70,000 daltons has failed to form fibers under these conditions which produce fibers using the appropriate carboxymethyl cellulose as previously described.

The protein fiber generating solution may be provided in any suitable manner, as by preparing and subsequently combining separate protein component and highly substituted food grade carboxymethyl cellulose solutions, and by initially preparing a solution comprising both components. Further in accordance with the present disclosure, the fiber generating solution should contain a solubilized protein component and highly substituted carboxymethyl cellulose component in a particular range, and in this regard, the total solubilized protein and highly substituted carboxymethyl cellulose components should be in the range of from about 0.1 weight percent to about 10 weight percent, and preferably from about 4 to about 6 weight percent based on the total weight of the aqueous fiber generating solution. Carboxymethyl cellulose is typically less viscous than xanthan gum, and may be used in higher concentration under various conditions while still providing fibrous complexes.

The aqueous fiber forming solution may further include other components, including other dissolved or suspended protein components, flavoring agents, preservatives and hydrocolloids, as previously described.

The complex forming solution may also include water solubilized, substantially nonionic edible polysaccharides such as dissolved starch, solubilized agar and agaroids, dissolved guar gum, dissolved carob gum, water soluble dextrans, etc. in the amounts, and using the procedures as previously described. Such nonionic polysaccharide components may become entangled and enmeshed with the ionic polysaccharide/protein complex which is formed upon pH adjustment of the complex forming solution. It is desirable that the complex contain at least about 15 weight percent of solids, and preferably for a variety of uses, at least about 20 weight percent solids, and the amount and type of nonionic polysaccharide may be adjusted to provide a desired solids level.

Further in accordance with the method, the pH of the fiber generating solution is adjusted to a pH at which the components form a complex, which is preferably within about 2 pH units of an optimum isoelectric pH for the desired complex, to form a fibrous protein-polysaccharide complex under conditions of mixing of the fiber forming solution, as previously described. In this manner, hybrid protein complexes may be formed which have a fibrous, meat-like texture. The fiber formation may occur over a range of pH approaching the isoelectric point of the particular highly substituted carboxymethyl cellulose/protein complex. In this regard, for example, for a high molecular weight, highly substituted carboxymethyl cellulose/egg protein sodium caseinate complex, fiber formation may begin near neutral pH and increases as the pH is adjusted to or near to the isoelectric point of the complex, which typically may be in the range of from about 1 to about 5.

The texture of the carboxymethyl cellulose/protein complex fibers may be controlled by varying the ratio of the fiber forming polysaccharide component versus the protein component. The desired fiber forming polysaccharide to protein weight ratio is within the range between 1:2 and 1:15, and more preferably in the range of from about 1:4 to about 1:10. The adjustment of pH to form fibers from the highly substituted carboxymethyl cellulose/protein mixture may be carried out in a variety of ways, as previously described. The fibrous complex reaction is completed or maximized when the highly substituted carboxymethyl cellulose/protein mixture is adjusted to a pH at which the electrophoretic mobility of a desired highly substituted carboxymethyl cellulose/protein mixture is substantially zero.

The shape and size of the highly substituted carboxymethyl cellulose/protein complex fibers may be controlled by the degree of shear or mixing applied to the fiber forming solution during pH adjustment.

After formation of the highly substituted carboxymethyl cellulose/protein complex fibers, it is important to heat the fibers to stabilize them in fiber form so that they are capable of withstanding a broad range of pH, mechanical shear and ionic conditions, as well as stability in interaction with a broad range of other food components. Such stabilization may be carried out by heating the fibers to a temperature of at least about 70° C. for at least 30 seconds or equivalent time temperature relationships, and more preferably at least about 95° C. for at least about 5 minutes to denature the protein within the complex at least about 40 percent, and more preferably at least 90% to stabilize the complex. Such denaturation may be readily measured by differential scanning calorimetry ("DSC"). Desirably the fibers will be heated to a temperature of about 100° C. as by boiling in water or steam injection, for at least about 5 minutes, (e.g., 3–5 minutes) to substantially fully denature the protein component of the complex. The heat dependence of denaturation will typically vary with pH, with the complex being easier to denature at lower pH values. By "denatured" is meant loss of native secondary and tertiary structure, such as measured by DSC. Denaturation may result in substantial disulfide crosslinking, as measured by gel electrophoresis, which will also help stabilize the complex.

In addition to the high molecular weight carboxymethyl cellulose/protein fibrous complexes previously described, it has also been discovered that fibrous complexes may be prepared from lambda carrageenan and solubilized protein solutions. Such fibers may be used in food products directly as fibers, or may be subjected to high shear microfragmentation processing such as previously described.

In accordance with these aspects of the present disclosure, methods for edible lambda carrageenan/protein fiber manufacture are provided comprising the steps of providing an aqueous protein fiber generating solution comprising a solubilized edible protein polymer component and a lambda carrageenan component.

Such a protein fiber generation solution may, for example, comprise a solubilized edible protein polymer component as previously described.

As indicated, the fiber generating solution for carrageenan/protein fiber generation includes a solubilized food grade lambda carrageenan. Carrageenans are structural polysaccharides of red sea plants such as *Chondus crispus* and *Gigartina stellata*. There are several varieties of carrageenans which may be extracted from red sea plants for food use, including kappa, lambda and iota carrageenans. Carrageenans are strongly charged anionic polyelectrolytes of high molecular weight and regular configuration which have anionic sulfate ester groups regularly disposed along a polysaccharide backbone. Lambda carrageenan has a general linear structure having substantially three pendant sulfate groups for each two monosaccharide groups along the polymer backbone:

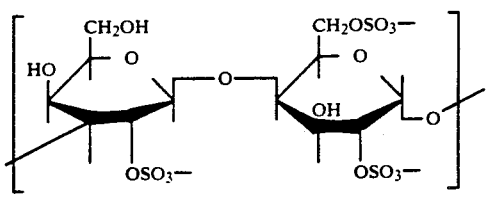

Kappa carrageenan and iota carrageenan have significantly less ester sulfate than lambda carrageenan, with iota carrageenan having approximately one sulfate group per monosaccharide group, and kappa carrageenan having approximately one sulfate group for each two monosaccharide groups along the backbone. Kappa carrageenan and iota carrageenan alone do not form fiber complexes from protein solutions in accordance with the present invention. A discussion of the physical and chemical properties of lambda carrageenan may be found in Industrial Gums, R. L. Whistler, Ed., Academic Press, N.Y. (1973).

The lambda carrageenan component when fiber complex generation is desired, will desirably contain at least about 50 weight percent lambda carrageenan based on the total weight of iota, kappa and lambda carrageenan, and more preferably at least about 60 weight percent lambda carrageenan, based on the total weight of the carrageenan. The Lactarin PS189 product of FMC Corporation, which contains about 50 percent lambda carrageenan, 20–30 percent kappa carrageenan and 20–30 percent dextrose by weight, has been successfully utilized to provide fibrous complexes as described herein. The Viscarin GP109 product (50–60% lambda and 40–50% Kappa) and the RE9345/6 products of FMC Corporation (100% lambda) are also examples of lambda carrageenan products.

In aqueous solution, the highly charged mutually repelling sulfate ester side chains, which are disposed along the polysaccharide backbone of lambda carrageenan, are believed to provide a relatively linear structure, which is further believed to be an important factor in the provision of fiber complexes in accordance with the present invention. A relatively high molecular weight is also believed to be an important factor in complex fiber formation.

The lambda carrageenan component may be used with highly substituted, highly molecular weight carboxymethyl cellulose components, xanthan gum or mixtures thereof, or with other anionic polysaccharide gums in amounts which do not prevent fiber formation. When used with other potential complex fiber-forming polysaccharides such as xanthan gum, and/or carboxymethyl cellulose, the relative proportions of these components may vary over a wide range. The carboxymethyl cellulose or other anionic polysaccharides may be of "border line" fiber forming capability, with the lambda carrageenan, xanthan gum and/or the highly substituted, high molecular weight carboxymethyl cellulose component contributing a strong fiber forming capacity. When used with other non-fiber forming polysaccharides such as iota and kappa carrageenan, carboxymethyl cellulose, pectins and alginates, which alone do not self-assemble under appropriate conditions with proteins to form fibers, the proportions of fiber-forming polysaccharide such as lambda carrageenan to the non fiber-forming polysaccharide should be sufficient to provide spontaneous fiber formation.

When the lambda carrageenan is dissolved with non fiber-forming anionic polysaccharides in the fiber-forming solution, the lambda carrageenan should desirably comprise at least about 50 weight percent of the anionic polysaccharide components, and more preferably at least about 75 percent.

The protein fiber generating solution may be provided in any suitable manner, as by preparing and subsequently combining separate protein component and lambda carrageenan, and by initially preparing a solution comprising both components. Further in accordance with the present disclosure, the fiber generating solution should contain a solubilized protein component and lambda carrageenan in a particular range, and in this regard, the total solubilized protein and lambda carrageenan components should be in the range of from about 0.1 weight percent to about 10 weight percent, preferably from about 2 to about 8 weight percent, and more preferably from about 4 to about 6 weight percent based on the total weight of the aqueous fiber generating solution.

The aqueous fiber forming solution may further include other components, including other dissolved or suspended protein components, flavoring agents, preservatives and hydrocolloids.

As previously described, the complex forming solution may also include water solubilized, substantially nonionic edible polysaccharides such as dissolved starch, solubilized agar and agaroids, dissolved guar gum, dissolved carob gum, water soluble dextrans, water or alkali soluble edible grain bran and/or hemicellulose constituents such as solubilized wheat gum, solubilized wheat bran, solubilized oat bran and solubilized corn bran constituents, as well as mixtures of such nonionic polysaccharides.

As previously described, starch may desirably be included in the complex forming solutions, and in the precipitated complexes, in amounts of from about 1% to about 75% by weight, based on the total weight of the polysaccharide/protein complex on a dry basis. For various uses, the starch will preferably be included in the precipitated complexes in an amount in the range of from about 25 percent to about 60 percent by weight, based on the total weight of the complex on a dry basis.

Further in accordance with the method, the pH of the fiber generating solution is adjusted to a pH at which the components form a complex, which is preferably within about 2 pH units of an optimum isoelectric pH for the desired complex, to form a fibrous protein-polysaccharide complex under conditions of mixing of the fiber forming solution. In this manner, hybrid protein complexes may be formed which have a fibrous-meat like texture, as previously described. The fiber formation may occur over a range of pH approaching the isoelectric point of the lambda carrageenan/protein complex. In this regard, for example, for a high molecular weight lambda carrageenan/egg white protein/-sodium caseinate complex, fiber formation may begin at moderately high acidic pH values and increases as the pH is adjusted to or near to the isoelectric point of the complex, which typically may be in the range of from about 1 to about 5. The fiber formation is spontaneous and does not require the use of spinning equipment. Moreover, like various other fibers described herein, the fibrous network synereses (exudes water), which is desirable in the minimization of energy intensive drying steps.

The texture of the lambda carrageenan/protein complex fibers may be controlled by varying the ratio of the fiber forming polysaccharide component versus the protein component. The desired fiber forming polysaccharide to protein weight ratio is within the range between 1:2 and 1:15, and more preferably in the range of from about 1:4 to about 1:10.

The adjustment of pH to form fibers from the lambda carrageenan/protein mixture may be carried out in a variety of ways, as previously described.

The fibrous complex reaction is completed or maximized when the lambda carrageenan/protein mixture is adjusted to a pH at which the electrophoretic mobility of a desired lambda carrageenan/protein mixture is substantially zero.

After formation of the lambda carrageenan protein complex fibers, it is important to heat the fibers to stabilize them in fiber form so that they are capable of withstanding a broad range of pH, mechanical shear and ionic conditions, as well as stability in interaction with a broad range of other food components. Such stabilization may be carried out by heating the fibers to a temperature of at least about 70° C. for at least 30 seconds, and more preferably at least about 95° C. for at least about 5 minutes to denature the protein within the complex at least about 40 percent and more preferably at least about 90 percent, and stabilize the complex. Desirably the fibers will be heated to a temperature of about 100° C. as by boiling in water or steam injection, for at least about 5 seconds to substantially fully denature the protein component of the complex. The heat dependency of denaturation will typically vary with pH, with the complex being easier to denature at lower pH values. By "denatured" is meant that the protein has lost its native secondary and tertiary structure, such as measured by differential scanning calorimetry ("DSC"). Denaturation may result in substantial disulfide cross-linking, such as measured by gel electrophoresis, which will also help stabilize the complex.

Figure 17:
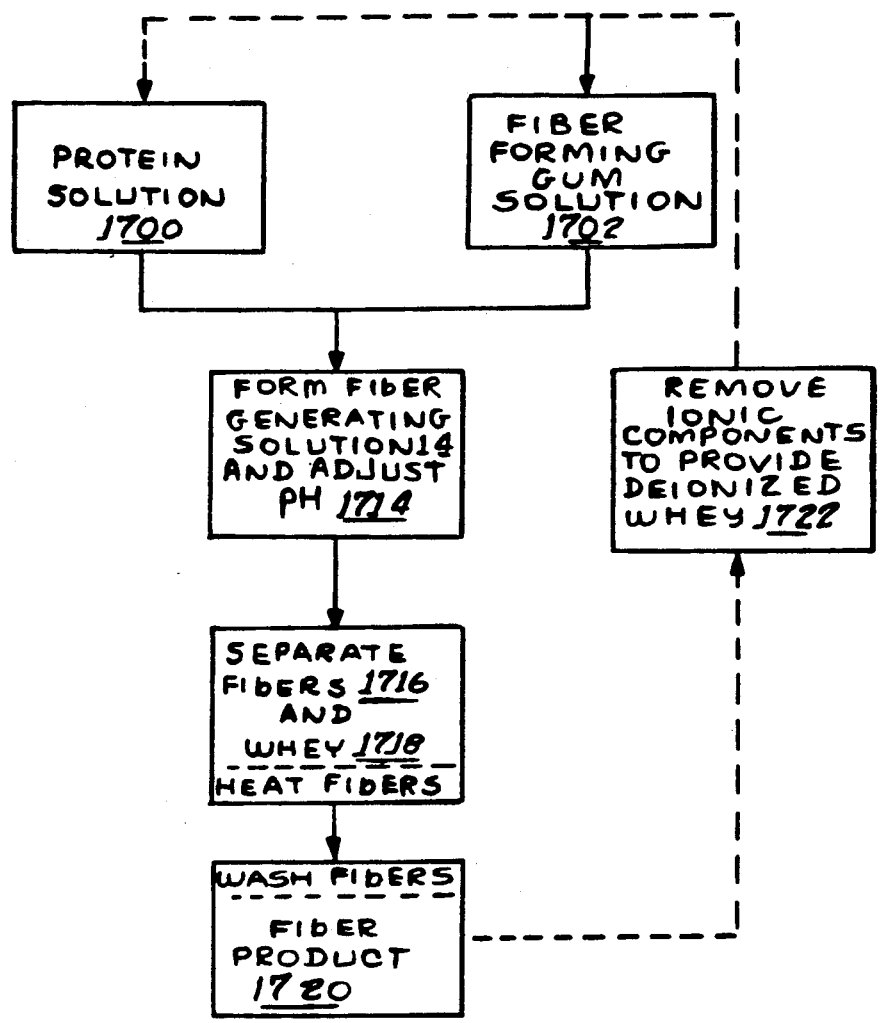

A specific example of preparation of lambda carrageenan (or high molecular weight carboxymethyl cellulose)/protein fibers for subsequent high shear microfragmentation is shown in FIG. 17. An aqueous protein solution such as a mixture of undenatured egg white and undenatured sodium caseinate 1700 is provided at a protein concentration of 8.0 weight percent. Similarly, a lambda carrageenan solution 1702 is prepared by dissolving lambda carrageenan in water, at a level of about 1.0 weight percent. The solutions 1700, 1702 may be combined in desired ratio to provide a fiber generating solution 1714 having about 4 weight percent protein and 0.5 weight percent lambda carrageenan at a pH of about 6.5. Alternatively, the components may be combined directly with water to form the solution 1714. The pH adjustment may be carried out by addition of hydrochloric acid to provide fibers 1716 and a whey phase 1718 which may be separated by appropriate means.

The weight percent total solids of the fiber generating lambda carrageenan/protein solution 1714 in water may typically be varied within the range of from about 0.1 weight percent to about 8 and preferably from about 0.25 to about 4. The water content of the fiber generating solution (as well as the ionic strength) is important for the complexed polymers to form a fibrous network. Fiber formation should desirably be carried out at a temperature which is less than the denaturation temperature of the protein component(s), and preferably from about 10° C. to about 50° C.

The whey 1718 separated from the fiber composition 1716 may contain inorganic salts resulting from the pH adjustment step, and may contain a small amount of lambda carrageenan or other components, particularly of a blend of lambda carrageenan and another less efficient anionic polysaccharide is used as the anionic complexing agent. However, the lambda carrageenan is a highly efficient complexing agent, which minimized uncomplexed protein and/or lambda carrageenan in the whey component. The inorganic salts may be removed, at least in part by appropriate means such as through the use of selectively permeable membranes, electrodialysis and/or ion exchange resins, to provide a deionized whey 1722, which may be utilized in the provision of the protein and lambda carrageenan solutions 1700, 1702.

Various proteins utilized in aqueous protein/gum complexes in accordance with the present disclosure may contribute some degree of off-flavor or undesirable flavor components to complexes even though the complexes are substantially blander than the protein, while other proteins such as high quality skim milk protein and bland, high quality sodium caseinate may have a very low flavor profile. For example, whey protein sources such as whey protein concentrate may contribute fermentation or other flavor components which may impart undesirable flavors to polysaccharide complex dispersions formed utilizing such whey protein concentrate materials. As described hereinabove, fibers or nonfibrous complex precipitates formed from such whey protein or other flavored protein and a polysaccharide may be washed in water to remove such undesirable flavor components before microfragmentation processing, to provide an extremely bland microfragmented or microparticulate aqueous dispersion. However, it may be desirable to form dispersions directly without an intermediate washing step for such materials. Accordingly, it is also contemplated herein that the protein components may be pre-cleaned by precipitation and redissolution procedures, followed by re-precipitation in the preparation of an aqueous complex dispersion. In this regard, such a clean-up method may be carried out by forming a solution of a solubilized protein as previously described such as whey protein, casein, egg white protein, vegetable protein or mixtures thereof, with an ionic polysaccharide as previously described, such as xanthan, pectin, carrageenan, gellan, carboxymethyl cellulose, chitosan and mixtures thereof at a weight ratio of protein/gum in the range of from about 2:1 to about 15:1 and preferably in the range of from about 6:1 to about 10:1, and a solids content of less than 20 weight percent (e.g., 5 weight percent) of the solution at a suitable pH for dissolution (e.g., pH 6-8), to form a precleaning solution. Absorbing material such as activated carbon and absorbing clays may be mixed into the precleaning solution to adsorb undesirable flavor or color components if desired. The precleaning solution may be filtered or centrifuged to separate any undissolved components, including such adsorbing materials with associated components.

Also in accordance with the method, the pH of the precleaning solution is subsequently adjusted to precipitate a protein/polysaccharide complex without denaturing the protein. In this regard, the pH may be adjusted to a pH in a precipitation range about the isoelectric point of the polysaccharide/protein complex in an appropriate manner, such as by addition of edible acid for an anionic polysaccharide-protein precleaning solution, by addition of edible base to a cationic polysaccharide/protein precleaning solution, or electrodialysis procedures to similarly adjust the pH.

For anionic polysaccharide/protein precleaning solutions, the initial precipitation may be carried out by addition of acid including addition of edible acid such as HCl, acetic acid, carbon dioxide, lactic acid and mixtures thereof, where appropriate and where such addition causes precipitation, and/or by electro-deionization techniques such as electrodialysis which are applied to remove cations from the solution to lower the pH. Precleaning solutions of ionic polysaccharide and protein may also be prepared under acidic conditions where appropriate, with raising of the pH to or near the isoelectric point being utilized for precipitation.

The precipitated protein/polysaccharide complex is separated from the syneresed aqueous component of the solution (and optionally washing the precipitate) without denaturing the protein. Such separation may be carried out by centrifugation, filtration, and/or pressing of the precipitate. Optionally, the precipitate may be washed with clean water. In this step, flavor components which are not combined with the precipitated complex are removed with the syneresed liquid, and any wash water.

The precipitated ionic polysaccharide/protein complex is subsequently redissolved in aqueous solution by adjusting the pH to a pH at which the precipitated complex redissolves (e.g., pH 6–8 for an anionic gum-protein complex), to form an aqueous, flavor purified, polysaccharide/protein complex forming solution. Redissolution should be carried out prior to any heating of the complex which would denature the material and prevent redissolution of the complex. The pH of the aqueous, flavor purified, ionic polysaccharide/protein complex forming solution is subsequently adjusted such as by reducing the pH to a protein/gum complex precipitation range, to form, directly or indirectly, an aqueous complex dispersion.

The precipitation/washing/redissolution procedure may be carried out several times, if desired. The redissolved protein/gum solution may desirably have a total protein/gum solids content in the range of from about 2 to about 25 weight percent and may be used to directly form aqueous protein/gum complex dispersions such as in the continuous processing apparatus.

By combining a pre-cleaning treatment with an in-situ acidification/homogenization process at a desired solids content in the 10–20 weight percent range, an inexpensive continuous process for producing a flavor-free aqueous protein/gum dispersion from a variety of protein sources may be provided.

For example, a "pre-cleaned" solution having about 5 weight percent protein/gum solids content may be continuously acidified in a (preferably two stage) homogenizer, "microfluidizer" or "cell disruptor" stream at a point immediately preceding the homogenizer orifice to produce an aqueous dispersion. A fluidic ultrasonic homogenization device such as a Sonolator (e.g., as described in U.S. Pat. No. 4,765,194), in which the output jet impinges on a knife edge to generate vortices which promote anisotropic mixing and anisotropic, elongated protein/polysaccharide particle formation, may also be utilized. Such direct acidification may be carried out at relatively high solution solids content (e.g., from about 15 to about 20 weight percent solids), which produces a high solids content dispersion without a subsequent concentration step such as centrifugation or thin film evaporation.

Figure 18:
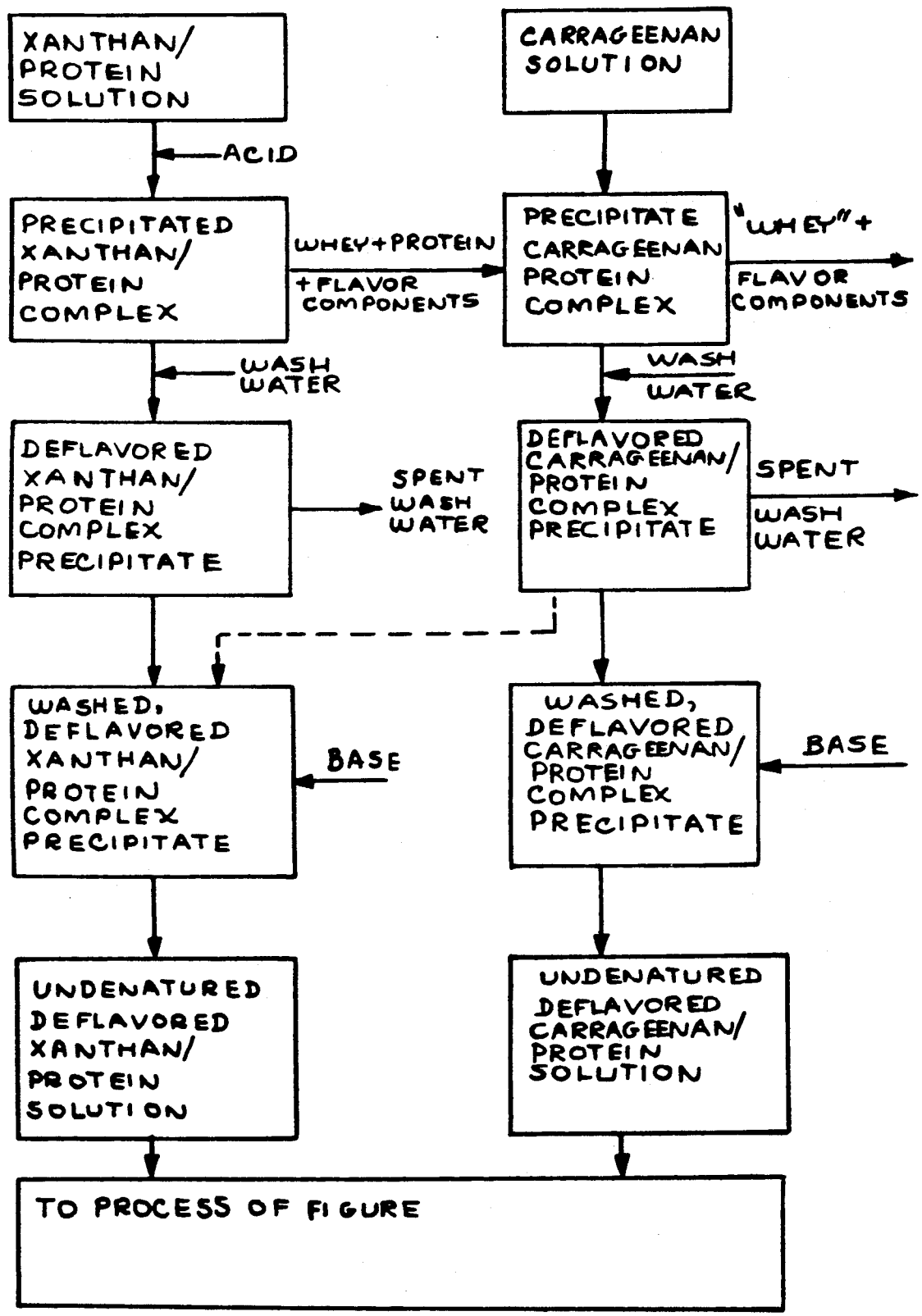
Figure 19:
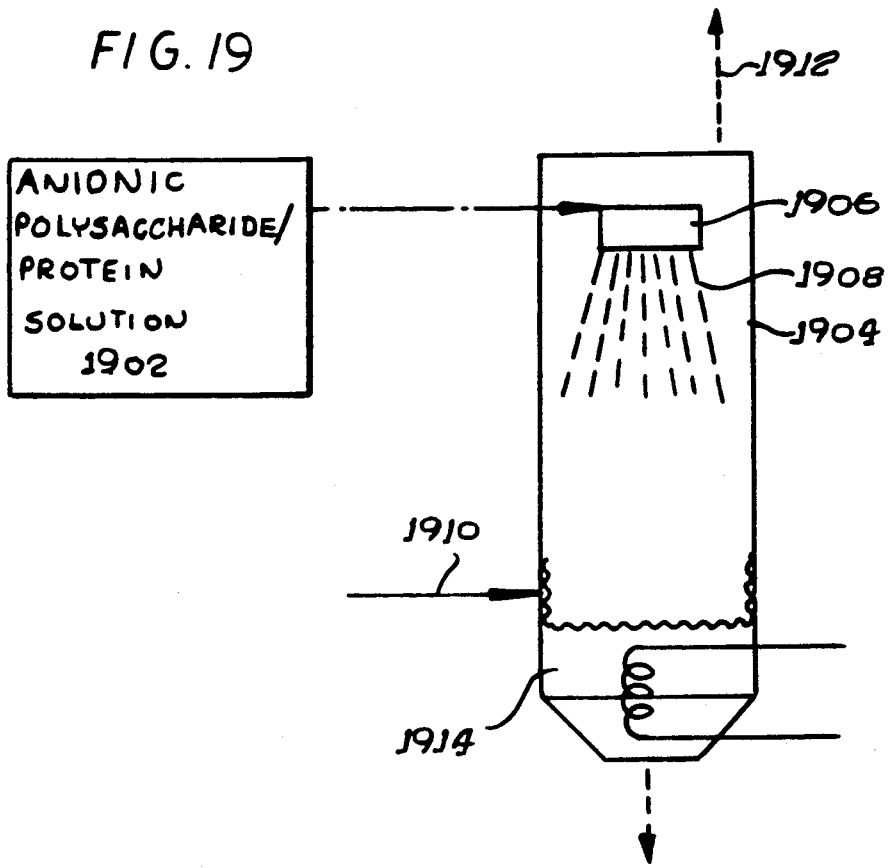
Figure 20:
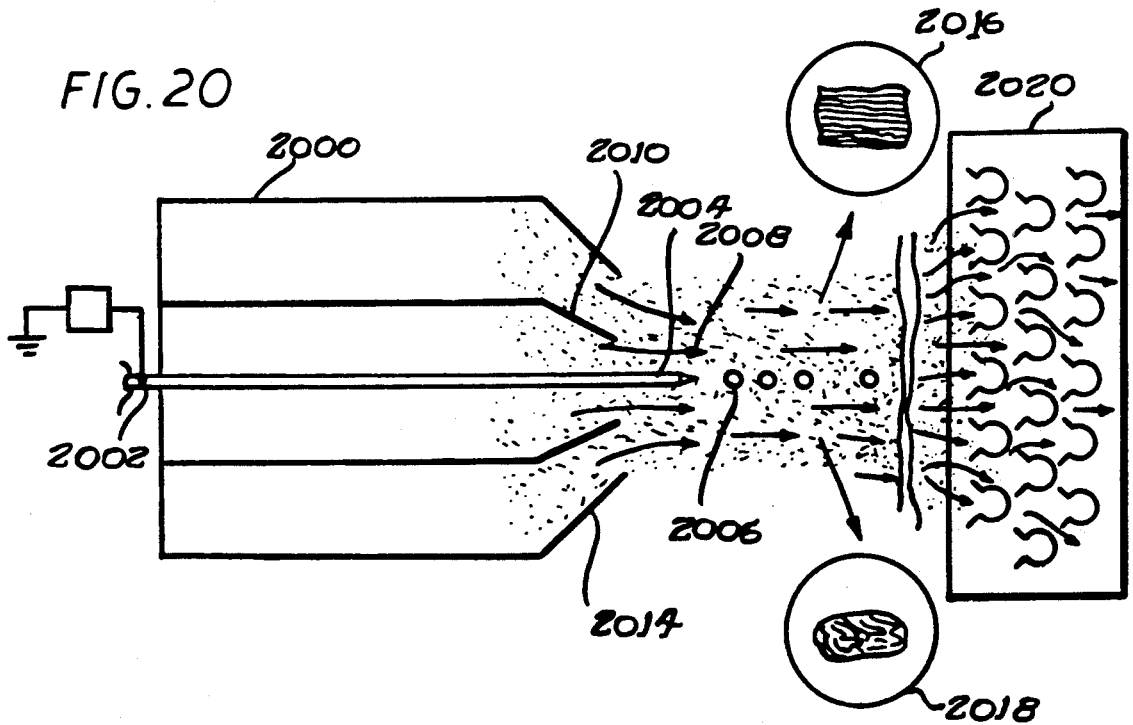

When using xanthan gum as the ionic polysaccharide component of the precleaning solution, it is noted that the syneresed solution may contain protein components which are not complexed with the xanthan gum. As shown in FIG. 18, such protein components may be recovered by addition of another complexing gum, such as gellan, carrageenan (i.e., kappa and/or lambda), and/or carboxymethyl cellulose which complexes with the remaining protein components. These precipitates may also be washed and redissolved by pH adjustment as previously described, to form complex-generating solutions, separately or in combination with the xanthan/-protein complex precipitate component. The precleaned ionic polysaccharide/protein solutions may be used to prepare bland gel and fibrous microfragmented complexes, as previously described.

While this procedure has been particularly described for the formation of protein/anionic gum complexes, similar procedures may be utilized for protein/cationic gum complexes such as egg white/whey protein complexes with cationic gums such as chitosan.

The various ionic polysaccharide/protein complex fibers and aqueous dispersions may be provided which have excellent stability in food products at high temperature. However, it may be desirable to provide aqueous microfragment dispersions which present a substantial physical and textural change with temperature. In this regard, the present disclosure is also directed to aqueous dispersions of thermoreversible ionic polysaccharide/-protein complexes which are in precipitated, complexed gel form below a solidification temperature, which depends on the composition of the complex, and which redissolve above the solidification temperature. Desirably, the solidification temperature may be selected by proper formulation of the thermoreversible gel and consideration of the interaction conditions (e.g., pH, ionic species) of the food product in which the aqueous dispersion is utilized, to occur within a desired temperature range to impart unique characteristics to the food product.

For example, an aqueous dispersion of a thermoreversible ionic polysaccharide/protein complex gel utilized as a bulking agent or fat substitute in a food product such as a frozen dessert in accordance with the present disclosure, may have a solidification temperature in the range of 70°-95° F. so that it may give the sensation of melting in the mouth of the consumer in a manner similar to milkfat.

Similarly, low fat process cheeses, analog cheeses and natural cheeses which employ the aqueous dispersion as a fat substitute may utilize an aqueous dispersion of a thermoreversible gel having a solidification temperature in the range of 100° F.-160° F. to provide improved melting characteristics, despite reduction or absence of milkfat in the cheese product.

The thermoreversible gel should not interact below the solidification temperature to form a gel, so that an aqueous dispersion of the thermoreversible gel particles remains a discrete dispersion in the food product in which it is incorporated so long as the temperature is below the solidification temperature.

It is also desirable that the thermoreversible gel particles of the aqueous dispersion have a solids content of at least about 5 weight percent, and preferably in the range of from about 15 to about 50 weight percent solids. In this regard, it is noted that an aqueous dispersion of particles of a thermoreversible gel having a solids content of about 45 weight percent may form a dispersion of about two thirds by volume continuous aqueous phase, and one third by volume of the dispersed, discrete gel particles, which has an overall total solids content of about 15 weight percent.

Kappa carrageenan and ionic agaroids are desirable thermoreversible gel forming ionic polysaccharides. Gelatin is a particularly desirable protein component for complex formation with kappa carrageenan. Thermoreversible kappa carrageenan/gelatin gels described as "C-Gel 35 Products" are described in U.S. Pat. No. 4,684,553, which is incorporated by reference herein. Desirably, C-Gel products may be prepared employing from about 1 to about 4 weight percent of kappa carrageenan, and from about 4 to about 24 weight percent gelatin in water to provide a kappa carrageenan to gelatin ratio in the range of from about 1:6 to about 1:1 on a dry basis. Other components such as flavoring agents, other polysaccharides, and other proteins may be included in the C-Gel product.

The thermoreversible C-Gel may be prepared by dissolving the carrageenan and gelatin components in the desired amount of water at an elevated temperature (e.g., 160°-175° F.) and cooling the solution to form a gel having a solids content of at least about 5 and preferably at least 10 weight percent. The gel may be ground at a temperature below the solidification temperature to form gel particles, which may be mixed with additional water, and subjected to high shear microfragmentation such as by multiple passes (e.g., at least 4) through a homogenizer or cell disruptor as previously described at a homogenization pressure differential of at least about 5,000-20,000 psi, at a temperature below the solidification temperature of the gel to produce an aqueous microfragmented dispersion of thermoreversible gel particles having a largest dimension less than about 15 microns, preferably less than about 10 microns, and more preferably less than about 5 microns. The resulting aqueous dispersion may be used alone, or with another fat substitute material, as a fat substitute or bodying agent in a wide variety of food products such as frozen desserts, and cheeses in which reduced viscosity or body is desired at an elevated temperature. For example, the dispersion may be introduced into the skim or low fat milk used in a cheese make at a level of 2-30 weight percent, based on the total solids content, prior to fermentation to produce a cheese product, or may be blended with a sour cream or cream cheese product to provide a reduced calorie product.

Such thermoreversible microfragment dispersions may be blended with other microfragmented dispersions as described herein to provide food products having desirable characteristics.

Both intact and microfluidized fibers of xanthan/-whey protein-egg protein, or other polysaccharide/-protein complexes may exhibit an astringent mouthfeel sensation for a segment of tasters. The sensation is apparently variable among the population, and may be observed in the back of the throat as a "drying, tingling" effect, and may also be experienced on the front of the tongue or on other soft tissues of the mouth. The sensation is less apparent for most tasters in products such as frozen desserts and appears to intensify in low pH food systems, such as salad dressings, indicating that the effect may be related to dosage, ionic strength, pH and/or temperature.

Xanthan gum/whey protein-egg protein complexes are unusual in that they may be astringent but not bitter. Although there may be a sensation of dryness, salivary flow is not impeded. The main effect, when it occurs, seems to be epithelial rather than salivary, upon the surface of the tongue and oral cavity. It is also theorized that cellular dehydration may underlie the drying sensation.

In accordance with various aspects of the present invention, astringency may be reduced in a polysaccharide/protein complex by coating the surface of the complex with a non-astringent agent. The most effective means of eliminating astringency is post-homogenization gum coating. In this regard, a microfragmented dispersion of an ionic polysaccharide/protein complex, such as a xanthan/protein complex is combined with from about 5 to about 20 weight percent of an ionic or neutral gum, or mixture of gums, based on the total solids weight of the ionic polysaccharide/protein complex (dry basis). A number of anionic or neutral gums may be used including xanthan, carboxymethyl cellulose, carrageenan, alginate, locust bean gum, guar gum and mixtures thereof. The most effective gums are xanthan and carrageenan. For example, an aqueous microfragmented ionic polysaccharide/protein complex, such as a xanthan/protein complex having a 2% to 10% solids content may be mixed in a low shear mixer, such as a Hobart mixer or a Breddo mixer, with an amount of gum equal to 5% to 20% of the weight of the xanthan/protein complex. The gums are sifted in dry to the microfragmented xanthan/protein complex dispersion as it is being mixed on the low shear device. It is theorized that allowing the gums to hydrate in contact with the complex allows the gums to interact and coat the complex, thus reducing exposure of astringency-causing portions of the microfragmented protein/xanthan complex.

The microfragmented complex may also be coated with an agent such as an edible fatty emulsifier such as stearoyl lactylate, monoglycerides or lecithin or a film-forming polysaccharide such as alginate and locust bean gum. It is theorized that such a coating prevents interaction with the epithelial tissues of the mouth.

Astringency may be caused by exposed segments of the protein or carbohydrate which interact with cells on the surface of the mouth or tongue. Coating of the polysaccharide/protein complex particles with a thin layer of gum, surfactant such as sodium stearoyl lactylate and/or fat in accordance with the present invention provides a physical barrier to this interaction.

The precipitated complex particles may also be coated with polysaccharides to reduce astringency. Encapsulation or "blocking" (the specific elimination or shielding of reactive sites in xanthan or proteins with polysaccharides) may also be utilized to reduce astringency.

In this regard, for example, calcium alginate and locust bean gum have been used for encapsulation and/or blocking. Sodium alginate was mixed with a microfragmented dispersion of xanthan/protein complex, and then was either allowed to gel with the natural calcium present in the complex or was gelled by the addition of calcium acetate. Astringency may also be reduced by reduction or masking of sulfhydryl groups on the surface of the dispersion particles.

As indicated, while the preparation of aqueous microfragmented dispersions may be carried out by subjecting relatively large fibers or particles of precipitated polysaccharide/protein complex to intense shear in an aqueous medium, polysaccharide/protein complex dispersions having a smooth creamy texture and mouthfeel may also be provided by other processing methods. In this regard, microparticulate polysaccharide/protein complexes may be prepared by forming an aqueous complex generating solution of a solubilized protein component, as previously described, and a complexing ionic polysaccharide component as previously described, for the protein component, which may contain from about 1 to about 38 weight percent solids, based on the total weight of the solution. Also in accordance with the aspects of the present disclosure, a hydrophobic working liquid is provided which is immiscible with the aqueous complex generating solution. The immiscible working fluid may be an edible oil such as a vegetable oil, or may be an inert non-polar organic solvent alkanes, esters, higher alcohols, etc., as well as compressed propane, ethane or butane which may readily be removed from the finished product. Also in accordance with the method, a water-in-oil emulsion of the aqueous-complex-generating solution is formed in the hydrophobic working liquid, and the pH of the emulsified aqueous complex-generating solution emulsified in the working liquid is adjusted to form precipitated complex particles in the emulsified aqueous phase. The emulsification step may be carried out in a batch or continuous mode. The acidification may be carried out by addition of an acidic gas such as hydrogen chloride or carbon dioxide to the emulsion, preferably under pressure, or an aqueous or hydrocarbon solubilized acid to the emulsion. An acid generating component such as an edible lactone which produces an acid upon hydrolysis may also be utilized. The use of edible emulsifiers such as lecithin facilitates emulsion formation. Polymeric surface active or interfacial agents such as polysaccharide esters (e.g., starch palmitate) may be desirable to form a controlled surface layer. The aqueous phase particles may be separated from the hydrophobic liquid making fluid to provide a microparticulate polysaccharide/protein complex having a controlled particle size. The particles may be heated in the hydrophobic working liquid (e.g., to 90°-105° C.) to stabilize the precipitated complex microparticles prior to separation from the hydrophobic working liquid. Such heating may be carried out under superatmospheric pressure to prevent water loss if desired.

It is important to avoid oxidation of the oil if recyclic use of the oil phase is desired for commercial operation. The use of a nitrogen blanket, and deaeration of the oil and the complex-generating solution are preferred procedures in this regard. It may also be desirable to use high stability oils.

The size of the fibers is constrained by the size of the emulsion droplets in these methods. By controlling the size of the emulsion droplets, the size of the fiber particles may be readily controlled. The energy requirement for forming an emulsion is much lower than for microfragmentation of preformed fibers, and accordingly, less work is necessary to produce particles of a preselected volume through emulsification of the aqueous fiber forming solution utilized in high shear microfragmentation of the preformed fibers.

While aqueous polysaccharide/protein microparticulate dispersions may be prepared utilizing high shear aqueous processing methods and hydrophobic liquid emulsions, as previously described, it is also contemplated that aqueous polysaccharide/protein complex dispersions may be provided by gas atomization techniques. In accordance with such methods, an aqueous gas atomization complex forming solution of a solubilized protein as previously described, such as whey protein, casein, egg white protein, vegetable protein or mixtures thereof, and an ionic polysaccharide, as previously described, such as xanthan gum, carrageenan, gellan, carboxymethyl cellulose, and mixtures thereof may be provided at a weight ratio of protein/polysaccharide in the range of 2:1 to 15:1 (e.g., about 8:1). The aqueous gas atomization solution may desirably have a total solids content of less than 10 weight percent (e.g., about 5 weight percent) of the solution. The solution will be at a pH higher than that at which precipitation of a protein/polysaccharide complex occurs. Because the process may involve evaporation/concentration, the solution may desirably be a "pre-cleaned" solution in which off-flavors have been removed by prior precipitation, washing and redissolution of the protein and polysaccharide components, as described hereinabove, or may be a polysaccharide/protein solution containing a high quality protein component such as an egg protein/caseinate blend which does not have significant "off flavor". Subsequently, the gas atomization protein/polysaccharide solution is atomized in an entraining gas to form droplets having a predominant diameter of less than about 10 microns, and preferably about 5 microns or less, and more preferably about 3 microns or less.

The gas atomized droplets are desirably contacted with an acidic atmosphere such as carbon dioxide, acetic acid and/or hydrochloric acid in gas form to precipitate the protein/polysaccharide complex. The gas atomized droplets may also be heated by contact with hot gas to evaporate at least a portion of the water content of the droplets. One embodiment of the process is illustrated in FIG. 19.

As shown in FIG. 19, a pre-cleaned or otherwise flavor-free protein/polysaccharide solution 1902 such as a carrageenan/egg white/sodium caseinate (solids weight ratio 1:4:4) at a pH of 6–7 and having an initial solids content of 5 weight percent is atomized into a drying tower 1904 by an atomizer or nebulizer 1906 in the form of a spray of droplets 1908 having a diameter of less than 6 microns. The solution 1902 may be saturated with a gas such as nitrogen at high pressure prior to atomization to assist droplet size reduction by sudden release of gas from the solution upon atomization, and may contain an edible surface active agent to reduce surface tension, also to facilitate droplet formation.

In the drying tower 1904, the droplets 1908 are contacted by an acid-containing gas 1910, in appropriate concentration and amount to reduce the pH of the droplets to a pH at which precipitation occurs, which is preferably at, or slightly above, the isoelectric point. The temperature of the gas may be sufficiently high to denature the protein, although cooler temperatures including ambient or lower temperatures may be used if desired. The humidity of the gas may be controlled in an appropriate manner (as by partial gas recycle or steam injection, etc.) to control the amount of water evaporation from the droplets. The exhaust gas stream 1912 may be cooled to condense moisture, heated and recycled. Protective materials, such as sugars, starches, dextrins, etc., may be used for higher levels of drying (below 65 weight percent water). It is preferred, however, that the droplets 1908 be partially dried to a range of from about 15 to about 25 weight percent solids, thereby correspondingly reducing the size of the individual droplets. The partially dried droplets may be collected as an aqueous dispersion 1914 after their brief encounter with the preferably high temperature (90°–120° C.) gas 1910 in the tower chamber, to provide an aqueous dispersion. This acidic gas vapor treatment, in view of the high surface area of the droplets, may partially remove any volatile odor or taste components, if present. If desired, the droplets may be immediately cooled by contact with the collected aqueous dispersion or collection chamber walls to maintain the stability of the aqueous dispersion.

To obtain uniformly small droplet size, special attention should be given to the atomizing methods and apparatus. Pneumatic atomizers typically use compressed air (e.g., 30–100 psi or 200–700 kPa) and produce droplets in the range of 5–10 microns in diameter. Rotary atomizers (spinning disks) which are widely used in spray drying normally produce droplets in the 30–300 micrometer range. However, by utilizing high pressure gas streams with pneumatic atomizers, by the application of ultrasonic atomizing techniques in the $1\times10^6$ to $1\times10^7$ Hz frequency range to pneumatic and very high speed rotary disk atomizers, and/or by utilizing electrostatic atomizing techniques, uniformly small diameter droplets may be readily produced. A pneumatic nozzle system 2000 is schematically illustrated in FIG. 20. As shown in FIG. 20, a small conduit 2002 emits a stream 2004 of the protein/polysaccharide solution from which individual droplets 2006 are formed, as shown, and subjected to contact with high velocity acidic gas, which causes precipitation of the protein/-gum complex within the droplet. A heated gas stream 2012 from an outer nozzle 2014 provides for water evaporation and denaturation of the complex. Wide variation of process conditions may be controlled to provide specific treatment of the small droplets formed. For example, the protein/polysaccharide stream 2004 may be initially formed into droplets by contact with a relatively cool high velocity air stream, and contacted thereafter by a high temperature acidic gas stream. If the air stream contains an acidic gas (e.g., $CO_2$ and/or HCl) so that the precipitation begins before droplet formation is complete, the protein/gum complex precipitate will be oriented, and irregularly shaped, as shown in magnified insert 2016. If contact with acidic gas occurs after droplet formation is complete, the precipitation complex may be less oriented, as shown in enlarged input 2018. The droplet formation may be carried out by means of a high temperature gas (such as an air-steam mixture) to denature the protein before, after or concomitantly with droplet formation, and before, after or concomitantly with acidification. The droplets may be heated to denature the protein/-polysaccharide complex of the individual drops and to remove at least a portion of the water content. Thus, for example, the water content may be reduced so that the droplets are approximately 80% by weight water, rather than the original 95–96% water. The temperature of the droplets and the amount of drying may be controlled by controlling the amount of humidity and temperature of the hot gas (e.g., by heat exchange, heated air or steam) introduced into the droplet/gas interaction chamber. The pressure in the chamber may be approximately atmospheric pressure, but may be superatmospheric if desired to heat the droplets to higher temperatures than 100° C. for more rapid protein denaturation, or may be subatmospheric if high evaporation rates at low temperature are desired. Smaller droplets are, because of their relatively larger surface area as compared to their mass, increasingly subject to air flow conditions with decreasing size. This property may be utilized to cause impaction of larger drops against a multi-tiered surface or filter 2020 to remove larger drops from the final dispersion to be produced, while permitting droplets of desired size to pass through the filter. The parameter which is a measure of this inertial effect may be defined by a dimensionless ratio Psi equal to the stopping distance (e.g., the distance a drop will penetrate in still gas given an initial velocity Vo divided by a spray or collector diameter.

Frozen Desserts—As indicated, frozen desserts incorporating microfragmented ionic polysaccharide/-protein complexes, such as the preferred xanthan/-protein complex dispersions, have particular utility. Typically, in conventional frozen dessert formulations, the higher the fat level in a frozen dessert, the more pleasing and appetizing is its texture and flavor. For example, ice cream, which usually comprises at least about 10 percent of milk fat, typically has texture and flavor superior to the texture and flavor of frozen desserts comprising low proportions of fat.

However, the higher the fat content of the frozen dessert, the higher is the calorie content of the frozen dessert. Nutritious, low calorie, low fat frozen desserts having desirable texture and flavor characteristics similar to higher fat content desserts, and having substantial shelf and flavor stability, together with a creamy texture may be provided in accordance with the present disclosure. Such frozen desserts may comprise from about 0 to about 10 percent of edible fat, from about 1 to about 10 percent of a microfragmented xanthan/protein complex dispersion (dry basis), from about 1 to about 9 percent by weight of protein (dry basis, not including the protein content of the xanthan/protein complex), from about 10 to about 30 weight percent of a saccharide component comprising one or more sugars, and from about 45 to about 80 percent water. Various gums, stabilizers and emulsifiers, flavoring agents and flavoring food components may also be included, in accordance with conventional practice.

In preparing such frozen desserts, a mix is prepared which comprises an aqueous component, and optionally a fat component. The fat component comprises less than about 10 percent of the mix, and may be any edible fat which is firm but spreadable at room temperature, such as milk fat and/or margarine fat. The fat component will desirably comprise at least about 1 percent of the mix, such as from about 2 to about 5 percent by weight, unless it is desired to provide entirely fat-free frozen dessert products having a creamy texture.

The aqueous component will ordinarily comprise water, protein and sweetening agents and may also comprise stabilizers and flavoring ingredients. The xanthan/protein component (and the optional fat component, if utilized) may be thoroughly mixed with the other component, and the mix may be homogenized to provide a thoroughly homogenized composition which may then be subjected to freezing in a conventional manner, as by a swept surface heat exchanger.

The mix may be packaged and hardened after discharge from the heat exchanger to provide a low-fat frozen dessert having excellent creamy texture and flavor together with reduced calorie content in a reduced fat or fat-free composition.

Food Dressings—The microfragmented ionic polysaccharide/protein complex dispersions, particularly including the preferred xanthan/protein complex dispersions are also particularly useful as components of low oil or oil-free dressings, such as salad dressings, viscous and pourable dressings. Shelf stable acidic food dressings comprising xanthan/protein complex dispersions are particularly desirable, comprising a blend of an acidic aqueous fluid food dressing vehicle having a pH of less than about 4.1 and a creamy-textured xanthan/-protein microfragment dispersion component which retains its stability in the acidic food dressing vehicle. The shelf-stable food composition will generally comprise from about 0.25 to about 30 percent by weight, and preferably from about 1 to about 10 percent by weight of the microfragmented xanthan/protein complex dispersion (solids basis), 0 to about 50 percent and preferably less than about 30 percent by weight of an edible oil or fat, and from about 50 percent to about 99.75 percent by weight, and preferably from about 90 percent to about 99 percent by weight of the aqueous fluid food dressing vehicle, based on the total weight of the food dressing. Up to about 20 weight percent of other components, such as particulate food components, may be included in the dressing.

The food dressing vehicle utilized in accordance with the present invention will generally contain from about 20 to about 96 percent by weight of water, and sufficient acidifying agent to provide the aqueous component of the dressing vehicle with a pH of less than 4.1, and preferably in the range of from about 2.75 to about 3.75. In accordance with conventional food dressing manufacture, depending on the desired pH, the amount of water in the dressing vehicle and the effect of additional components of the food dressing, the acidifying agent which may include acetic acid or a mixture of acetic and phosphoric acids, will generally be present in an amount of from about 0.1 to about 3.5 weight percent based on the total weight of the food dressing vehicle.

Also in accordance with conventional acid dressing manufacture, the food dressing vehicle may contain up to about 20 weight percent of a bodying agent such as gums, starch or other hydrocolloids and mixtures thereof, from about 0 to about 5 percent salt, from about 0 to about 30 percent sweetener, and from about 0 to about 15 percent spices and flavors, based on the total weight of the food dressing vehicle. The food dressing vehicle which may be utilized includes oils or oil-less dressings, pourable or viscous dressings and emulsified or nonemulsified food dressing products commonly used as an adjunct on salads, vegetables, sandwiches and the like. Included within such classification are products such as mayonnaise, salad dressing and French dressing, and imitations thereof, as well as low calorie oil-less products, including condiments or reduced calorie products, and other emulsified and nonemulsified oil-containing products.

The oil, to the extent used in the dressing formulation, may be any of the well known edible triglyceride oils derived from oil seeds, for example, corn oil, soybean oil, safflower oil, cottonseed oil, etc., or mixtures thereof. The sweetener used is typically sucrose. However, other sweeteners such as dextrose, fructose, corn syrup solids and synthetic sweeteners may also be utilized.

Any suitable emulsifying agent may be used in the salad dressing compositions of the invention. In this connection, egg yolk solids, protein, gum arabic, carob bean gum, guar gum, gum karaya, gum tragacanth, carrageenan, pectin, propylene glycol esters of alginic acid, sodium carboxymethyl-cellulose, polysorbates and mixtures thereof may be used as emulsifying agents in accordance with conventional food dressing manufacturing practices. The use of emulsifying agents is optional and depends upon the particular type of emulsified oil being prepared. Emulsifying agents, when used, may typically be present at levels of from about 1 percent to about 10 percent, depending on the particular emulsifying agent used.

A bodying agent may be used in the food dressing vehicle to provide desired body or viscosity in accordance with conventional practice, in addition to the xanthan/protein complex dispersion (which serves as a creamy functional bodying agent). This bodying agent may be a starch paste or may comprise an edible gum such as xanthan gum (as a bodying agent, not as part of the molecularly intimate xanthan/protein complex), guar gum, propylene glycol ester of alginic acid or the like. Starch, if used, may typically be present at a level of from about 2 percent to about 10 percent. The edible gum will typically be present at lower levels to provide desired body and texture.

Starch paste is generally used as a bodying agent in the preparation of semisolid emulsified oil dressings, such as salad dressing. and may be used in the preparation of pourable emulsified oil dressings, such as French dressing. The starch may be utilized at a level of from about 1 to about 10 percent by weight in semisolid dressings and at a level of from 0 percent to about 8 percent in pourable dressings. Any suitable starch containing material may be used, and in this connection, any food starch, whether modified, unmodified or pregelatinized, tapioca flour, potato flour, wheat flour, rye flour, rice flour or mixtures thereof may be used as a bodying agent in the preparation of food dressing vehicles. Similarly, the bodying agent may comprise edible gums individually or in combination, and the gums will usually provide the desired body and texture at levels below those normally required when starch paste is used. The gums, when used as a bodying agent, may typically be present at a level of between about 0.05 percent and 2.5 percent. Various other ingredients, such as spices and other flavoring agents, and preservatives such as sorbic acid (including salts thereof) may also be included in effective amounts.

The dressing vehicle may have an aqueous pH of about 4.1 or lower, preferably in the range of from about 2.75 to about 3.75. Any suitable edible acid or mixture of acid may be used to provide the desired level of acidity in the emulsified dressing, with suitable edible acids including lactic acid, citric acid, phosphoric acid, hydrochloric acid, and acetic acid and mixtures thereof. Mixtures of acetic acid and phosphoric acid are particularly preferred acidifying agents. The amount utilized to achieve a desired pH will depend on a variety of factors known in the art including the buffering capacity of protein components of the dressing.

The microfragmented xanthan/protein complex dispersion is an important component of the food dressings, and may be blended with the other dressing ingredients in the form of a hydrated aqueous dispersion. Such hydrated aqueous xanthan/protein microfragmented complex dispersions may typically comprise from about 55 to about 99 percent water, and from about 1 to about 45 percent by weight complexed xanthan gum and protein. The xanthan/protein complex dispersion may also be formed directly in the aqueous vehicle utilized in the dressing preparation.

Such dressings may also comprise fiber agglomerates or other large fibers of xanthan/protein fiber complexes, for example, having a mass of less than about 2 grams, and more preferably from about 0.02 grams to about 1.5 grams. Such large fibers and fiber agglomerates are not considered herein to be included in the complex dispersion component.

Confections—Various aspects of the present disclosure are also directed to reduced calorie confectionery having increased nutritional balance, reduced calorie content, and/or novel organoleptic and mouthfeel characteristics. The microfragmented ionic polysaccharide/protein complex dispersions, particularly including the preferred xanthan/protein complex dispersions, are important components of novel low fat, or no fat confections having desirable organoleptic characteristics. Confections are characteristically comprised primarily of sugars. By sugars is meant nutritive sugars such as nutritive mono, di and polysaccharides such as sucrose, dextrose, levulose and starch syrups such as corn syrups of varying composition including dextrin, maltose and dextrose, and non-nutritive sweeteners such as polyglucose, xylitol, as well as artificial sweetener agents such as saccharine and aspartame. Confection products utilizing microfragmented xanthan/protein complex dispersions may be prepared in accordance with the present invention which generally comprise:

| Ingredients | Weight Percent |
|---|---|
| Microfragmented xanthan/protein complex dispersion (solids basis) | .5-10% |
| Water | 2-20% |
| Sugar | 10-90% |
| Fat | 0-40% |
| Gums & Stabilizers (other than xanthan gum complexed with protein in xanthan/protein microfragment complex) | 0-10% |
| Flavoring | 0-10% |
| Starch | 0-15% |
| Protein (other than xanthan/protein complex) | 0-20% |

Confection products may be classified into two general groups depending upon the physical state in which the sugar is present. The crystalline solid phase is observed in fondant and the liquid or monocrystalline phase, which is sometimes referred to as amorphous state, is found in hard candy, which, like glass, is a highly supercooled liquid. Components such as corn syrup, fats, invert sugar, nonfat milk solids and gums influence the physical characteristics of the finished confection, as do the processing conditions of manufacture, such as cooking time and temperature and method of handling after removal from the cooker. Because of the wide variety of confections made possible by regulating the proportion of these two phases— solid and liquid— of sugar, confections may also be further classified as hard candy, fondant, fudge, caramels, marshmallows, nougat, sugar lozenges, starch jellies, sweet chocolate products and bonbons. The inclusion of the microfragmented xanthan/protein complex dispersion component in the confection blend prior to cooking may also influence the properties of the resulting confection product.

Fudge is a grained confection composed of water, sucrose and/or levulose, and/or dextrose, and/or maltose, and/or dextrins along with satisfactory flavoring materials and whole milk or milk solids not fat with or without added cream and/or dairy butter and/or satisfactory fat. Caramels are confections composed of water, sucrose, levulose, dextrose and/or maltose and/or dextrins along with whole milk or non-fat milk solids, as they appear in whole milk and a satisfactory fat with or without the addition of satisfactory colors and/or flavors. The organoleptic properties, texture and nutritional balance of fudges and caramels may be tailored through the incorporation of up to about 10 weight percent xanthan/protein microfragments in the confection.

Aerated confections are confections in which a substantial amount of air is permanently incorporated in the formed confection. Marshmallows are an aerated confection whose consistency may be short or grained, elastic and chewy or of a semi-liquid character.

As described in U.S. Pat. Nos. 2,847,311, 3,062,611, 3,220,8953 and 3,607,309, marshmallows and similar confections are conventionally manufactured by extruding a heated, aerated confection blend to form multiple strands. The extruded strands may be coated with starch, powdered sugar or mixtures thereof to prevent sticking of the strands to each other, and cut transversely to their longitudinal axes to form firm textured confection products of desired size, having a density in the range of from about 0.25 to about 0.39 grams per cubic centimeter. By including up to 10 weight percent of xanthan/protein complex microfragments in the confection mix prior to operation, aerated confections may be provided which have substantially improved nutritional balance.

The food commonly and usually known as "Milk Chocolate" or "Milk Chocolate Coating" is the solid or semi-plastic food composed basically of chocolate liquor intimately mixed and ground with milk solids and one or more of the sugar ingredients (cane or beet sugar, partially refined cane sugar, anhydrous dextrose or dried corn syrup). Milk chocolate candy incorporating up to about 10 weight percent of a microfragmented xanthan/protein complex dispersion (solids basis), may be provided which has significantly reduced calorie content.

Comminuted Meat and Meat Analog Products—Processed comminuted meat products such as hot dogs and luncheon meats are conventionally prepared in relatively large, unsliced bulk form such as sausages, hot dogs or loaves, or in the form of slices. Such processed meat products may be manufactured by preparing an emulsion of the desired processed meat constituents, together with flavoring agents or preservatives, forming the resulting emulsion in a desired shape such as a cylindrical shape, and heating the emulsion to at least an elevated, coagulation temperature to solidify or pasteurized the meat mass. While heat settable meat emulsions typically utilize natural meat components, meat analog products which utilize a heat setting vegetable protein are also known.

Such comminuted meat products typically include relatively high levels of fat to provide a desired texture and organoleptic properties. In accordance with the present disclosure, reduced fat products may be prepared which include microfragmented ionic polysaccharide/protein complexes in place of all or a part of the fat component. Such complexes may be used in heat-settable meat emulsions. By "heat-settable" is meant that the meat product emulsion initially is a viscous, flowable form, is transformed into a form stable condition by heating the emulsion to a temperature of at least about 120° F. Desirably, "heat-settable" meat product emulsions include a heat coagulatable protein component which provides the desired product form stability upon heat coagulation of the protein component. However, other heat settable compositions, such as those which include heat activated gel-forming agents such as hydrocolloids or hydrocolloid/protein blends, which form a firm, form-stable matrix upon heating, may be utilized.

The meat emulsion may desirably comprise at least about 5 percent by weight protein and preferably in the range of from about 7 to about 16 weight percent of meat or vegetable protein, based on the total weight of the meat emulsion. The meat product emulsion may further desirably comprise from about 0 to about 25 weight percent animal or vegetable fat, and preferably in the range of from about 5 to about 20 percent fat by weight, based on the total weight of the meat emulsion product. The meat emulsion will further comprise from about 2 to about 30 weight percent (solids basis) of a microfragmented ionic polysaccharide/protein complex as previously described. The meat emulsion product may further comprise additional components including salt, sweeteners, extenders and binders, protective and preservation agents such as sodium ascorbate, sodium erythorbate and sodium nitrite. Such additional processed meat components may be provided in accordance with conventional practice. It may also comprise from about 25 to about 65 weight percent total solids and from about 35 to about 75 weight percent of water, based on the total weight of the meat product emulsion. The heat-setting meat emulsion composition may desirably include a heat-activated starch which renders the emulsion non-syneresing.

The type of meat components which may be utilized in the meat emulsion of the present invention include beef, pork, poultry, such as chicken and turkey, fish protein such as surimi, vegetable proteins such as soy protein and cottonseed protein, dairy protein such as milk solids and microbial protein such as yeast protein. The heat-setting meat emulsion composition may be prepared by grinding, chopping and emulsifying the component ingredients to provide a substantially homogeneous meat emulsion product.

Baked Goods—Reduced calorie baked goods, and more particularly, low fat baked goods having desirable texture and organoleptic characteristics may be prepared using microfragmented or microparticulated ionic polysaccharide/protein complexes as described herein. Baked goods typically utilize substantial quantities of triglycerides to develop texture and organoleptic properties. However, triglycerides such as butter and shortenings such as partially hydrogenated vegetable oils have high caloric content. Moreover, consumers, for various reasons, may wish to reduce their triglyceride intake. Microfragmented anisotropic xanthan/protein complex dispersion containing the hydrated xanthan/protein complex microfragments in an aqueous dispersion are particularly desirable components of such baked goods, such as sweet dough, danish dough, puff pastry, and leavened products such as cake mixes, and less leavened products such as brownies. Desirably, the microfragmented ionic polysaccharide dispersion will be utilized at a level of from about 1 percent to about 10 percent solids basis, in full or partial replacement for the shortening component.

Sweet dough is that product, which is made from solid sponge, liquid sponge or straight dough, but which receives no added fat (or material similar) for roll-in purposes. Typically, texture is relatively even and round in appearance. Danish dough is that dough which receives part of its fat as a roll-in which when baked, exhibits the characteristic flake typical of Danish. Texture differs in as much as the cellular structure is more elongated and uneven. The base dough may also be made from solid sponge, liquid sponge or straight dough. Puff pastry is also layered or laminated but without the yeast leavening relying on the dough/fat interaction to produce the desired lift and flake.

Improved baked goods products such as sweet breads, sweet rolls, buns, coffee cakes, donuts and danish pastry, as well as cakes, pastries, pie shells, cookies, breads, icings, toppings and fillings may be made having reduced fat content.

Pastry products such as sweet dough, danish dough and puff pastry products with reduced fat may be provided. It is also an object to provide conventional products having improvement in quality without deletion of part or all of the conventional shortening.

Conventional sweet dough products are yeast leavened baked goods including, but not limited to sweet breads, sweet rolls, buns, coffee cakes, doughnuts and danish pastry where a portion of the fat is rolled in. Also puff pastry, where yeast is not utilized as a leavening agent.

Improved low fat baked goods products utilizing ionic polysaccharide complex dispersions include, sweet dough, danish dough products, cakes, pie shells, cookies, breads, icings, toppings and fillings.

Such methods may be used to produce a wide variety of aqueous protein/polysaccharide dispersions in an economical manner.

Having generally described various aspects of the present invention, the invention will now be more particularly described with reference to the following specific Examples.

EXAMPLE 1

A series of anisotropic xanthan/protein complex macro fibers was prepared, which were subsequently processed under high shear conditions to form respective microfragmented dispersions.

A first batch of xanthan/protein complex fibers was prepared as follows. Twenty-five grams of whey protein concentrate "WPC" (protein=35.47%; lactose=50.1%; moisture=5.03%; fat=3.15%; ash=6.93%, by weight), and twenty-five grams of dried egg albumen (Kraft dried egg whites) were suspended in 2800 milliliters of distilled water in a Waring blender (with stirring) to provide a protein solution. To the protein solution was added 8.33 grams of xanthan gum (Keltrol Xanthan Gum from Kelco Chemical Co.) with stirring in the same Waring blender, and the mixture was stirred for 5 minutes at 22° C. to form a fiber generating solution. The fiber generating solution was acidified with 35 milliliters of 1 molar hydrochloric acid with stirring. The fibers were collected and washed with cold water. The washed fibers were boiled for 5 minutes and drain-dried after washing. The fibers were very white and firm. They had a very bland taste. The wet fibers were frozen and stored for approximately two years. The fibers were then removed from frozen storage, thawed and freeze dried to a total moisture content of about 5 percent by weight. The dried fibers were ground by centrifugal grinder (Brinkmann Pulverizer) using a 0.2 millimeter screen and a high speed setting to provide dried particles of about 100 microns in size. The ground powder was reconstituted with water to form a ten weight suspension in distilled water. The suspension was subjected to high shear by being conducted through a high shear hydroshear device (Microfluidizer model 110Y sold by Biotechnology Development Corporation of Newton Upper Falls, Mass.) at a process input pressure of about 13,500–18,000 psi. The suspension was passed through the high shear microfluidizer five times, with product samples being taken after each pass. The temperature rise upon passage through the microfluidizer is approximately 1.7 degrees centigrade per one thousand pounds psi input pressure, providing a temperature rise of about 30° C. upon passage through the device. The product was initially at ambient temperature, and despite limited ambient cooling between passes, was raised over the course of the five passes to a temperature of about 140° F.

The microfluidized xanthan/protein complex was acidified to pH 4.0 with 1 molar hydrochloric acid and then centrifuged at 4,100 times normal gravity ("×g") and 25° C. for 20 minutes. The centrifuged pellets were recovered for subsequent analysis and incorporation into various product formulations, and were evaluated organoleptically. It was found that these microfluidized xanthan/protein complexes were smooth, creamy and had a fatty mouthfeel. The "concentrated" microfragmented xanthan/protein dispersion had a solids content of 24 percent by weight.

EXAMPLE 2

Xanthan/protein complex fibers were made as illustrated in FIG. 1. Referring to FIG. 1, eight gallon batches of protein/gum slurry (2% solids; ⅛ xanthan; 7/16 egg white; 7/16 whey protein concentrate by weight, based on total solids weight of xanthan gum, egg white and whey protein concentrate) were mixed in the Tri-blender at 110° F. and transferred to the holding tank (It is noted that the temperatures may desirably be reduced to 60°–70° F.) Xanthan/protein fibers were continuously formed by acidifying a stream of the xanthan/protein solution in the holding tube.

The flow rate through the holding tube and Moyno pump was 8 lbs/minute and the acid rate was adjusted to obtain a pH of 3.0–3.5 at the discharge stream from the Moyno pump. The Moyno pump screw rate was 160 rpm.

Five gallon batches were collected from the Moyno pump, and the whey was separated from the formed fibers by passing through screens. The fibers collected from 30–40 gallons of processed slurry were then placed in the Groen kettle and heated in 10 gallons of water to a temperature below boiling temperature. The heated fibers were washed with cold process water, drained and convection dried.

The dried fibers were then suspended in water to form a 5 weight percent (solids basis) slurry which was subjected to high shear microfragmentation by recirculating treatment in a high shear hydroshear apparatus (Model 110Y sold by Biotechnology Development Corporation of Newton Upper Falls, Mass.) for 40 minutes at 110° F. at an input pressure of 13,500–18,000 psig. (It is noted that this pressure may desirably be reduced to about 15,000 psig.) The microfragmented material was adjusted to pH 4.0 and centrifuged at 16,000×g for 20 minutes. The solids content of the centrifuged product following this procedure was 15-16%. The material was a white, creamy, thick paste.

EXAMPLE 3

Xanthan/protein complex fibers were made by a continuous process in a manner similar to Example 2 and generally as illustrated in FIG. 1, except that the formed fibers were boiled in water, and were not convection dried prior to high shear microfragmentation processing.

Referring to FIG. 1, eight gallon batches of protein-gum slurry (2% solids; ⅛ xanthan; 7/16 egg white/7/16 whey protein concentrate by weight, based on total solids weight of xanthan gum, egg white and whey protein concentrate) were mixed in the Tri-blender at 110° F. and transferred to the holding tank (It is noted that this temperature may desirably be reduced to 60°-70° F.) Xanthan/protein fibers were continuously formed by acidifying a stream of the xanthan/protein solution in the holding tube.

The flow rate through the holding tube and Moyno pump was 8 lbs/min and the acid rate was adjusted to obtain a pH of 3.0-3.5 at the discharge stream from the Moyno pump. The Moyno pump screw rate was 160 rpm.

Five gallon batches were collected from the Moyno pump and the whey was separated from the formed fibers by passing through screens.

The fibers collected from 30-40 gallons of processed slurry are then placed in the Groen kettle and boiled in 10 gallons of water (5 minutes at 212° F.).

The cooked fibers were washed with cold process water, drained and placed in cooler (35° C.) before use.

The fibers are then microfluidized by treatment in a (Model 110Y sold by Biotechnology Development Corporation of Newton Upper Falls, Mass.) for 40 minutes at 110° F. an input pressure of 13,500-18,000 psig. The fluidized material was adjusted to pH 4.0 and centrifuged at 16000×g for 20 minutes. The manufacturing procedure was substantially duplicated to provide another lot of the microfragmented dispersion, which was designated "Lot 2". The solids content of the centrifuged product following this procedure was 13-16%. This product was designated "Lot 1". The material, which was a white, creamy thick paste, was subjected to various analyses, and was also incorporated in a variety of food products, as will be further described.

EXAMPLE 4

The aqueous, microfragmented xanthan/protein complex dispersions of Examples 1, Example 2 and Example 3 were characterized by various laboratory analyses.

The protein content of the respective microfragment dispersions was analyzed by Lowry method using bovine serum albumen standard curve. Xanthan content was determined by phenol/sulfuric acid method for hexose, using a xanthan standard curve. Calculated values were corrected for contributions of xanthan and protein to Lowry and phenol/sulfuric acid assays. The xanthan and protein composition of the microfragmented particles was determined to be as follows:

| Composition of Microfragments | |
|---|---|
| Sample | Protein/Xanthan Ratio |
| Example 1 | 2.4 to 1 |
| Example 2 | 2.3 to 1 |
| Example 3 - (Lot 1) | 2.5 to 1 |
| Example 3 - (Lot 2) | 2.6 to 1 |

The amount of denaturation of the protein of the xanthan/protein microfragmented particles of the respective dispersions was determined by polyacrylamide gel electrophoresis in sodium dodecyl sulfate buffers (SDS-PAGE) in the presence or absence of a reducing agent, dithiothreitol (±DTT), which indicates the amount of crosslinked denatured protein. Accordingly, it will be appreciated that the total denaturation may be higher than the amounts determined by this technique. The measured percent of denaturation for the dilute microfragmented dispersions was as follows:

| | Denaturation | | |
|---|---|---|---|
| Sample | Egg White (Ovalbumin) | Whey Protein (B-Lactoglobulin) | Total Protein |
| Example 1 | 93% | 74% | 86% |
| Example 2 | 83% | 43% | 65% |
| Ex. 3 - Lot 1 | 94% | 82% | 91% |
| Ex. 3 - Lot 2 | 93% | 74% | 85% |

Figure 6:
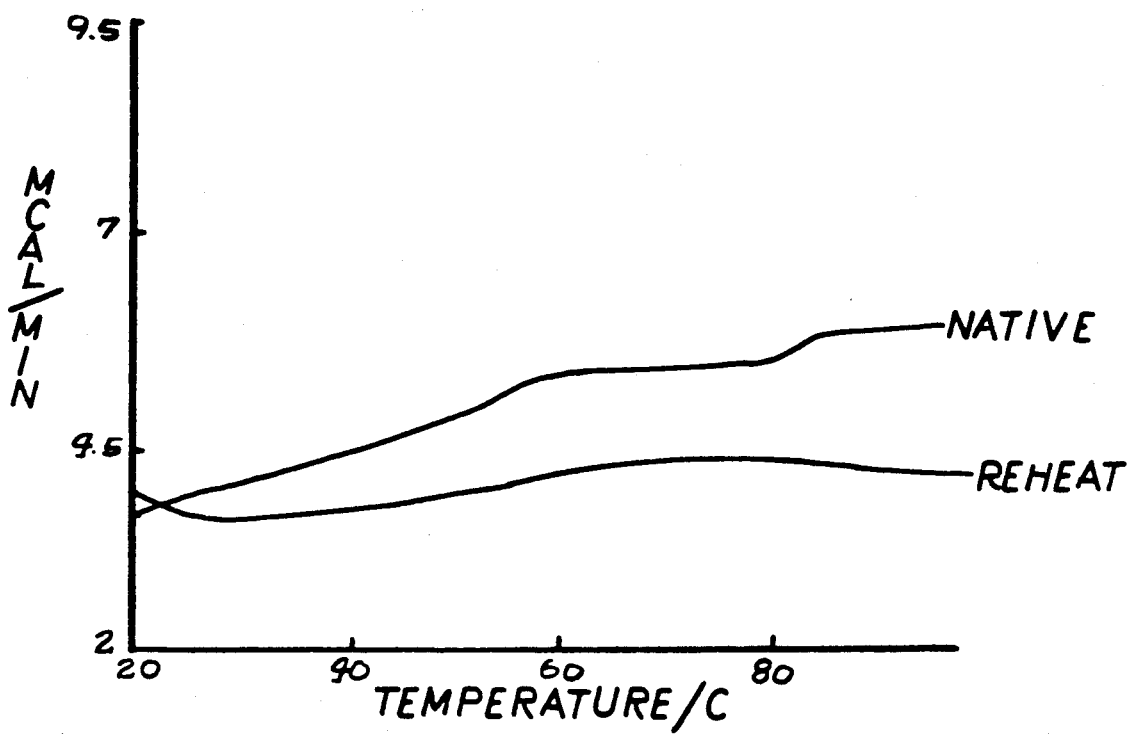
FIG. 6 is a graphical representation of a differential scanning calorimetry analysis of an embodiment of an anisotropic partially denatured microfragmented xanthan/protein complex.
Figure 7:
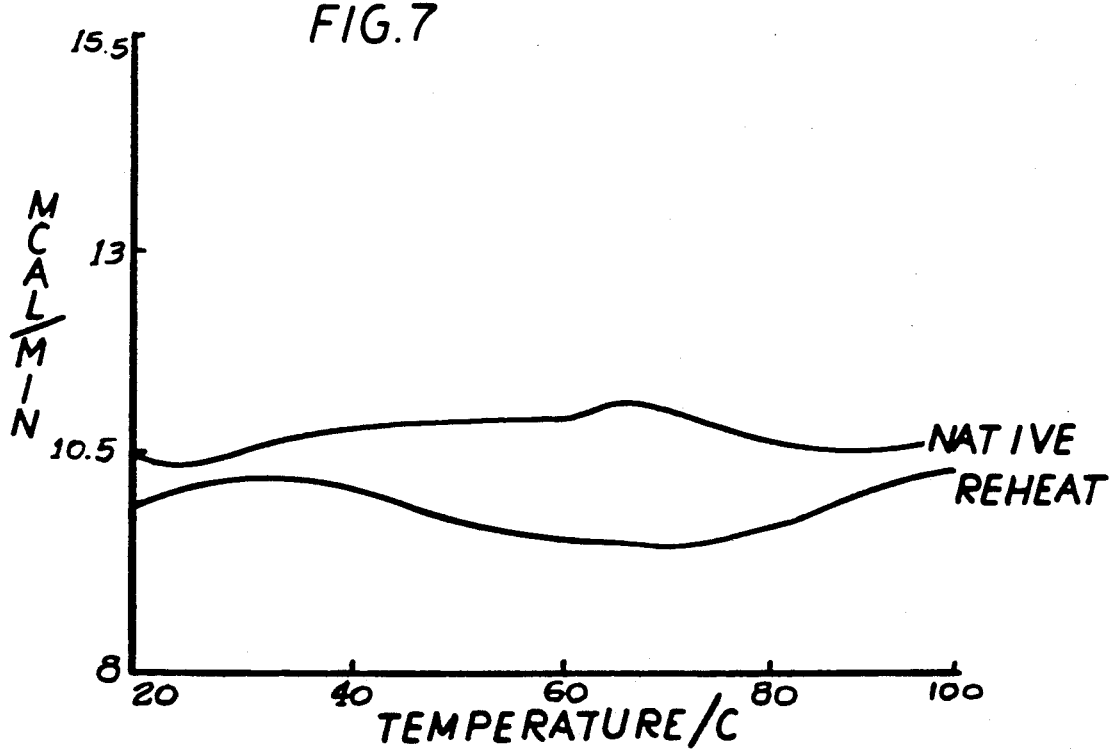
FIG. 7 is a graphical representation of a differential scanning calorimetry analysis of an anisotropic, substantially fully denatured microfragmented xanthan/protein complex.
Figure 8:
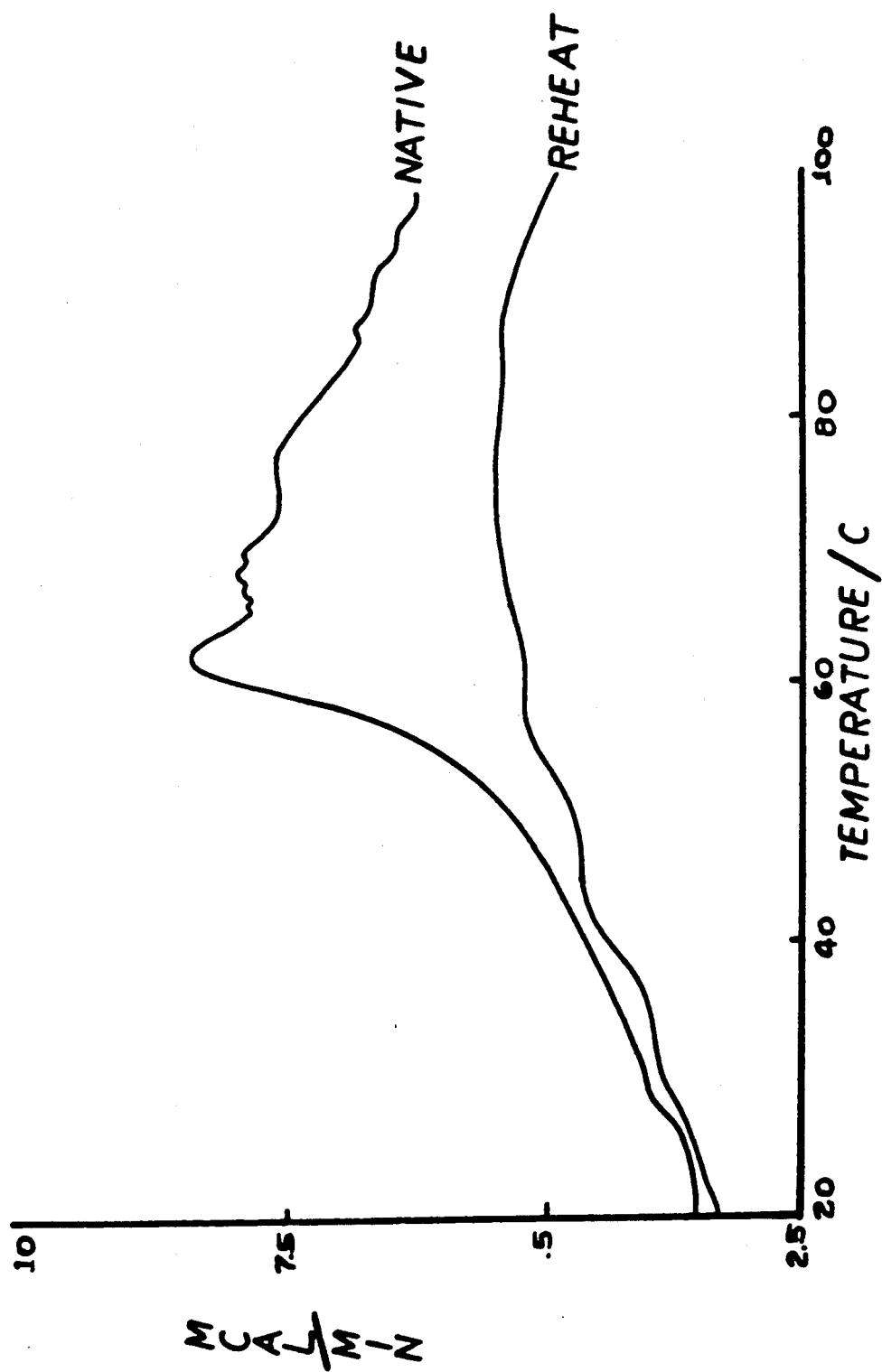
FIG. 8 is a graphical representation of a differential scanning calorimetry analysis of a protein emulsion prepared without xanthan gum.

Differential scanning calorimetry (DSC) was also carried out on the products. DSC analysis indicates no detectable native structure the products of Examples 1 or 3 (FIG. 7). However, the product of Example 2 (FIG. 6) was found to have a significant amount of undenatured whey protein by DSC, confirming the SDS-PAGE data (See FIGS. 6-8).

Figure 9:
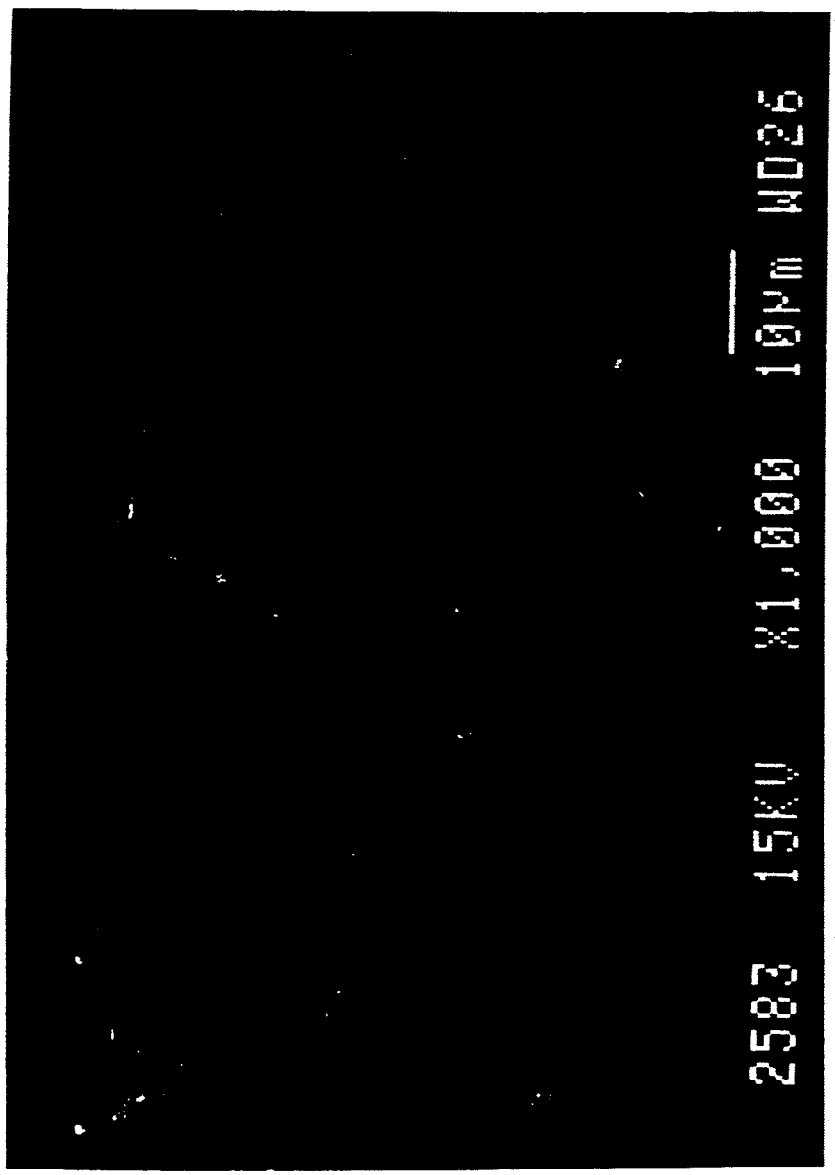
FIG. 9 is a photomicrograph of a microfragmented, anisotropic xanthan/protein complex dispersion at pH 5.5, by scanning electron microscope at a magnification of 1000.
Figure 10:
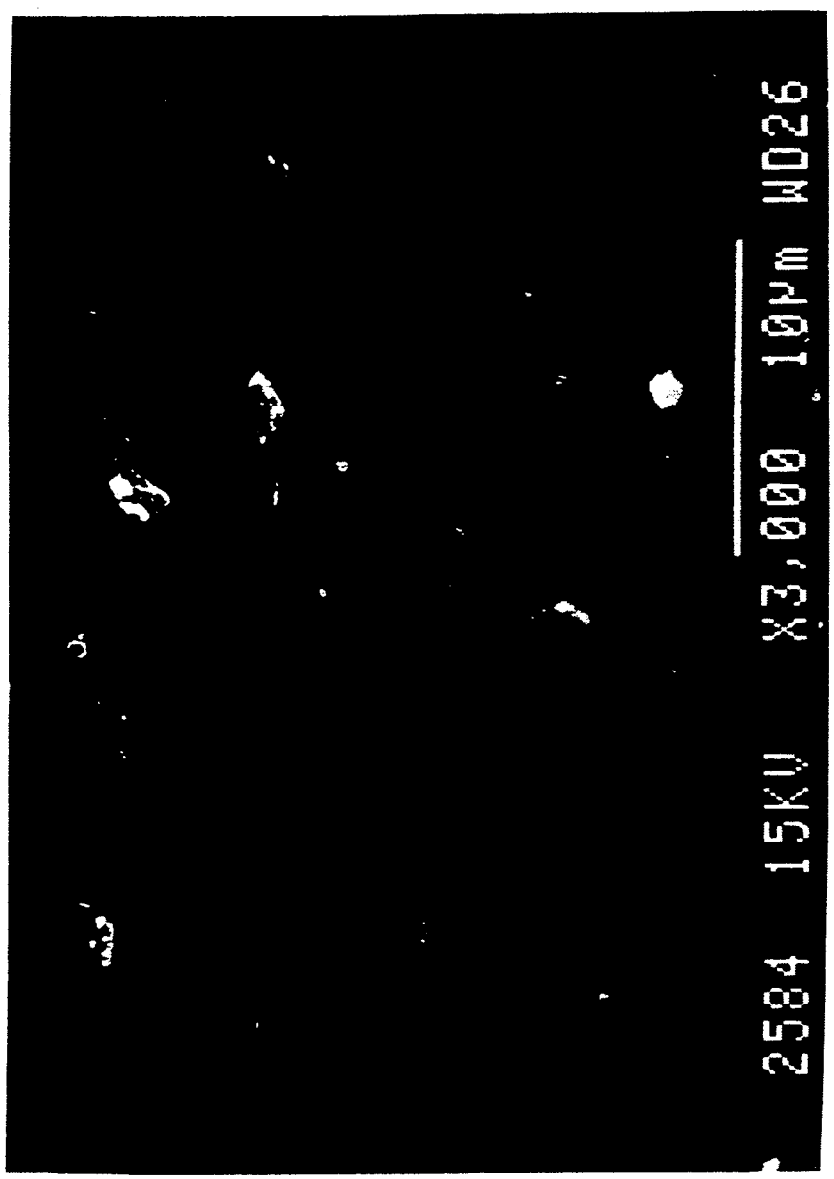
FIG. 10 is a photomicrograph of the xanthan/protein complex dispersion of FIG. 9 at a pH of 4.0 at a magnification of 1000.

The microfragmented dispersion of Examples 1, 2 and 3 pelleted easily during low-speed centrifugation (1600×G for 10 minutes) at pH 4.0 and below. At pH 5.0 and above, a substantial (60-70%) portion remains suspended. These results indicate that flocculation occurs at low pH. This is substantiated by (SEM) scanning electron microscopy (See FIGS. 9 and 10) in which the complex is dispersed at pH 5.5, but aggregated at pH 4.0. The titration curve for this phenomenon corresponds generally to the titration curve of the proteins used in the preparation of the microfragmented dispersions. The midpoint of the titration curve occurs at pH 4.8 (see FIG. 11).

The addition of salt has the same effect as raising the pH (see FIG. 12). The flocculation is rapid, reversible, and may be due to electrostatic interaction between positively charged regions of the protein on one microfragment and negatively charged xanthan on another microfragment.

Heat stability of the microfragment dispersions of Examples 1, 2 and 3 was determined by measuring viscosity before and after subjecting the respective microfragment dispersion to 5 minutes on a boiling water bath. All preparations increased in viscosity after boiling; samples with higher original viscosity turned to gel. Lower viscosity samples seemed more heat stable.

Samples were tested using a Haake Rotovisco (Example 1 and Example 2) and using a Brookfield Viscometer (Examples 1-3).

Haake Rotovisco Data

-continued

| | | Viscosity at Shear Rate 10 | |
|---|---|---|---|
| Sample | Solids | Before Boiling | After Boiling |
| Example 1 | 7.4% | 115 cps | 181 cps not gelled |
| Example 1 | 7.4% | 680 cps | 1850 cps gelled |

| | | Brookfield Data* | | | |
|---|---|---|---|---|---|
| | | Yield Value | | Viscosity | |
| Sample | Solids | Before | After | Before | After |
| Example 1 | 12.4% | n.d. | 3.4 | n.d. | 2.2 ng |
| Example 1 | 17.7% | 1.6 | 51 | 1.3 | 7.3 g |
| Ex 3, Lot 1 | 11.05% | 2.4 | 32 | 2.8 | 16 g |
| EX 3, Lot 2 | 13.4% | 9.1 | 70 | 10.5 | 21 g |

(ng = not gelled - g = gel)
*The numbers represent the average Brookfield reading using a small sample adapter equipped with T-bar spindle F. A helipath stand was used for all measurements. Yield is the initial reading, viscosity is after 5 minutes. Before and after refer to the boiling step.

Light microscopy of the microfragmented dispersion of Example 1, stained with methylene blue, was carried out, which indicated fibrous material. The fibers of Example 1 before microfragmentation were up to 100 micrometers in the longest dimension. After successive passes through the microfluidizer, fibers are reduced in size to below 5 micrometers in their largest dimension. After the ninth pass, most of the particles are less than 1 micrometer in their largest dimension. The fibrous nature of the particles is still evident after 9 passes.

Figure 3A:
FIG. 3a is a photomicrograph, by transmission electron microscopy, of an insolubilized xanthan/protein fibrous complex prior to microfragmentation at a magnification of 13,000.
Figure 3B:
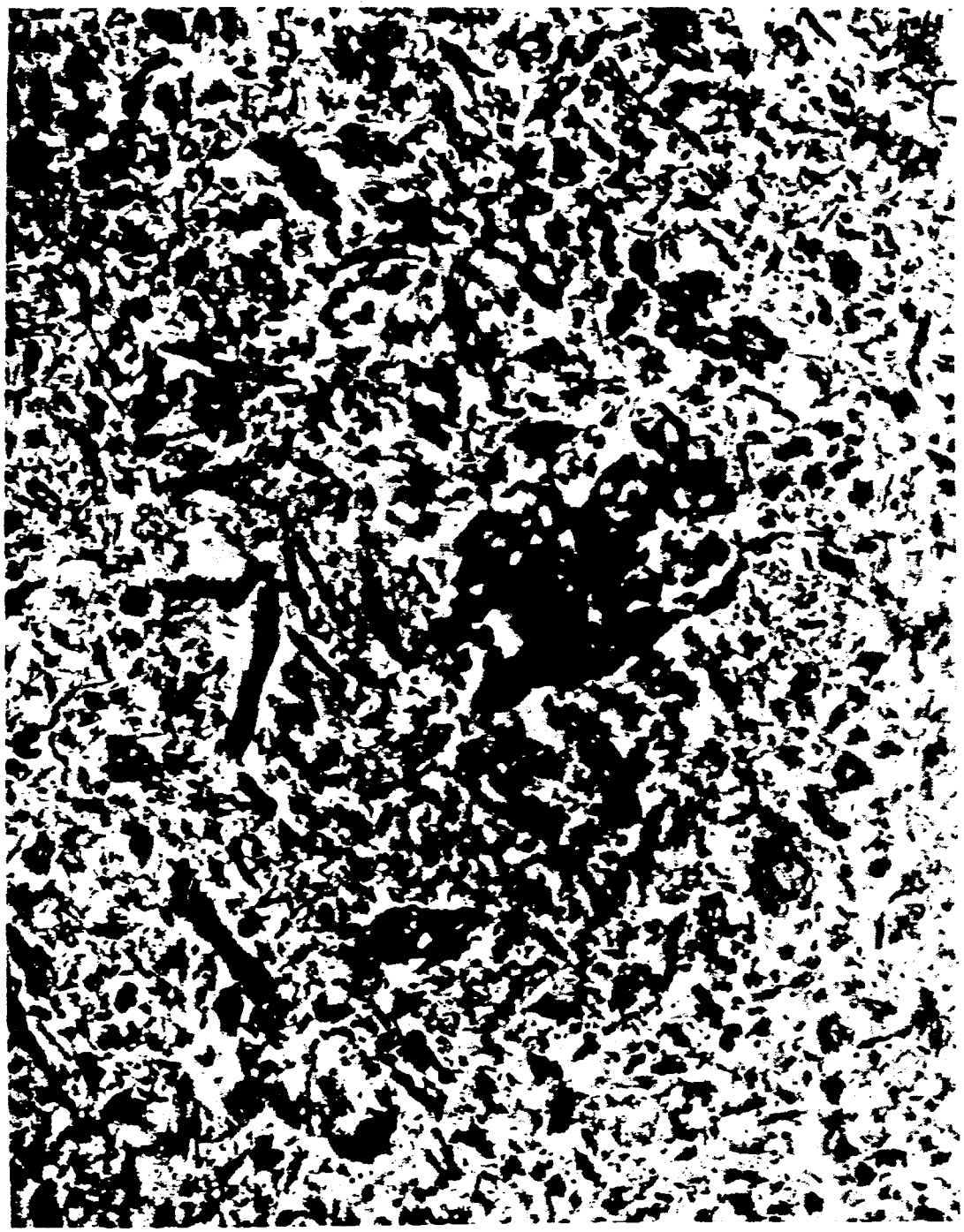
FIG. 3b is a photomicrograph, by transmission electron microscopy, of the insolubilized anisotropic xanthan/protein complex of FIG. 3a after microfragmentation, also at a magnification of 13,000.

Transmission electron microscopy (TEM) of the microfragmented dispersion of Example 1 before microfragmentation shows fibers are composed of strands of small globules (ca. 20 nm) oriented in chains about 120 nm in diameter. The fibers appear as tangled masses of these strands, some of which have parallel orientation. The small globules are possibly crosslinked aggregates of denatured protein (continuing ca. 10–30 individual protein molecules). The alignment of the globules is presumably along a backbone of xanthan molecules (see FIG. 3). The substructure of denatured protein globules is evident and the orientation may well be around fragments of xanthan molecules (see FIG. 3a).

Transmission electron microscopy of the dispersion of Example 1 after microfragmentation shows small isolated fragments of fibers composed of the same type of globules described above. Many are oriented in chains which have the diameter of one globule, others are in thicker chains or clumps. The substructure of denatured protein globules is evident and the orientation may well be around fragments of xanthan molecules (see FIG. 3b).

Figure 4A:
FIG. 4a is a photomicrograph by scanning electron microscopy of the largest fragments of the insolubilized xanthan/protein fibrous complex of FIG. 3a after one pass through a high shear zone at a high specific turbulent energy dissipation rate, at a magnification of 11,000.
Figure 4B:
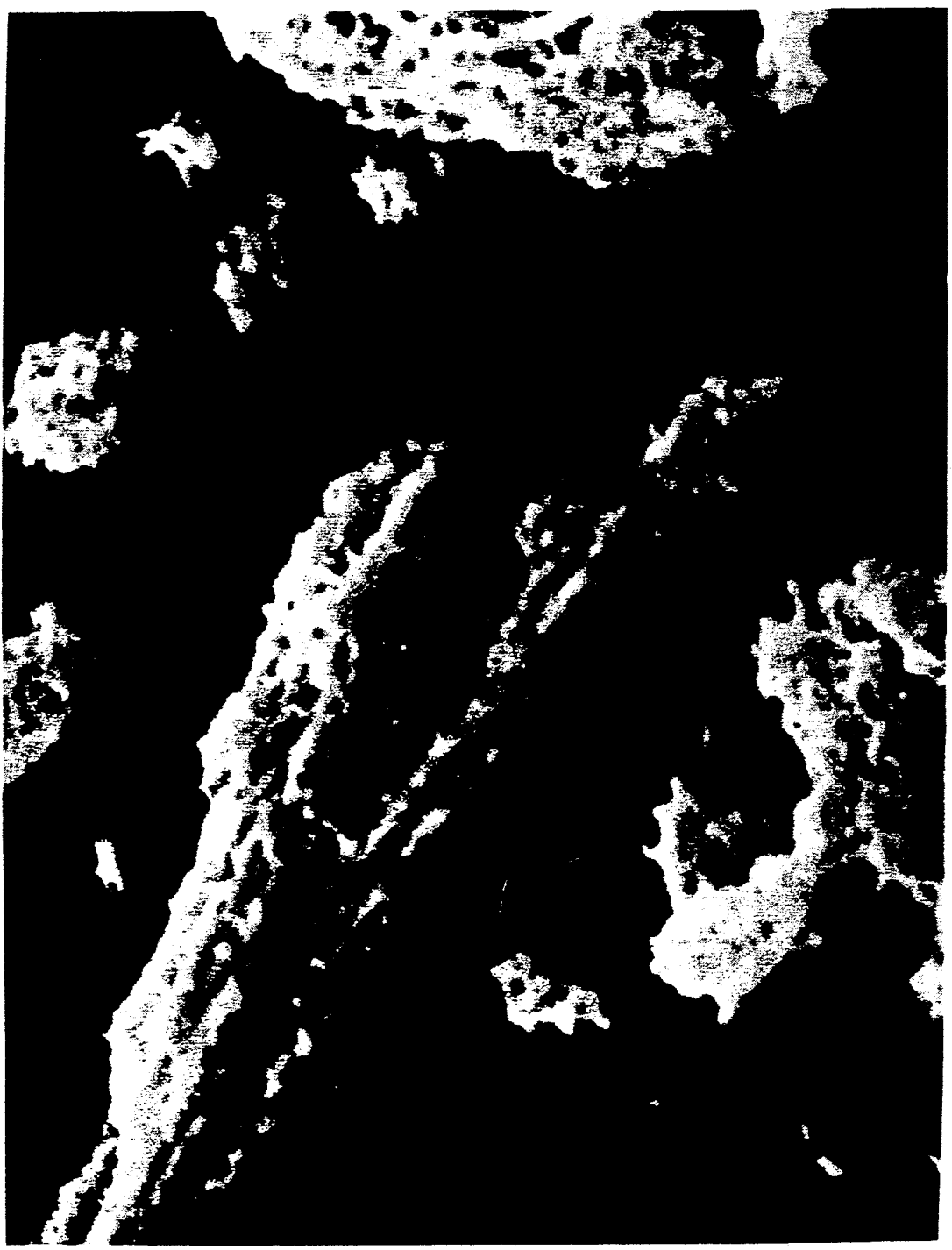
FIG. 4b is a photomicrograph by scanning electron microscopy of the largest fragments of the insolubilized anisotropic xanthan/protein complex of FIG. 4a after 5 passes through a high shear zone having a high specific turbulent energy dissipation rate, at a magnification of 22,500.
Figure 4C:
FIG. 4c is a photomicrograph by scanning electron microscopy of the largest fragments of the insolubilized anisotropic xanthan/protein complex of FIG. 4a after 5 passes through a high shear zone having a high specific turbulent energy dissipation rate, at a magnification of 11,000.
Figure 5A:
FIG. 5a is a photomicrograph by scanning electron microscopy of a fiber fragment of a fully denatured xanthan/protein fibrous complex after low intensity homogenization treatment, at a magnification of 1125.
Figure 5B:
FIG. 5b is a photomicrograph by scanning electron microscopy of the fiber fragment of the insolubilized anisotropic xanthan/protein complex of FIG. 5a, at a magnification of 11,000.
Figure 5C:
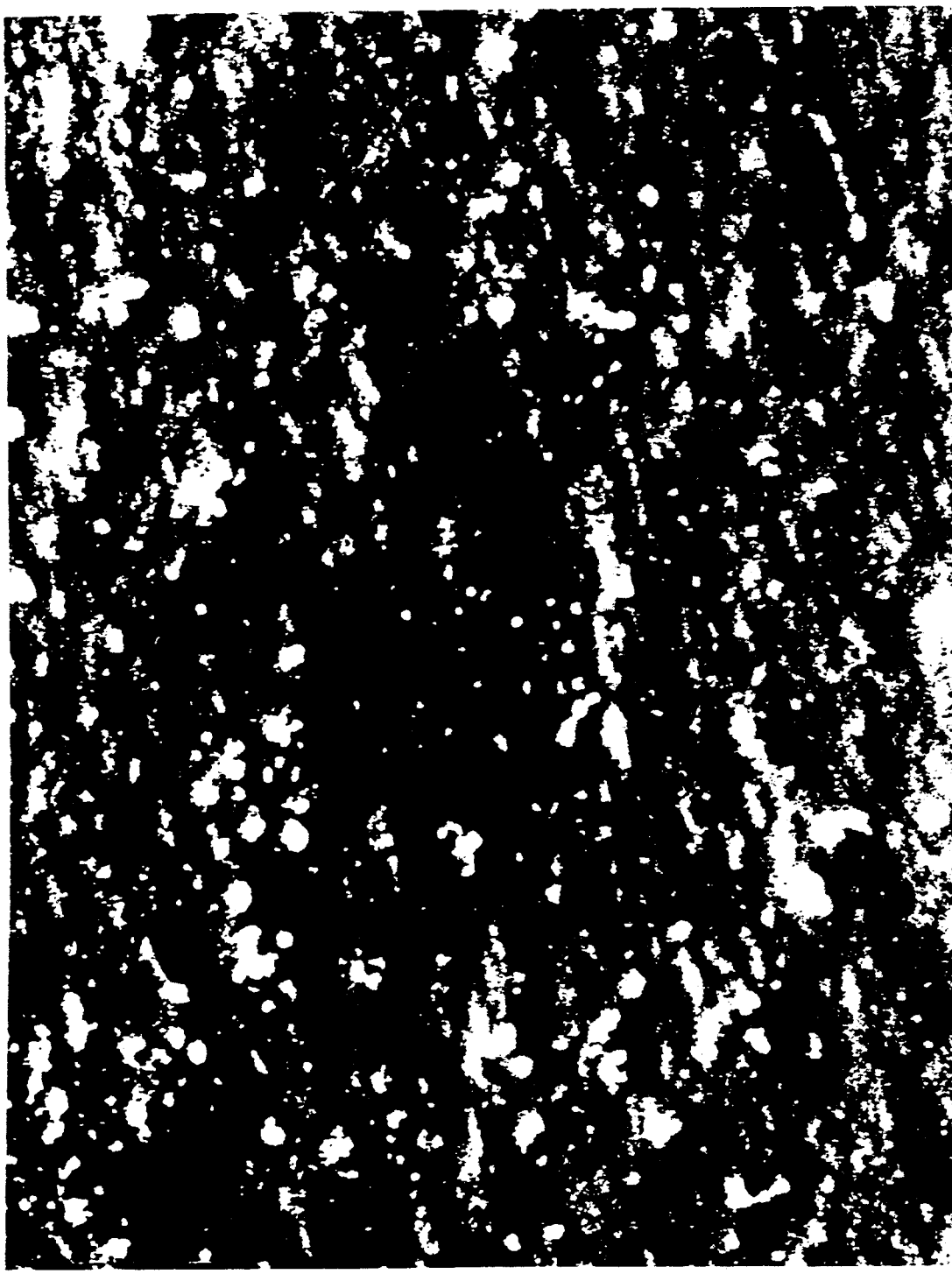
FIG. 5c is a photomicrograph by scanning electron microscopy of the microfragment dispersion produced by high shear treatment of the fiber fragment produced by FIGS. 5a and 5b, at a magnification of 11,000.

Scanning electron microscopy (SEM) of the materials of Example 1 shows irregular shaped particles decreasing in size with successive passes through the microfluidizer. After 9 passes, the particles are 1-3 micrometers across with a "hairy" surface formed by projecting extremely fine filaments (smaller particles would not have been retained in these preparations). It is theorized that the fiber filaments may comprise xanthan filaments which may or may not be associated with protein. It is further theorized that, based on the stability studies, that above about pH 4.8, the negatively charged hairs might keep the particles from interacting, and provide high volume viscosity and lubricity properties. Below pH 4.8 the hairs could collapse against the particles, allowing closer association of the particles and reversible aggregation due to electrostatic interaction (see FIG. 4a).

Examination of the material of Example 3 after the Pentax homogenizer but before microfragmentation shows large fibrous masses which seem to have the same hairy exterior seen in the material of Example 1. The pieces are more fibrous, and less like the irregular particles of Example 1, which may reflect the fact that the product of Example 3 was never dried. Upon microfragmentation, the material of Example 3 formed very small (submicron) particles.

The xanthan/protein complex microfragmented dispersions of Examples 1 and 3 were utilized in the preparation of novel ice cream, pourable dressing, mayonnaise, spreads, barbecue sauces, dip, sour cream, analog cheese and cream cheese products, which will be described in the following examples.

EXAMPLE 5

Light Soft Processed Cream Cheese Product

A reduced calorie, reduced-fat, processed cream cheese type product was prepared utilizing the microfragmented anisotropic xanthan/protein complex dispersion of Example 3, run 2, containing the hydrated xanthan/protein complex microfragments in aqueous dispersion, and having a solids content of 13.0 weight percent, based on the total weight of the dispersion. In preparing the cream cheese type product, the following ingredients were used to prepare a cultured dressing:

| Ingredients (Sub A) | Weight Percent | Amount |
|---|---|---|
| Water | 63.33 | 5.33 lbs |
| Condensed Skim Milk | 36.67 | 3.08 lbs |
| Lactic culture | — | 4.50 milliliters |

In preparing the cultured dressing (Sub A), the water and condensed skim milk were combined with moderate agitation in a conical vat pasteurizer. After the ingredients were thoroughly combined, the mixture was batch pasteurized at 180° F. for 5 minutes. The pasteurized dressing base produced by pasteurizing the ingredient blend was cooled to 72° F. and inoculated with the lactic culture. The lactic culture was thoroughly dispersed into the dressing base with agitation. The inoculated dressing was was incubated at 72°-76° F. for 18 hours until a pH of 4.30 was obtained. The coagulum was broken by agitating for 15 minutes by hand with a milk can stirrer. The cultured dressing base was then combined with the following components, to form the finished product:

| Ingredients (Final) | Weight Percent | Amount |
|---|---|---|
| Cream cheese curd | 49.50 | 12.71 lbs |
| Cultured Dressing (Sub A) | 32.75 | 8.41 lbs |
| Microfragmented anisotropic xanthan/protein dispersion of Example 3 | 16.75 | 4.30 lbs |
| Salt | 0.75 | 0.19 lbs |
| Vegetable Gum | 0.25 | 0.06 lbs |

The cultured dressing (Sub A) was reheated to 175° F. in a conical vat pasteurizer with slow agitation. The hot (175° F.) cultured dressing was blended with hot (160° F.) cream cheese curd in a Pfaudler-type blender using agitation and recirculation. To this dressing-cream cheese blend was added the salt, vegetable gum and microfragmented anisotropic xanthan/protein dispersion of Example 3, while maintaining agitation and recirculation. When all the ingredients were thoroughly blended, the product was homogenized at 2000 psi single stage. The finished product was hand-filled into standard soft cream cheese packaging.

The finished processed cream cheese-type product had approximately half the fat of a conventional cream cheese. This product had a calorie content of 62 calories per one ounce serving, as compared with a calorie content of 96 calories per one ounce serving for conventional cream cheese. The reduced calorie product had a smooth mouthfeel, and a slightly more viscous body than a conventional soft-style cream cheese.

Processed cream cheese-type products containing a microfragmented anisotropic xanthan/protein complex dispersion having the functionality (e.g., softer body) of soft cream cheese may be readily prepared by utilizing a microfragmented xanthan/protein complex dispersion starting ingredient having a lower solids content in preparing the product.

An even lower-calorie, nutritious imitation sour cream dip product was prepared by preparing a lower calorie Dip Base (Sub D) utilizing the imitation sour cream (Sub C) component as previously described, without any sour cream dairy component:

| Ingredients (Sub D) | Weight Percent | Amount |
| --- | --- | --- |
| Sour Cream | 46.25 | 3100 gr. |
| Imitation Sour Cream (Sub C) | 46.25 | 3100 gr. |
| Water/Condensate | 6.99 | 469 gr. |
| Gelatin | 0.33 | 22 gr. |
| Vegetable Gum | 0.11 | 7 gr. |
| Monostearin | 0.07 | 5 gr. |

All of the above lower calorie Dip Base (Sub D) ingredients were thoroughly combined by agitation and recirculation in a Pfaudler-type mixer. The combined (Sub A) ingredients were heated to 165° F. with steam injection, while maintaining agitation and recirculation. The heated ingredients were homogenized at 2500 psi. The homogenized lower calorie Dip Base was combined with the condiment (Sub B) component and waxy maize starch, as previously described, in the following proportions:

| Ingredients (Final) | Weight Percent | Amount |
| --- | --- | --- |
| Dip Base (Sub D) | 81.13 | 2101 gr. |
| Condiments (Sub B) | 17.21 | 446 gr. |
| Modified Waxy Maize Starch | 1.66 | 43 gr. |

In preparing the finished lower calorie dip product, the dip base (Sub D), condiments (Sub B) and the modified waxy maize starch were combined by hand with moderate agitation. The combined ingredients were heated with jacket heat to 165° F. while maintaining moderate agitation. The finished product was hand-filled into standard dip packaging.

The finished imitation sour cream dip product had approximately half the fat of a conventional sour cream-based dip. The product had a calorie content of 35 calories per 28.35 gram serving, as compared with a calorie content of 50 calories per 28.35 gram serving for a conventional sour cream-based dip. The reduced calorie product had a smooth mouthfeel, and the body was slightly firmer and more rigid then a conventional sour cream-based dip.

EXAMPLE 6

Low-Fat Spread

A low-fat spread product was prepared using the microfragmented anisotropic xanthan/protein complex dispersion of Example 3, lot 1, and having a solids content of 16.2 weight percent, based on the total weight of the dispersion. In preparing the low-fat spread product, the following ingredients were used.

| Ingredients | Weight Percent |
| --- | --- |
| Soybean oil | 27.796 |
| emulsifier mix | 0.900 |
| water salt mix (Sub B) | 24.469 |
| color | 0.089 |
| flavor | 0.004 |
| xanthan/protein dispersion | 46.742 |

Sub B = water—89.350%; salt—10.217%; sorbate—0.409%; EDTA—0.024%

In preparing the spread, the oil was heated to 127° F. A portion of the oil was combined with the emulsifiers monoglyceride-90% and unbleached soybean lecithin and then heated to 140° F. while stirring with a magnetic stirrer. This portion was combined with the remaining oil in a 1 gallon churn. Color (mixture of Vitamin A and beta carotene) was added to this oil blend and stirred as before.

Water-salt mix (Sub B) (46° F.) was slowly added (total addition time was about 3 minutes) to the oil mixture while stirring to form an oil continuous emulsion. The initial speed was increased from 400 to 800 rpm during the addition. The microfragmented anisotropic xanthan/protein complex dispersion was then added in small portions to the above emulsion. During the course of this addition, the stirring speed was increased from 800 rpm to about 1500 rpm. Flavors were then combined with the above mixture. The final temperature of the mixture was 66° F.

The mixture was then pumped through a scraped-surface heat exchanger which consists of a rotor having two stainless steel blades scraping the inner surface of a cylinder, the outer surface of which is cooled by circulating Freon-12. The rotor was rotating at the rate of about 700 rpm and the product pumping rate was adjusted to give an exit temperature between 50= F. The product was filled into 2 oz. cups and stored at 45° F.

The low-fat spread prepared as above was compared to a 30% fat control without the microfragmented xanthan/protein complex dispersion. The xanthan/protein complex fragment-containing product had a softer, smoother and creamier body compared to the control. In addition, the microfragmented xanthan/protein dispersion-containing product did not have the wax-like mouthfeel of the control, but had different melt characteristics from the control and had full-bodied texture.

The microfragmented dispersion-containing product was examined with Light Microscopy on thin smears of the product. A small amount of fresh material was placed on a glass slide and then smeared using a second slide to give different thicknesses of the smear. Care was taken to ensure that there was minimal "working on the sample". The slide was then placed on a cold metal block and stained using 2% Osmium Tetroxide solution and/or 2% methylene blue solution in 1% borax. The microscopic examination showed the oil and the microfragmented dispersion were interlaced throughout the sample with some oil droplets entirely surrounded by the microfragmented dispersion. Some water droplets could be seen within the oil. The microfragmented complex could readily be seen within these channels.

EXAMPLE 7

Analog Cheese Loaf

A reduced fat, reduced calorie analog cheese loaf was prepared utilizing the microfragmented anisotropic xanthan/protein complex dispersion of Example 3, lot 2 containing the hydrated xanthan/protein complex microfragments in aqueous dispersion and having solids content of 13 weight percent, based on the total weight of the dispersion. In preparing the reduced fat, reduced calorie analog loaf, the following ingredients were utilized:

| Ingredients | Weight Percent |
|---|---|
| Water | 45.75 |
| Shortening | 11.50 |
| Acid Casein | 21.00 |
| Microfragmented anisotropic xanthan/protein dispersion | 11.50 |
| salt | 0.70 |
| modified stabilized waxy maize starch | 5.8 |
| Tricalcium Phosphate | 1.50 |
| Disodium Phosphate | 2.00 |
| Sorbic Acid | 0.20 |
| Color | 0.05 |

In preparing the analog cheese loaf, the color, shortening and acid casein were blended in a Hobart mixer at the lowest speed (Hobart N-50 of the Hobart Mfg. Co.). After mixing these ingredients, the microfragmented anisotropic xanthan/protein complex dispersion was added and blended under minimum agitation until ingredients were thoroughly mixed. The modified stabilized waxy maize starch was slowly added to the analog blend while mixing at low speed. After all the starch was mixed in, the water was slowly added to the analog blend while mixing at low speed. After all the starch was mixed in, the water was slowly added under minimum continuous agitation. The analog cheese blend, tricalcium phosphate, disodium phosphate and sorbic acid were put into a Kustner cooker (Model .221.211.110, Kustner, Geneva, Switzerland) and cooked by steam injection to 168° F. for four minutes.

The finished product contained approximately half the fat content of the cheese analog control product. The product had a calorie content of 58 calories per one ounce serving, as compared with a calorie content of 86 calories per one ounce serving for the cheese analog control product. The reduced calorie, reduced fat product had a softer body and texture, but a similar slick mouthfeel compared to a control analog product. The reduced calorie product and control had similar melting properties.

Cheese analog products containing a microfragmented anisotropic xanthan/protein complex dispersion having a body and texture similar to control product may be prepared by utilizing a microfragmented xanthan/protein complex dispersion to replace a portion of the fat while adding a gelling polysaccharide to firm the texture.

EXAMPLE 8

Pasteurized Process American Cheese Product

A reduced calorie, reduced fat Pasteurized Process American Cheese Product was prepared utilizing the microfragmented anisotropic xanthan/protein complex dispersion of Example 3, run 2, containing the hydrated xanthan/protein complex microfragments in aqueous dispersion and having solids content of 16.0 weight percent, based on the total weight of the dispersion. In preparing the new reduced fat cheese product, the following ingredients were utilized:

| Ingredients | Weight Percent | Weight in Lbs |
|---|---|---|
| Skim milk cheese | 30.50 | 9.150 |
| Nonfat dry milk | 1.90 | 0.570 |
| Aged cheddar cheese | 15.00 | 4.500 |
| Color | (0.04) | (0.012) |
| Sodium Citrate Duohydrate | 2.25 | 0.675 |
| Disodium Phosphate Duohydrate | 0.40 | 0.120 |
| Sorbic Acid | 0.20 | 0.060 |
| Water | 0.90 | 0.270 |
| Steam condensate | 8.35 | 2.505 |
| Enzyme modified cheese | 2.00 | 0.600 |
| Microfragmented anisotropic xanthan protein dispersion | 30.00 | 9.000 |
| Whey Powder | 5.00 | 1.500 |
| Whey Protein Concentrate | 2.00 | 0.600 |
| Sodium Chloride | 1.50 | 0.450 |
| | 100.00 | 30.000 |

*The coloring is not considered part of the weight percent.

To produce the cheese product, the ground skim milk cheese was blended with the nonfat dry milk in a Hobart Mixer (Model AS-200), operating at the low speed setting. This mixture and the other 6 ingredients above the steam condensate were placed in a Damrow laboratory cheese cooker (40 lb. capacity).

Direct steam and mixing (0.5 speed setting) were applied to these ingredients. The enzyme modified cheese was added to the first ingredients at a temperature of about 100° F. The microfragmented microfragment xanthan/protein complex dispersion of Example 3 was added to the cooker at about 120°-150° F. and a preblended mixture of the whey powder, whey protein concentrate (dry powder) and sodium chloride was gradually poured into the cooker at about 160° F. The steam heating was continued to 175° F. and the mixing was continued for about 4 more minutes (after 175° F. had been reached) at which time the hot, homogeneous, cheese product was smooth. It was packaged and cooled in the form of individually wrapped slices.

The reduced fat Pasteurized Process American Cheese Product was analyzed to have the following composition:

TABLE 1

| Moisture | 57.43% |
|---|---|
| Fat | 8.46% |
| Protein | 20.80% |
| Lactose | 5.30% |
| Salt | 2.33% |
| pH | 5.58% |

In addition to the analytical results, flavor, texture and standard melt test evaluations were conducted on the reduced fat cheese product.

The product was determined to have a mild American cheese flavor and an oxidized fat type off flavor, a somewhat sticky texture and a 21.4% increase in area after melting corresponding to a "fair" melt characteristic.

EXAMPLE 9

Viscous Dressing Product

A reduced calorie, reduced fat viscous dressing product was prepared utilizing the microfragmented anisotropic xanthan/protein complex dispersion of Example 3, lot 2, containing the hydrated xanthan/protein complex microfragments in aqueous dispersion, and having a solids content of 16.0 weight percent, based on the total weight of the dispersion. In preparing the new dressing product, the following ingredients were utilized:

| Ingredient | Weight Percent |
| --- | --- |
| Water | 15.70 |
| Soybean Oil | 40.35 |
| microfragmented anisotropic xanthan/protein dispersion of Example 3 | 30.00 |
| Eggs | 10.20 |
| Vinegar | 2.67 |
| Spice Blend | 1.08 |

In preparing the dressing, the water, eggs and spice blend were thoroughly mixed in a Hobart mixer (Model A200D with a "D" wire whip). After mixing these ingredients, the oil component was slowly added to the blend under maximum agitation conditions in the Hobart mixer to form a dressing preemulsion. The vinegar component was subsequently blended into the preemulsion to form an acidified preemulsion. The microfragmented anisotropic xanthan/protein complex dispersion of Example 3 was then added to the acidified preemulsion, and the resulting mixture was blended in the Hobart mixer at medium mixing speed, to produce a smooth, homogeneous dressing premix. The premix was homogenized by passing it through a conventional colloid mill [Charlotte Model SD-2, Continuous Mayonnaise Machine with 3 HP motor. Supplied by Chemicolloid Laboratories Inc., Garden City Park, N.Y.] with a temperature rise of 10° F. to form viscous mayonnaise-type product having approximately half the fat content of a conventional mayonnaise. The product had a calorie content of 53 calories per 14 gram serving, as compared with a calorie content of 100 calories per 14 gram serving for a conventional mayonnaise. The reduced calorie product had a smooth and creamy mouthfeel, and was even more viscous and had a heavier body than a conventional mayonnaise product.

Mayonnaise-type products containing a microfragmented anisotropic xanthan/protein complex dispersion having reduced viscosity and body may be readily prepared by utilizing a microfragmented xanthan/protein complex dispersion starting ingredient having a lower solids content in preparing the viscous dressing product.

EXAMPLE 10

Reduced Fat Viscous Dressing Product

A reduced fat viscous dressing product like that of Example 9, but having even lower oil content, was prepared utilizing the microfragmented anisotropic xanthan/protein complex dispersion of Example 3, lot 2, having a solids content of 16.0 weight percent. In preparing the reduced calorie salad dressing product, the following components were utilized:

| Ingredient | Percent |
| --- | --- |
| Water | 9.14 |
| Soybean Oil | 16.62 |
| microfragmented anisotropic xanthan/protein dispersion | 11.10 |
| Eggs | 5.18 |
| Starch Paste | 54.08 |
| Salt & Spice Blend | 3.86 |
| Gums | 0.02 |

The starch paste is prepared from food grade starch (e.g., corn or tapioca), together with sugar, vinegar and spices. The starch is formed into paste by heating with sufficient water to gelatinization temperature, to fully gelatinize the starch component, and to provide a fully gelatinized paste having a starch content of 8.2 weight percent.

In preparing the dressing, the water, eggs, salt and spice blend were mixed in a Hobart blender. After mixing these ingredients, the oil component was slowly added to the blend under maximum agitation conditions to form a dressing preemulsion. The vinegar component was subsequently blended into the preemulsion to form an acidified preemulsion. The microfragmented dispersion of Example 3 was then added to the acidified preemulsion, and the resulting mixture was blended in the Hobart mixer at medium mixing speed, to produce a smooth, homogeneous dressing premix. The premix was homogenized by passing it through a conventional colloid mill [Charlotte Model SD-2 Continuous Mayonnaise Machine with 3 HP motor], with a heat rise of 10° F. to form an emulsion. The mayonnaise style low fat dressing product was formed by combining together in a Hobart Mixer, the emulsion and the amount of starch paste in the formulation and blending at the lowest speed until the components were homogeneously mixed. The viscous mayonnaise-style product had a vegetable oil content of about 17.5 weight percent, which is a significantly lower fat content than a conventional mayonnaise. The product had a calorie content of 30 calories per 14 gram serving, as compared with a calorie content of 100 calories per 14 gram serving for a conventional mayonnaise. The product had a smooth texture, similar to conventional reduced calorie salad dressings.

EXAMPLE 1

A 17.5 weight percent fat mayonnaise type product was produced utilizing microfragmented xanthan/protein complex dispersions as a bodying agent contributing a creamy mouthfeel to the products.

17.5% Fat Mayonnaise Type Product

In preparing the 17.5% low fat mayonnaise-type products, a starch/oil slurry, and a water/spice blend were first prepared. The starch/oil slurry was prepared from the following ingredients:

| Starch/Oil Slurry | |
| --- | --- |
| Ingredients | Weight Percent |
| Canola oil | 77.53 |
| Pregelatinized corn starch | 22.29 |

-continued

| Starch/Oil Slurry | |
|---|---|
| Ingredients | Weight Percent |
| Xanthan Gum | 0.18 |

The oil was metered into a 4000 gallon slurry tank, and under high agitation provided by a propeller type mixer, were added in succession, the xanthan gum (pre-slurried in a small amount of oil) and the starch. A small amount of beta carotene was added as a coloring agent.

The water/spice blend was prepared from the following ingredients:

| Water/Spice Blend | |
|---|---|
| Ingredients | Percent |
| Water | 66.23 |
| Corn Syrup Solids | 18.30 |
| Egg Yolk | 6.32 |
| Vinegar | 5.93 |
| Sucrose | 3.16 |
| Salt | 1.44 |
| Microcrystalline cellulose | 1.26 |
| Spices & Flavors | 0.62 |
| Whey Protein Concentrate | 0.28 |
| Potassium sorbate | 0.25 |
| Sodium caseinate | 0.06 |
| Xanthan gum | 0.05 |

The water/spice blend was prepared in a separate tank by first introducing approximately two-thirds of the formula water to the tank. The microcyrstalline cellulose was subsequently added and dispersed with a propeller type mixer at high speed. The xanthan (slurried in a small amount of oil), and the whey protein concentrate, with a small portion of the corn syrup solids were added and blended well. The well mixed contents of the water/spice tank were recirculated through a Silverson homogenizer mixer.

Figure 2:
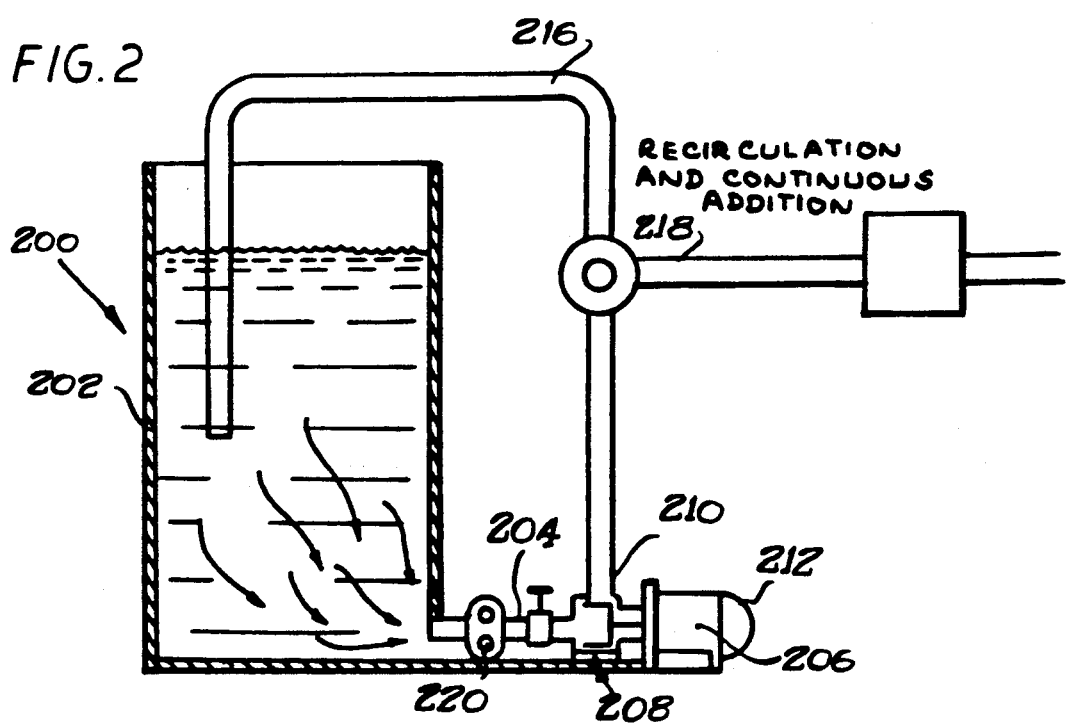
FIG. 2 is a schematic diagram illustrating a specific embodiment of a method for manufacture of xanthan/protein complex microfragment dispersions in which the xanthan and protein components are combined under conditions of high specific turbulent dissipation rate.

In this regard, as shown in FIG. 2, the manufacturing apparatus comprises a product mixing and holding tank 202, a tank outlet conduit 204 and the Silverson in-line continuous mixer-homogenizer 206 which itself comprises a stator chamber 208, and a high shear rotor 210 powered by motor 212. The discharge from the stator head may be returned to the tank 202 or discharged to emulsifier 214 by means of conduits 216, 218, respectively under operator control. A pump 220 controls the flow rate through the Silverson homogenizer 206. The in-line continuous flow mixer homogenizer 206 (Model 425L of Silverson Machines, Ltd., Waterside, Chesham, England) was particularly designed for continuous operation at high speeds, and incorporated a high-shear slotted rotor/stator processing workhead 208, 210. The action of the high shear workhead caused materials inside the head to be subjected to intense hydraulic shear by the high speed rotation of the rotor 210 inside the confined space of the stator chamber 208. In this regard, centrifugal force generated by the rotor drives the contents of the head towards the periphery of the head where solid and liquid ingredients were milled in the fine precision clearance between the rotor blade ends and the inner stator wall. Further centrifugal force expels materials from the head, imparting mechanical shear between the rotor tips and the edges of the stator perforations. Finally, also under the influence and control of the pump 204, the contents of the head are driven by the same centrifugal force through the machine outlet and along the pipeline 216, 218; at the same time fresh materials are drawn in at the inlet to keep the head continuously charged.

In order to achieve a higher degree of homogenization or comminution than obtained by a single passage, the product was passed several times through the machine by a process of recirculation.

The Silverson mixer had a slotted head and an energy input of 10 HP. The water/spice blend was circulated for about 3 minutes until there were no visible lumps in the mixture. The vinegar was subsequently added to the blend in the tank to acidify the xanthan/protein solution to initiate fiber formation while maintaining recirculation of the mixture through the Silverson homogenizer to provide a microfragmented anisotropic dispersion. The acidified, water/spice blend containing the microfragmented dispersion was recirculated through the Silverson mixer, operated as described above, for about 2 minutes. A sample of the microfragmented anisotropic xanthan/protein complex dispersion was taken prior to addition of the remaining ingredients. The remaining third of the formula water was then added, together with the remaining ingredients of the water/spice blend, while recirculation continued through the Silverson mixer for about 3 minutes.

The dressing product emulsion was then prepared by combining the oil/starch slurry and the water/spice blend in the proportions of 20.64% oil starch slurry and 79.36% water/spice mixture. In this regard, the contents of the oil/slurry tank were pumped into the water/spice tank under agitation provided by the propeller-type mixer provided in the tank. Agitation was continued for about 3 minutes until a homogeneous blend was produced. The contents of the tank were then pumped in a single pass through the Silverson homogenizer into a feed tank for a continuous, inline homogenizer for salad dressing emulsion preparation and processed by the homogenizer.

The resulting microfragmented anisotropic xanthan/protein complex containing mayonnaise-like product oil was filled into one liter glass jars. The product was evaluated organoleptically and found to have a creamy mouthfeel and viscous texture provided at least in part by the microfragmented xanthan/protein dispersion. The product had a calorie content of 35 calories per 14 gram serving, as compared with a calorie content of 100 calories per 14 gram serving for a conventional mayonnaise.

Rheological properties of the product were determined by using a Haake VT24 Viscotester, to be as follows:

| Viscosity Data 17.5% Fat Mayonnaise Style Product | | |
|---|---|---|
| Time | Haake Yield Value | Haake Viscosity |
| 24 hours | 2200 | 750 |
| 2 weeks | 2550 | 800 |

The sample of the microfragmented anisotropic xanthan/protein complex dispersion was subsequently stored at room temperature for about 10 months. After the 10 month storage period, the microfragmented anisotropic xanthan/protein complex dispersion appeared to be free of microbial growth. A sample of the dispersion was then evaluated by scanning electron microscopy and found to predominantly comprise microfragments having a major dimension of less than about 10 microns.

A sample of the finished mayonnaise product was also retained at room temperature for about 10 months. The product was found to maintain its phase stability without phase separation.

EXAMPLE 12

A reduced calorie, reduced-fat viscous dressing product was prepared having an extremely low vegetable oil content of approximately 5 weight percent, utilizing an aqueous dispersion of finely ground, fibrous particles of a xanthan/protein complex. The utilization of the xanthan/protein complex in the dressing formulation improved the textural, visual and mouthfeel characteristics of the significantly reduced fat viscous product. The aqueous, anisotropic xanthan/protein complex dispersion was prepared from the following materials:

| Ingredient | Amount |
| --- | --- |
| Water | 1,478.00 Grams |
| Xanthan Gum | 3.65 Grams |
| Whey Protein Concen. | 21.95 Grams |
| Vinegar | 129.88 Grams |

The xanthan and whey protein concentrate were dispersed in the water in a laboratory beaker and then sheared under microfragmentation conditions by means of a Brinkmann Kinematica homogenizer (Model #PTA35/2G of Brinkmann Instruments Co., Division of Sybron Corporation, Westbury, N.Y.) placed in the beaker, running at the mid-range speed, which is approximately 15,000 rpm. Vinegar was added and a milky, opaque suspension of finely comminuted fibers was produced. This resultant aqueous dispersion was utilized as a bodying agent which contributed a creamy mouthfeel in the following formulation.

| Ingredient | Percent |
| --- | --- |
| Emulsion 20% | |
| Water | 50.50 |
| Hydrogenated Oil | 22.50 |
| Emulsifiers | 2.00 |
| Whole egg mix | 25.00 |
| Base 80% | |
| Water | 38.62 |
| Xanthan/Protein Complex dispersion | 25.00 |
| Corn Syrup Solids | 10.00 |
| Vinegar | 7.62 |
| Instant Starch | 9.50 |
| Sugar | 8.00 |
| Spice Mix | 1.26 |

In preparing the dressing, the emulsion portion is obtained by combining in a Hobart Mixer, the water, whole egg mix, emulsifiers and salt, and mixing to properly dissolve and disperse the ingredients. After mixing these ingredients, the oil component was slowly added to the blend under maximum agitation conditions to form an emulsion.

The starch paste portion of the formula containing the microfragmented dispersion of the xanthan/protein complex was prepared by first dry blending the corn syrup solids, sugar, pregelatinized starch and spice mix. In the mixing bowl of a separate Hobart Mixer, the water, vinegar and the microfragmented dispersion are combined. The dry mix with the pregelatinized starch is added under vigorous agitation. When the starch has fully hydrated to a smooth paste, the emulsion is blended in. In the final stage of preparation, the emulsion/starch blend is passed through a colloid mill (Charlotte Model SD-2) with a 6° F. heat rise to form the low fat viscous dressing product.

The resulting product had the appearance and mouthfeel of a viscous dressing with higher levels of fat than the 5 weight percent it contained.

EXAMPLE 13

Dairy Based Viscous Dips

A shelf-stable, non-refrigerated, reduced fat dairy based viscous dip product was prepared utilizing a xanthan/protein gel as a bodying agent contributing fat-like organoleptic properties in the dip formulation. A full-fat control was also prepared for comparison purposes. In preparing each of the full-fat control and the reduced-fat product, a mayonnaise portion and a sour cream base portion were prepared separately, which were subsequently blended to form the dip product. The mayonnaise portion of both the control and the reduced fat dairy based viscous dip product was prepared from the following ingredients:

| Ingredient | Weight Percent |
| --- | --- |
| Water | 5.32 |
| Soybean Oil | 83.90 |
| Eggs | 8.10 |
| Spice Blend | 2.68 |

The formula water, eggs and spice blend were mixed, and the oil was added under high agitation conditions to form preemulsion. The preemulsion was passed through a Charlotte Model SD-2 colloid mill with a 10% heat rise to form an emulsion.

Separately, sour cream base portions for the full fat control product, and for a forty percent fat replacement xanthan/protein ("X/P") gel containing reduced fat product, were respectively prepared from the following ingredients:

| Ingredients | Control | X/P Gel Product |
| --- | --- | --- |
| Water | 27.41 | 31.00 |
| Sour Cream | 50.00 | 31.00 |
| Herb/Spice Blend | 19.03 | 19.03 |
| Xanthan/Protein Gel | 0.0 | 15.50 |
| Lactic Acid (88%) | 1.90 | 1.90 |
| Phosphoric Acid (80%) | 0.22 | 0.22 |
| Soybean Oil | 0.95 | 0.95 |
| Sorbic Acid | 0.24 | 0.24 |
| Gums | 0.25 | 0.25 |

The xanthan/protein gel component was prepared from the following materials:

| Ingredient | Amount |
| --- | --- |
| Water | 2 Liters |
| Xanthan Gum | 26.67 Grams |
| Dried Egg Whites | 13.34 Grams |
| Lactic Acid (50%) | 20 Milliliters |

In preparing the gel, the xanthan and egg whites were thoroughly dispersed in the formula water. The lactic acid was subsequently added to the mixture with very gentle agitation. Gelation was substantially completed upon standing several minutes, to provide the xanthan/protein gel product.

To prepare the sour cream base portion, the gums were slurried in oil and the slurry was added to the formula water. The remaining ingredients were added and dispersed in the resulting blend. Both the control sour cream base portion and xanthan/protein gel sour cream base were each separately combined with the mayonnaise portion prepared as previously described at a weight ratio of 42:58 in a Hobart blender at low speed. The xanthan/protein gel product was evaluated organoleptically, and compared with the full fat control sample.

The dairy based dip containing the xanthan/protein gel exhibited surprisingly similar characteristics to the dip that contained 40% more sour cream.

The gum/protein gel complex was found to have an exceptional ability of imparting thick and creamy characteristics to food products such as dressing and dip formulations when used as a partial replacement for a full fat product. In particular, the addition of a gum/protein gel complex to the basic formulation of a dairy/mayonnaise dip allowed for the replacement of 40% of the full fat sour cream with no reduction in product attributes including flavor, texture, mouthfeel and appearance.

EXAMPLE 14

Barbecue Sauce

A reduced calorie barbecue sauce having exceptional "cling" properties was prepared, by blending a barbecue sauce base portion and a microfragmented xanthan/protein complex dispersion at a 9:1 weight ratio. The barbecue sauce base portion was prepared by blending and cooking the sauce base blend to a starch gelatinization temperature of 190° F. to fully gelatinize the starch, and subsequently cooling the gelatinized blend to room temperature to provide a sauce base having the following composition:

| Barbecue Sauce Base | |
|---|---|
| Ingredient | Percent |
| Water | 16.5 |
| Corn Syrup | 30.00 |
| Vinegar | 24.00 |
| Tomato Puree | 20.00 |
| Spices | 6.00 |
| Starch | 2.00 |
| Soybean Oil | 1.40 |
| Gum | 0.10 |

A microfragmented anisotropic xanthan/protein dispersion was prepared according to the following formulations:

| Ingredient | Amount | |
|---|---|---|
| Water | 2.80 | Liters |
| Xanthan Gum | 8.33 | Grams |
| Dried Egg White | 50.00 | Grams |
| Vinegar - 120 Grain | 245.00 | Grams |
| Barbecue Sauce | | |
| | Percent | |
| Barbecue Sauce Base | 90.0 | |
| Xanthan/Protein Complex Dispersion | 10.0 | |

The xanthan and dried egg whites were dispersed in the formula water in a laboratory beaker. A Brinkmann Kinematica homogenizer (Model #PT10/35 utilizing a PTA 352G generator head) was inserted into the fiber forming solution in the beaker. The Brinkmann Homogenizer is an instrument combining cavitation and mechanical shearing action for homogenization, dispersion and emulsification of solids or liquids. The destructive action of the Brinkmann Homogenizer is based on two interrelated forces: direct mechanical action and cavitation, which is the formation of partial vacuums in a liquid by a swiftly moving solid body and the resulting breakdown of substances in that liquid when those vacuums cease to exist. In the Brinkmann Homogenizer, a generator head, rotating at ultra high speed, creates a cutting, ripping and demolishing action. At very high rotational speed, vacuums are created in the chambers between the teeth of the generator and the blades rotating behind them, shearing xanthan/protein complex fragments into microfragments of irregular shape. The Brinkmann Homogenizer consists of two principal components: a) the basic assembly, consisting of high-speed 700W motor, PCU speed control, stand and mounting hardware and b) the generator. Selection of the appropriate basic assembly is dependent on the generators to be used, which in turn depends on the materials and volumes to be homogenized. The 35/2 designation relates to the number of rotating and stationery rings on the homogenization end of the generator head, with the /2 designating rotors (one outer ring, one inner ring) being best for homogenization.

Vinegar was added and a milky opaque suspension of comminuted fibers was produced. The barbecue sauce base was blended with the xanthan/protein complex microfragment dispersion in a 9:1 weight ratio until well dispersed by means of a Hobart Blender. The blended product was evaluated and found to have improved body, texture and cling characteristics. In particular, it was shown that the addition of the microfragmented comminuted xanthan/protein complex dispersion to a barbecue sauce resulted in a product with superior coating capacity on barbecued chicken, with greater moisture retention in the cooked meat when compared with control.

EXAMPLE 15

Frozen Dessert Product

A reduced calorie, reduced fat frozen dessert product was prepared utilizing the microfragmented anisotropic xanthan/protein complex dispersion of Example 3, Lot 2 containing the hydrated xanthan/protein complex microfragments in aqueous dispersion, and having a solids content of 15 weight percent, based on the total weight of the dispersion. In preparing the new frozen dessert product, the following ingredients were utilized:

| Ingredients | Weight Percent | Amount (kg) |
|---|---|---|
| Water | 28.66 | 2.600 |
| Condensed skim (33.35% T.S.) | 37.48 | 3.400 |
| corn syrup 36 DE | 9.38 | 0.851 |
| sucrose solids | 10.75 | 0.975 |
| stabilizer blend of locust bean gum, guar gum, dextrose, whey solids, calcium carrageenan | 0.20 | 0.018 |
| emulsifier blend of mono & | 0.20 | 0.018 |

| Ingredients | Weight Percent | Amount (kg) |
|---|---|---|
| diglycerides microfragmented anisotropic xanthan/protein dispersion of Example 3 | 13.33 | 1.209 |

In preparing the frozen dessert mix, the condensed skim, corn syrup, sucrose, stabilizer, emulsifier and 80% of the water were thoroughly mixed in a Lanco (Kansas City, Mo.) high speed mixer. After mixing, these ingredients were passed through a HTST (Crepaco, Cedar Rapids, Iowa) and homogenizer (Manton-Gaulin, Everett, Mass.) system. At a flow rate of 0.28 cubic meters per hour, the base mix was preheated to 65.5° C. and then homogenized at dual stage pressure of 140 kg/cm$^2$ and 35 kg/cm$^2$, respectively. In addition, the temperature of the base mix was raised to 82.2° C. and held for 32 seconds. Prior to release from the HTST, the mix was cooled to less than 7° C. The base mix was then stored or aged at 4.4° C. for 24 hours.

Before the freezing process, the microfragmented anisotropic xanthan/protein complex dispersion of Example 3 was blended in a Waring table-top blender with the remaining water. The resultant mixture, previously made base mix, and artificial vanilla (at 0.07%) were combined and then cold homogenized using a single-piston homogenizer with a single-stage pressure of 140 kg/cm$^2$. The 9.07 kg of final mix was frozen to a finished weight of 613 g/liter using an 18.9 liter batch freezer (Model 20 of Emery Thompson, Bronx, N.Y.). Immediately after freezing, the product was transferred to the $-28.9°$ C. hardening room.

The vanilla frozen dessert product contained 0% milkfat and had 20% less calories than a conventional ice milk. The fat substituted dessert had a calorie content of 20 calories per 100 gram serving, as compared to a calorie content of 150 calories per 100 gram serving for a conventional 4% milkfat ice milk. The reduced fat and calorie product had a similar body and texture as compared to a conventional ice milk, with increased firmness. There was perceived fatty mouthfeel as measured against a 0% milkfat frozen dessert and the conventional ice milk.

EXAMPLE 16

A fibrous complex of highly substituted, high molecular weight carboxymethyl cellulose complexed with a mixture of egg albumen and whey protein was prepared for subsequent utilization in food products.

In preparing the fibers, 8.4 grams of food grade carboxymethyl cellulose ("CMC") having an average degree of substitution of about 0.9, a viscosity of about 3500 centipoise as measured on a Brookfield LVF viscometer, using Spindle #4 at 1 weight percent carboxymethyl cellulose dissolved in water at 30 rpm and 25° C., and an average molecular weight of about 150,000 daltons approximated using intrinsic viscosity (9H4F carboxymethyl cellulose product of Hercules, Inc., Wilmington, Del.) was suspended in 2,800 milliliters of distilled water, and the suspension was heated to about 130° F. to provide a fully dissolved carboxymethyl cellulose solution. The carboxymethyl cellulose solution was then chilled in a refrigerator for several hours (about 4 hours) to a temperature of 22° C. To the carboxymethyl cellulose solution was added 33.6 grams whey protein concentrate ("WPC"), Kraft Whey Protein Concentrate containing about 35% by weight protein, followed by 33.6 grams of dried egg white ("DEW"), Kraft Blue Label #207 Dried Egg White, while the carboxymethyl cellulose solution was stirred in a Waring blender at medium speed (about 1025 rpm). The resulting complex fiber-forming solution mixture was stirred in the Waring blender for 5 minutes and then acidified in a 4 liter beaker with 1 molar hydrochloric acid with stirring using a 1 cm wide 9 inch long spatula to produce long, stringy fibers. Fibers started to form when the solution was acidified to pH 6.0. These fibers were very white and similar to the xanthan gum/protein complex fibers prepared under similar conditions.

The fibers were analyzed and found to have the following composition:

| Composition of Edible CMC/Protein Complex Fibers | |
|---|---|
| Component | Weight Percent |
| Protein | 10.90 |
| Carbohydrate | 2.90 |
| Fat | 0.60 |
| Ash | 0.14 |
| Moisture | 84.50 |

The carboxymethyl cellulose/protein complexed fibers were white, bland, chewy and had meat-like or seafood-like texture. One part of these carboxymethyl cellulose/protein complex fibers was boiled in 10 parts of water for 3-5 minutes to give firm, stable, chewy, white and bland fibers, which could be flavored with meat, poultry, fish, shellfish, or other seafood flavors to give carboxymethyl cellulose/protein based meat, poultry, fish, shellfish and other seafood products, as previously described with respect to xanthan gum/protein fiber utilization and food product formulation.

Chicken flavored patties were prepared having a meaty, chewy texture and excellent flavor. The above procedure was also carried out with other carboxymethyl cellulose products of Hercules, Inc., having different degrees of substitution, and molecular weight as follows:

| Carboxymethyl Cellulose Molecular Wt | Viscosity Centipoise | Degree of Carboxymethyl Substitution | Product Designation |
|---|---|---|---|
| 150,000 | 500-2000 | 0.4 | 4H1F |
| 150,000 | 1500-3000 | 0.7 | 7HF |
| 70,000 | 70,000 | 1.2 | 12M31F |

The viscosity was measured as previously described for the 9H4F carboxymethyl cellulose, except that a Spindle #3 was used in the Brookfield LVF viscometer. The molecular weight was estimated based on intrinsic viscosity data.

None of these products formed fibers with the egg white and whey protein concentrate when following the same procedure which produced fibers using the 9H4F product having a degree of substitution of 0.9 and an average or molecular weight of about 150,000 daltons.

EXAMPLE 17

In order to prepare highly substituted carboxymethyl cellulose fibers for high shear fragmentation, 9 g. of carboxymethyl cellulose (9H4F carboxymethyl cellulose from Hercules, Inc.) were dispersed in 3000 distilled water and the dispersion was stirred in a Waring Blender at medium speed at 22° C. for 5 minutes. 36 g. WPC (Kraft whey protein concentrate, containing 35% protein) into the carboxymethyl cellulose solution in the Waring blender with stirring under the same conditions. To this mixture was added 36 g. KDEW (Kraft dried egg whites, blue label) in the Waring blender with stirring under the same conditions, followed by stirring in the Waring blender under the same conditions for 5 minutes.

To the resulting fiber forming solution was added 79 ml. of 1 m HCl which was allowed to diffuse throughout the mixture (with punching holes in the reaction mixture using a 1 cm×20 cm spatula). The acidified carboxymethyl cellulose/protein mixture was stirred by spatula to generate fibers. This procedure was repeated five times and the carboxymethyl cellulose/protein fiber suspensions were combined.

The fibers were collected and stored in a 5° C. refrigerator before boiling. The previous steps were repeated three times, and the resulting fibers were combined to produce 3 gallons of carboxymethyl cellulose/egg white/whey protein complex which was then boiled for 5 minutes to stabilize the fibers, washed and drain-dried, boiled for 5 minutes, washed with cold tap water and drained. The boiled, washed fibers were mixed with water to produce a slurry, and then subjected to intense shear through the use of a CD150 cell disruptor generally as described in Example 1 to break the carboxymethyl cellulose/protein fibers up into small microfragments (12,000 to 15,000 psi, 90°-130° F.) to produce a fluidized aqueous dispersion having a white, smooth, creamy texture, and a bland taste. The dispersion was centrifuged at 1000 g, 10° C. for 10 minutes to provide a creamy concentrated dispersion having a solids content of 25.6 weight percent.

EXAMPLE 18

Figure 22:

A carboxymethyl cellulose/protein complex was prepared on a pilot plant scale apparatus like that of FIG. 1 by suspending 280 grams (0.396 lb.) of carboxymethyl cellulose (Hercules 9H4F) in 132 pounds deionized water, and blending the suspension with a Triblender batch mixer at 22° C. for 5 minutes. To the supsension-solution was added 720 grams (1.58 lb.) whey protein concentrate (Kraft WPC), followed by 720 grams dried egg whites (Kraft Blue Label), to the solution, and the gum/protein mixture was blended under these conditions for 5 minutes. As generally shown in FIG. 1, the carboxymethyl cellulose/protein solution was pumped by a pump 110 while hydrochloric acid 114 (2.5 Normal) was metered into the carboxymethyl cellulose/protein mixture line and the acidified mixture conducted through the hold tube 113 and the pump 118, at a rate such that the fiber suspension coming out of the fiber pump 118 was at about pH 3.0. The fibers are long, stringy, and highly anisotropic [FIG. 22].

The fibers produced in this manner were drained on screens. This procedure was repeated to produce multiple batches of fibers. The drained fibers were boiled in water for 6 minutes and drained again on screens. Similar fibers were successfully prepared in the same manner using the carboxymethyl cellulose with egg white and sodium caseinate in a 1:4:4 weight ratio.

Fibers of carboxymethyl cellulose/egg white +whey protein complex or carboxymethyl cellulose/egg white/caseinate complex were chopped into small pieces using a Pentax homogenizer and then microfragmented at a 5 weight percent totals solids level by conducting 8 passes through a CD 150 cell disruptor (A.P.Z. Gaulin Corp., Boston, Mass.) at 15,000 psi and a 130° F. discharge temperature. The microfragmented aqueous dispersion was concentrated by passage through a Turbafilm evaporator as described hereinabove, to provide a thick, viscous microfragmented aqueous dispersion having a total solids content of 17 weight percent. The resulting dispersion was very white, bland, smooth and creamy.

The microfragmented carboxymethyl cellulose/ protein complex dispersion is very white, smooth, creamy and bland and can be used as a fat substitute in a wide variety of food products. The fluidized carboxymethyl cellulose/protein complex solids may be collected by centrifugation at 4,100×g. and at 10° C. for 10 minutes The centrifuged pellets of the fluidized carboxymethyl cellulose/protein complex are very white, smooth, creamy and can be used as a fat substitute.

The dimensions of the carboxymethyl cellulose/protein complex and xanthan/protein complex microfragments and the emulsion-droplet sizes of model emulsions were measured by using a Leeds and Northrup Microtrac particle size analyzer.

The various aqueous microfragmented polysaccharide/protein complex dispersions which may be prepared from different combinations of protein and polysaccharide components have microstructural and rheological and other property differences which provide corresponding performance differences in food product utilization.

Although it has various colloidal, microstructural, rheological and other differences from the microfragmented xanthan/egg white/whey protein complex as previously described, the microfragmented carboxymethyl cellulose/egg white/whey protein complex is smooth, creamy, has a fat-like mouthfeel and can be used as a fat replacer.

EXAMPLE 18A

A mayonnaise model emulsion was prepared by the formula and procedure as described below:

Formula: soybean oil, 39.6%; the concentrated CMC/protein dispersion of Example 17 (25.6% solids), 39.6%; whole egg mix, 8.8%; Marshall yolks, 1.8%; sugar, 0.75%; salt, 0.25%; deionized water, 3.2%; and 6% vinegar, 6%.

Procedure

1. Dissolve 2.5 gram salt and 7.5 gram sugar in 32 grams of deionized water in a one-gallon Hobart blender.
2. Disperse 88 grams whole egg mix, 18 gram Marshall yolks, and 39.6 grams of the concentrated 25.6 weight percent aqueous carboxymethyl cellulose/protein complex dispersion in the salt/sugar solution.
3. Add soybean oil in small portions (i.e., 60 ml at a time) into the dispersion while blending in the Hobart blender at the highest speed (i.e., speed 3) and at 22 C.
4. Change the mixing speed from fast to medium (i.e., from Speed 3 to 2) after half the soybean oil is added and then add the rest of the oil in small portions into (3) while blending at the medium speed.
5. Add 60 ml of 6% vinegar in small portions (i.e., 10 ml at a time) into (4) while blending at the medium speed.

6. Continue blending (5) at the medium speed for 1 minute after everything is added to form a mayonnaise pre-emulsion.

7. Homogenize the mayonnaise pre-emulsion on a Gaulin bench top colloid mill at 22° C. to form a mayonnaise model emulsion.

The viscosity of mayonnaise model emulsions was measured on a Haake VT24 viscotester using a No. 4 spindle blade at 22° C.

The mayonnaise-type product prepared with the carboxymethyl cellulose/whey protein+egg white microfragmented aqueous dispersions had smaller emulsion droplets than a control mayonnaise-type product prepared with a xanthan/whey protein+egg white microfragmented dispersion, indicating potentially higher stability for the carboxymethyl cellulose/protein complex product. The viscosity of carboxymethyl cellulose/protein based mayonnaise is very similar to a conventional mayonnaise control while the viscosity of the xanthan/protein complex based mayonnaise type control is slightly too thick, which may be due to the fact that the xanthan/protein complex is less dense and adsorbs more water than the carboxymethyl cellulose/protein product as discussed in Example 18C. The xanthan/protein complex dispersion based mayonnaise type product was perceived only slightly creamier than the carboxymethyl cellulose/protein complex based mayonnaise type product.

The particle size of the precipitated complex was determined by adding a small amount of fibers thoroughly dispersed in a pH 5.5. citrate phosphate buffer solution.

A few drops of the dispersion were added to the distilled water circulating in the Microtrac analyzer. Size measurement results from an average of 3 runs were as follows:

| Mayonnaise Model Emulsions Prepared With Microfragmented Polysaccharide/Protein Complexes | | |
|---|---|---|
| Polysaccharide | Dispersion Particle Size-Largest Dimension (microns) | Viscosity (HU)* |
| CMC (carboxymethyl cellulose) | 3.89 | 780 |

*HU = Haake unit

EXAMPLE 18B

A vanilla frozen dessert product was prepared utilizing the carboxymethyl cellulose/egg white+whey protein complex dispersion of Example 18 as described in Example 15, and comparison vanilla frozen desserts were prepared using a full fat control and a xanthan/egg white+whey protein complex dispersion.

The vanilla frozen dessert utilizing the carboxymethyl cellulose/protein complex dispersion was perceived as creamier than both the full fat control and the xanthan/protein based products. This may be due to the fact that the carboxymethyl cellulose/protein complex at the pH of the frozen dessert is very negatively charged and well dispersed. It is noted that the viscosity of the carboxymethyl cellulose/protein complex increases more sharply (especially at high concentration) than viscosity of the xanthan/protein dispersion as the pH increases.

EXAMPLE 18C

The aqueous, microfragmented carboxymethyl cellulose/protein complex dispersion of Example 18 was characterized by various microscopic methods. The concentrated sample of carboxymethyl cellulose/protein complex from Example 18 was diluted in 0.05M sodium cacodylate buffer (pH 5.5) and vortexed in order to disperse the fragments. The diluted sample was placed on a glass slide, coverslipped and observed using differential interference contrast optics on a Zeiss Axiophot photomicroscope.

Concentrated samples were diluted using 0.05M sodium cacodylate buffer (pH 5.5), based on optical opacity. Due to the small size of the material a special method was ed for carrying the particles through the various processing steps. Polycarbonate membranes (Nuclepore) with pore diameters of 0.1 microns were used to make a sandwich between which the diluted carboxymethyl cellulose/protein complex was placed to allow free flow of fixatives, dehydrating agents, and other processing agents while retaining the material in a diluted form suitable for scanning electron microscope ("SEM") observation. The material was fixed in 2% glutaraldehyde in 0.05M sodium cacodylate for 15 minutes, dehydrated in an acetone-water series to 100% acetone and critical point dried using carbon dioxide. The sandwich was subsequently dismantled and one of the two membranes with attached particles was affixed to an SEM stub and gold coated.

The 25% solids carboxymethyl cellulose protein complex was encapsulated in 4% agar and immediately fixed in 2% glutaraldehyde in 0.05M sodium cacodylate buffer for overnight storage at 4° C., rinsed twice in the same buffer, post-fixed in 1% osmium tetroxide in the same buffer for 1 hour at 4° C. followed by 30 minutes at room temperature. After a buffer rinse, the material was dehydrated in a graded ethanol series followed by two rinses in 100% acetone, 10 minutes each and embedded in Epon/Araldite epoxy resin. Thin sections were stained in 2% aqueous lead citrate and uranyl acetate. Observation and recording of images was performed using a Zeiss C-10 transmission electron microscope.

EXAMPLE 18D

Figure 24:

After microfragmentation by microfluidization, the carboxymethyl cellulose/protein complex is broken into fragments which range in size from approximately 0.2 to 5 microns. These particles are neither spherical or filamentous in shape as determined by LM (FIG. 24), SEM (FIG. 25) or TEM (FIG. 26). Based on all three methods, it can be said that the material after microfluidization appears as irregular fragments of a wide size range.

Figure 25:
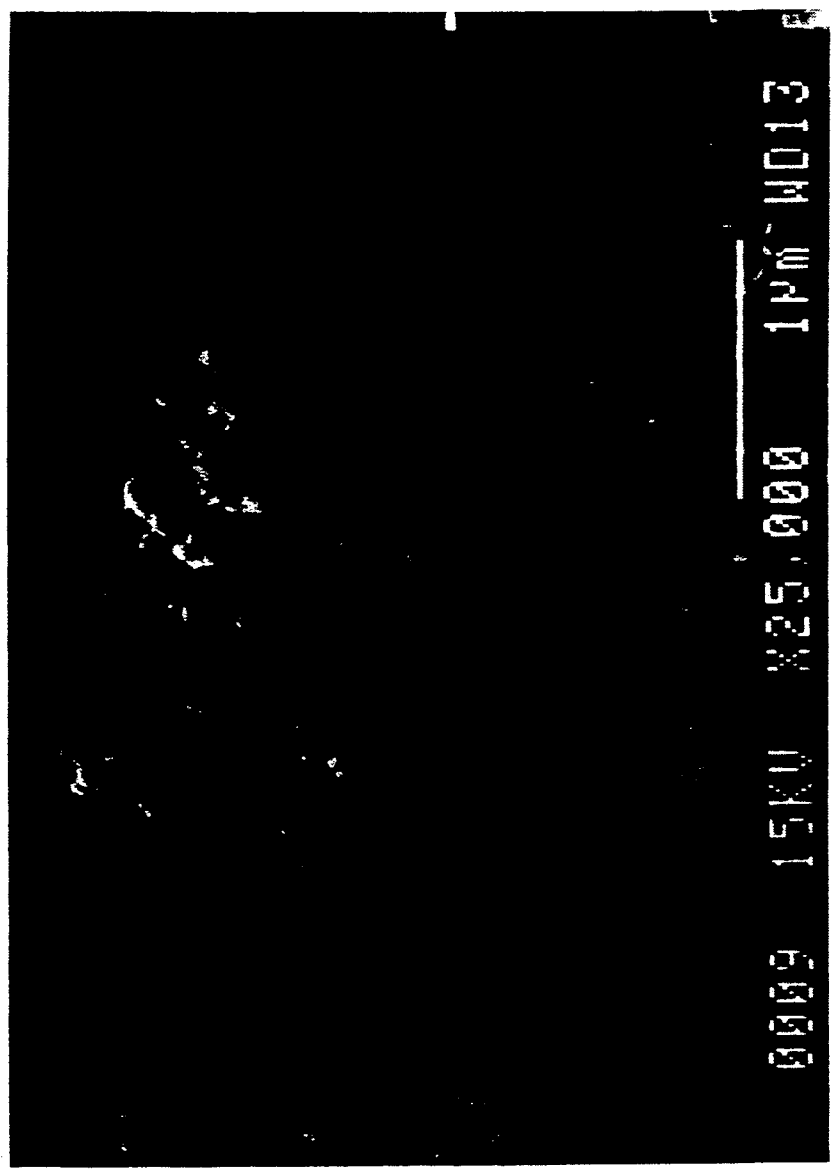
Figure 26:
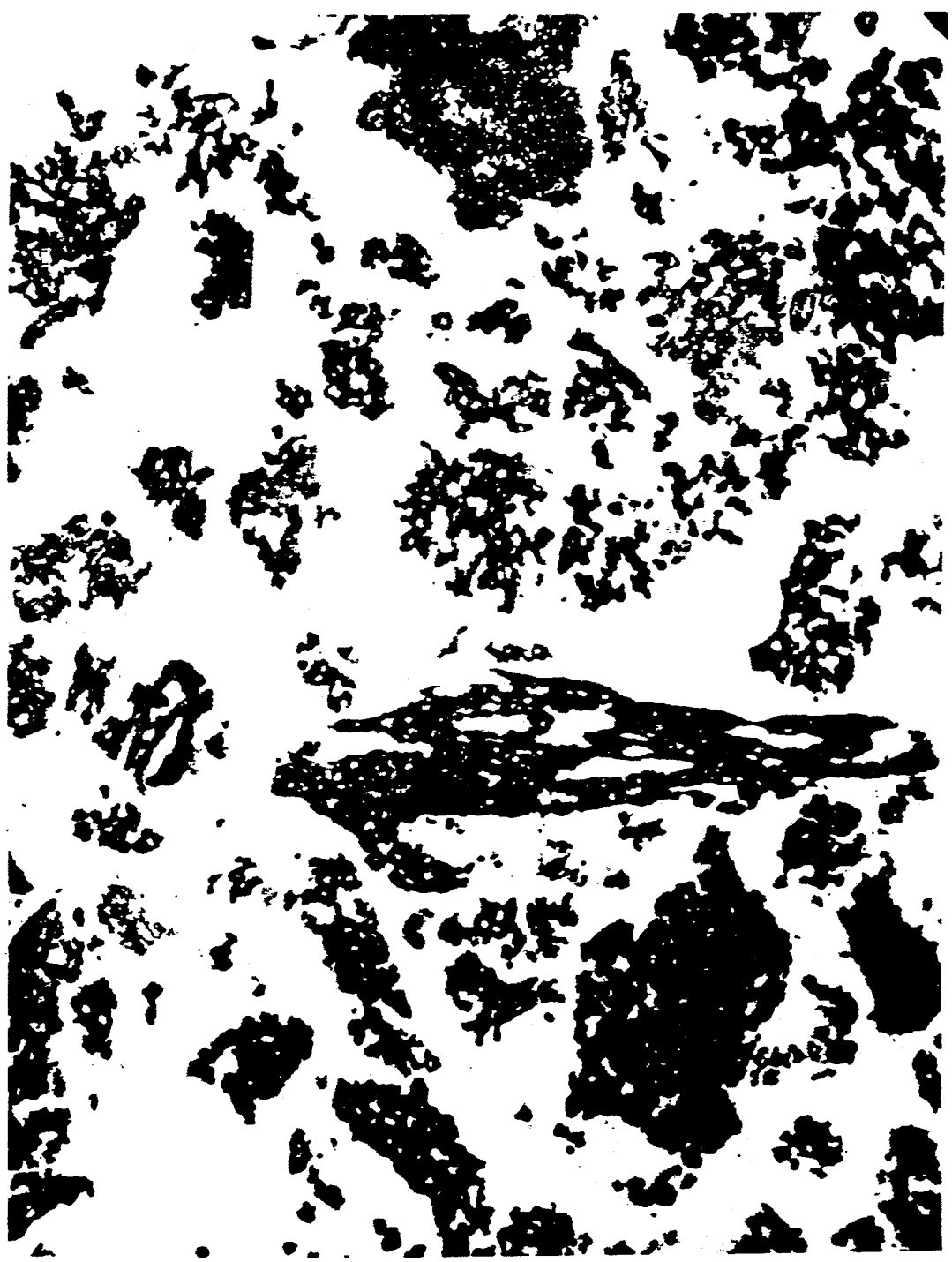

When viewed by SEM, as shown in FIG. 25, the fragments appear as irregular shapes which vary in density or degree of openness. While some fragments are relatively dense or closed, the majority are best described as sponge-like. Numerous openings occur on the surface and extend into and even through the fragments. This is supported by the TEM images shown in FIG. 26, which present sectional profiles through the material. The profiles of most fragments emphasize the open nature of this material.

The aqueous carboxymethyl cellulose/whey protein/egg white complex of Example 17 having a total solids content of about 25.8% by weight as determined by microwave moisture analysis, was subjected to a variety of physical measurements. Samples for viscosity measurements were prepared at various levels of concentration, pH and added sodium chloride. Suspensions of the material were prepared by weighing out the concentrated material into scintillation vials, adding NaCl if necessary, and diluting to the desired concentration by addition of distilled water or buffer. Citrate/phosphate buffers with pH ranging from 3.0 to 7.0 were used to adjust the pH of the suspensions. The pH range was extended by adding 6M NaOH or 6M HCl to the vials taking care not to mix the concentrated base and the complex before shaking. The samples were shaken vigorously by hand and then homogenized with a Polytron homogenizer for about 30 seconds. The pH of each sample was measured prior to the viscosity measurements. The composition of samples measured in this study are listed below.

| The Composition of Microfragmented Carboxymethyl Cellulose/Protein Complex | |
|---|---|
| Component | Percent |
| Moisture | 74.41 |
| Fat | 0.55 |
| Protein* | 19.1 |
| Carbohydrate | 2.4 |
| Ash | 0.09 |

*The protein consists of 33% ovalbumin, 25% beta-lactoglobulin, and 14% alpha-lactalbumin among which 54% ovalbumin and 18% beta-lactoglobulin are cross-linked Flow curves of the samples (FIGS. 39a, 39b, and 39c) were measured using a Carri-Med Controlled Stress Rheometer at 25.0 (±0.1) degrees C. Measurements were made using a cone and plate geometry with either a 6 cm 1 degree 1'30" cone or a 4 cm 1 degree cone. The instrument was operated in the controlled shear rate mode. Shear rates were varied from 0 to 150 s$^{-1}$ over a three minute period (up curve), then held at 150 s$^{-1}$ for 1 minute (peak hold) and then lowered back to 0 s$^{-1}$ over another three minutes (down curve). This experimental procedure was utilized to subject all of the samples to the same flow history, and to minimize any time dependent shear effects. For comparison purposes, the viscosity at a shear rate of 50 s$^{-1}$ from the down curve was chosen. This shear rate is in the range that occur in the mouth when eating viscous or semi-solid foods [Daget. et al., "Creamy Perception I. In Model Dessert Creams", J. Texture Studies, 18, 367-388 (1987)].

The viscosities at 50 s$^{-1}$ are plotted vs. concentration in FIG. 27 and compared with similar results for a xanthan/protein complex dispersion. The viscosity of both the xanthan/protein and carboxymethyl cellulose/protein complex dispersions appear to have exponential dependences on concentration.

The pH dependence of the viscosity was measured at both 5 and 13 weight percent total solids content. A plot of viscosity vs. pH in FIG. 28 shows that viscosity of the 13 weight percent dispersion is very dependent on pH with a minimum located between pH 3.5 and 4.0. The viscosity rises sharply at higher pH, changing over a factor of 1000 from pH 3.66 to 5.51. The viscosity vs. pH curve of a 5 weight percent dispersion of the carboxymethyl cellulose/protein complex shows smaller but similar trends.

The viscosity at 50 s$^{-1}$ is plotted as a function of NaCl concentration and compared with similar results for a xanthan/egg white+whey protein complex microfragment dispersion in FIG. 29. Addition of salt to a dispersion of the microfragmented carboxymethyl cellulose/protein complex decreases the viscosity up to a salt concentration of 0.72%, but above that level the viscosity begins to increase with increasing concentration. In contrast, the viscosity of a xanthan/protein complex dispersion continues to decrease and level off at about 2 weight percent salt concentration. Food products such as salad dressings, table spreads and sauces may contain 2 percent or more by weight salt.

Figure 21:
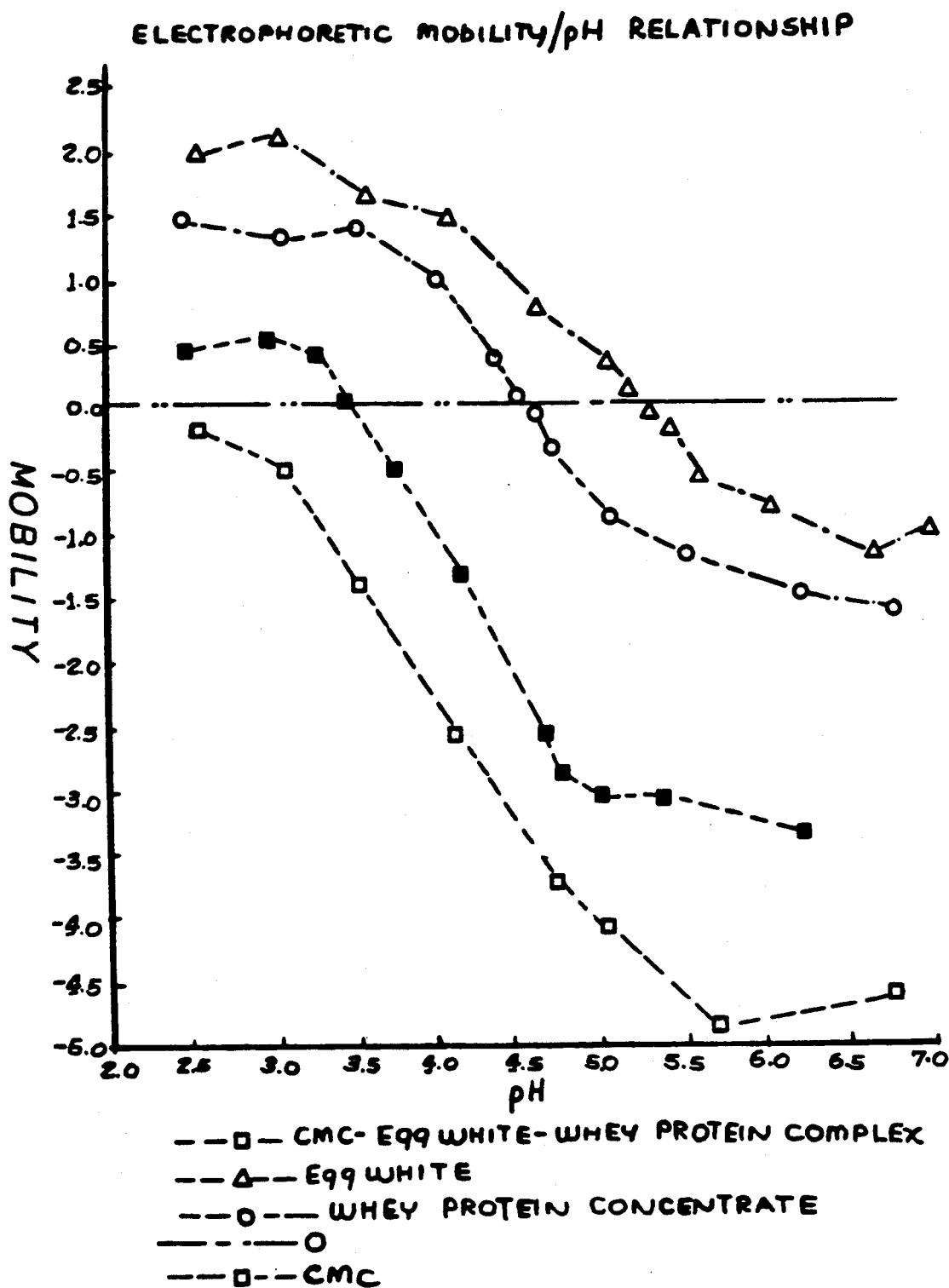
Figure 23:
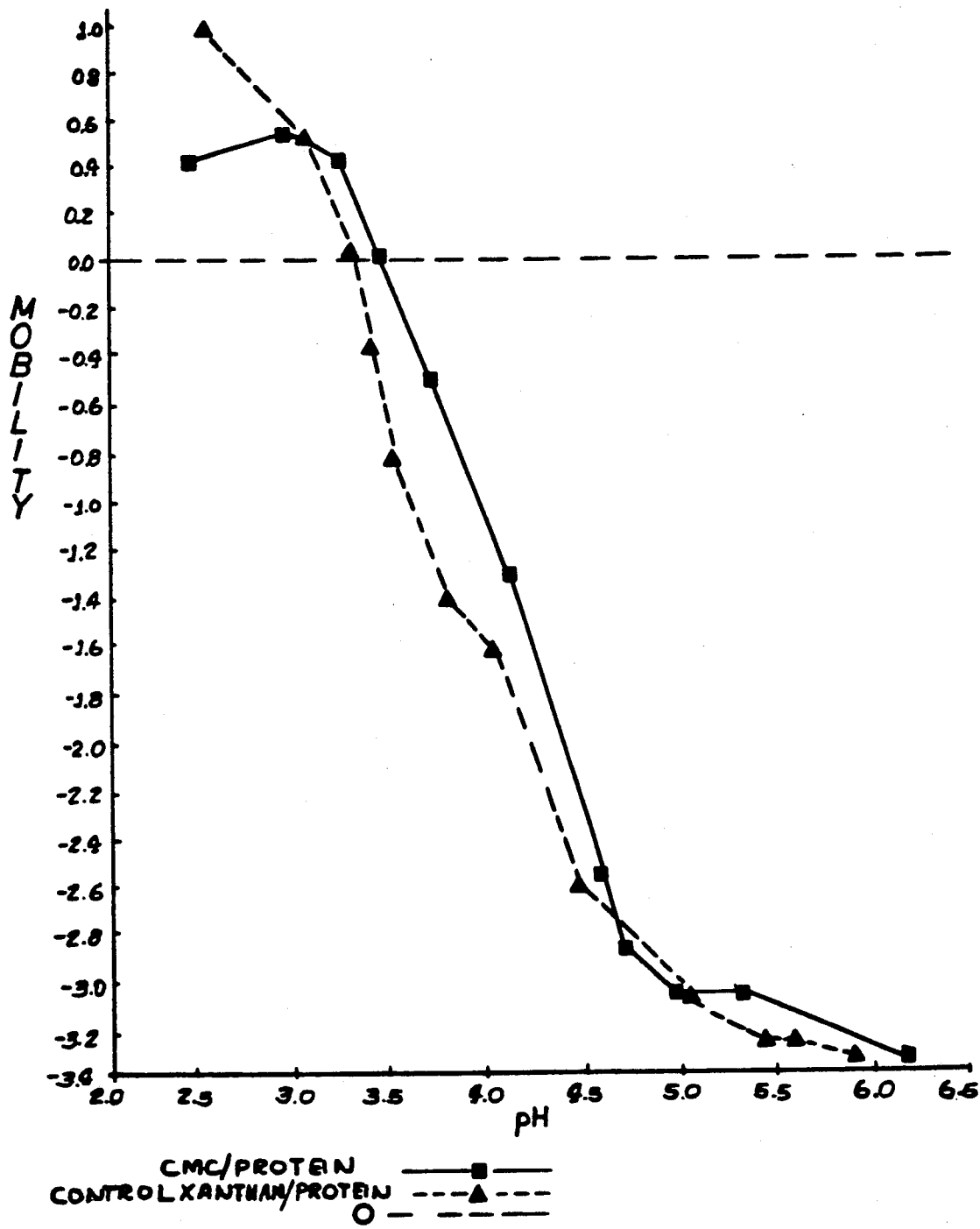

The electrophoretic mobility of 0.5 mg/ml colloidal carboxymethyl cellulose/protein complex and xanthan/protein complex dispersions were measured on a PenKem System 3000 electrokinetic analyzer at various pH's and 25° C. The isoelectric point is the pH where the electrophoretic mobility is zero. The mobility unit is 10E-08 meter/sec/volt/meter. The electrophoretic mobility of the carboxymethyl cellulose/protein complex and the components are shown as a function of pH in FIG. 21, while the electrophoretic mobility of a microfragmented carboxymethyl cellulose/egg white+whey protein complex is shown in comparison to that of a microfragmented xanthan/egg white+whey protein complex in FIG. 23.

The following table shows that the carboxymethyl cellulose/protein complex has a higher protein/gum ratio for the egg white and whey protein employed than the xanthan/protein complex.

| Microfragmented Polysaccharide/ Egg White/Whey Protein Complexes | | |
|---|---|---|
| Polysaccharide | Protein/Gum Ratio | Particle Size (microns) |
| Xanthan | 3.5/1 | 7.12 |
| CMC (Carboxymethyl cellulose) | 8/1 | 6.68 |

EXAMPLE 19 - Chitosan

A microfragmented, cationic polysaccharide/protein aqueous dispersion was prepared using chitosan as the cationic polysaccharide. Five grams of WPC (Kraft Whey Protein Concentrate containing 35% protein) was suspended in 560 ml of distilled water in an Osterizer blender at 22° C., and 5 grams of KDEW (Kraft Blue Label Dried Egg White) were added into the WPC suspension with stirring to from a protein solution. To the protein solution was added 1.25 gram of chitosan (100 mesh, Broshell Inc.) and the gum/protein mixture was stirred for 3 minutes (at 22° C.). The pH of the chitosan/WPC/KDEW mixture was adjusted to 7.1 (the pH before acidification), 6.3, 6.0, 5.5, 4.5, 4.0 and 3.5. Chitosan/WPC/KDEW mixtures at different pH's were centrifuged at 1000×g. at 22° C. for 10 minutes. The supernatant liquids were decanted and used for turbidity and protein quantification by using a Lowry method. The chitosan/protein complex appeared to precipitate most readily between pH 6.3 and pH 5.5, at which (pH's) the complex is sufficiently stable that boiling is not necessary to stabilize the complex for many uses.

The turbidity of the supernatant solutions as a function of pH was determined, as shown by FIG. 30, indicating the maximal precipitation (minimum solubility) of the chitosan/egg albumen/whey protein complex was between pH 6.3 and pH 5.5, while based on the protein determination of the supernatant solutions, the maximal precipitation (or minimal solubility) was determined (FIG. 31) to be about pH 5.5. The electrophoretic mobility of the chitosan/protein complex was determined as a function of pH, as previously described, together with respective mobilities of the various components, as shown in FIG. 32. The precipitated chitosan/protein complex was stabilized by boiling in water for 5 minutes, and subjected to microfragmentation as described in Example 17 to provide a 5 weight percent aqueous dispersion. The dispersion was concentrated by centrifugation to provide a concentrated dispersion.

Figure 33:
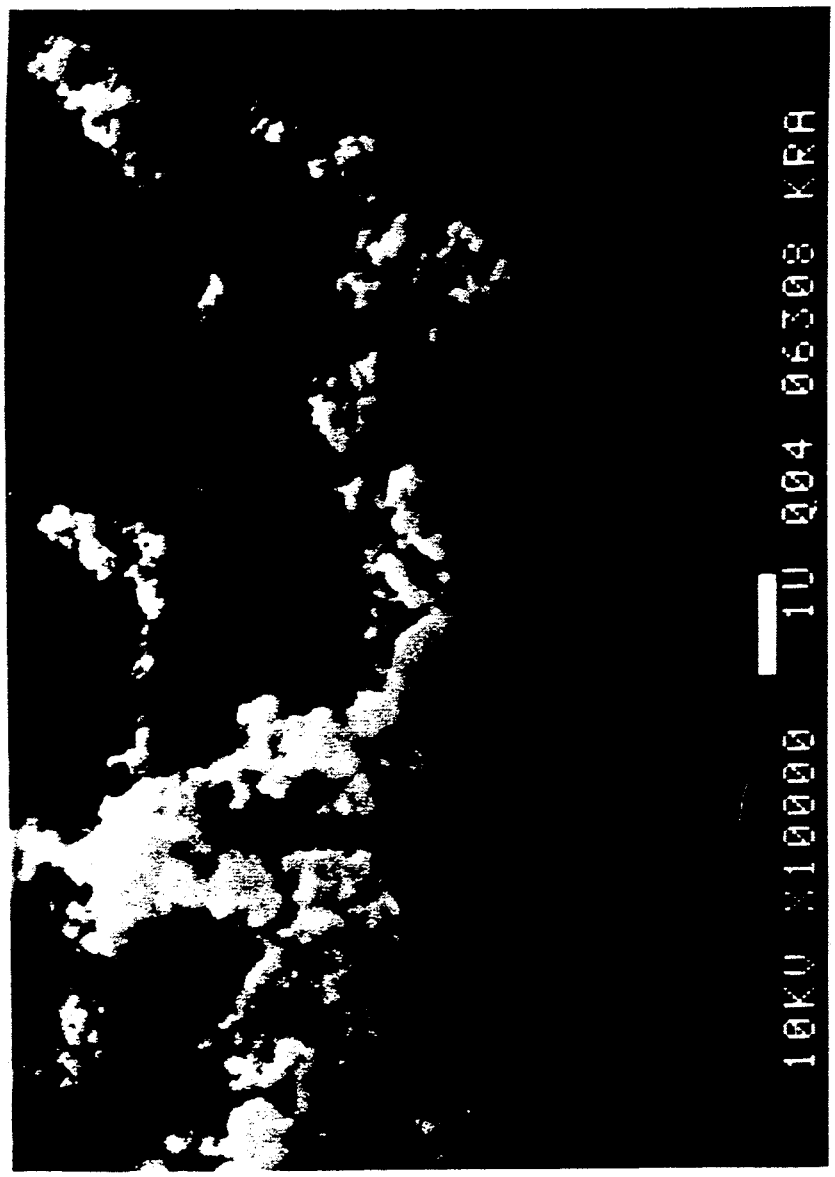
FIG. 33 is a scanning electron photomicrograph of a microfragmented chitosan/protein complex at a magnification of 10,000.
Figure 34:
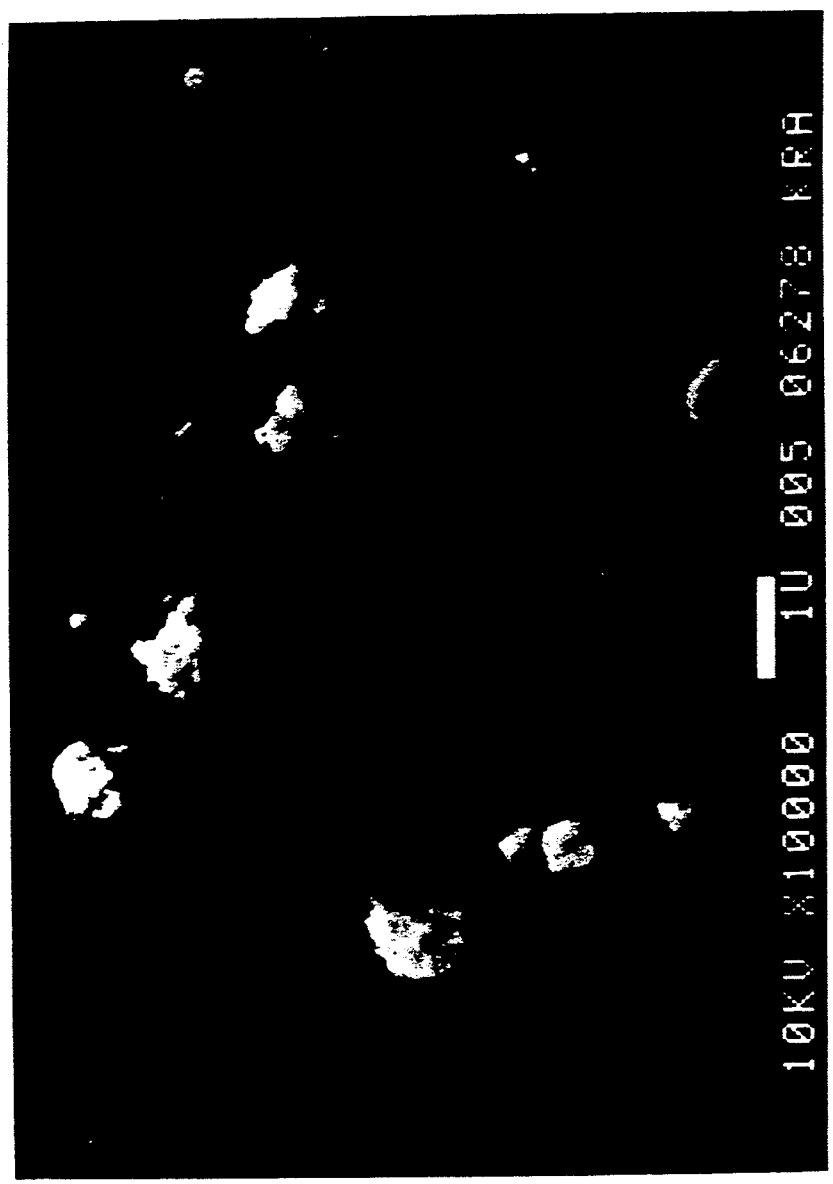
FIG. 34 is a scanning electron photomicrograph of a microfragmented carboxymethyl cellulose protein complex at a magnification of 10,000.

A photomicrograph of the microfragmented chitosan complex dispersion particles is shown in FIG. 33.

EXAMPLE 20

Carrageenan Complex

Figure 35:
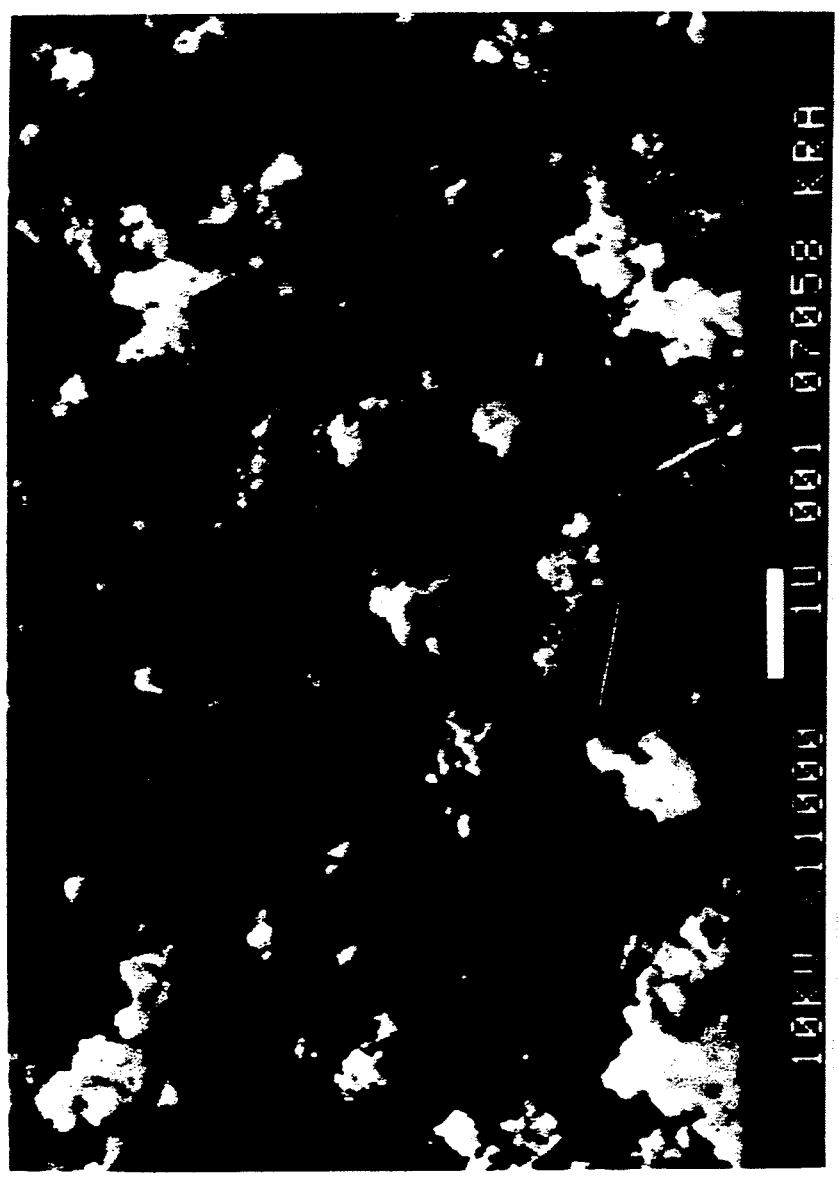
FIG. 35 is a scanning electron photomicrograph of a microfragmented carrageenan protein complex at a magnification of 11,000.
Figure 36:
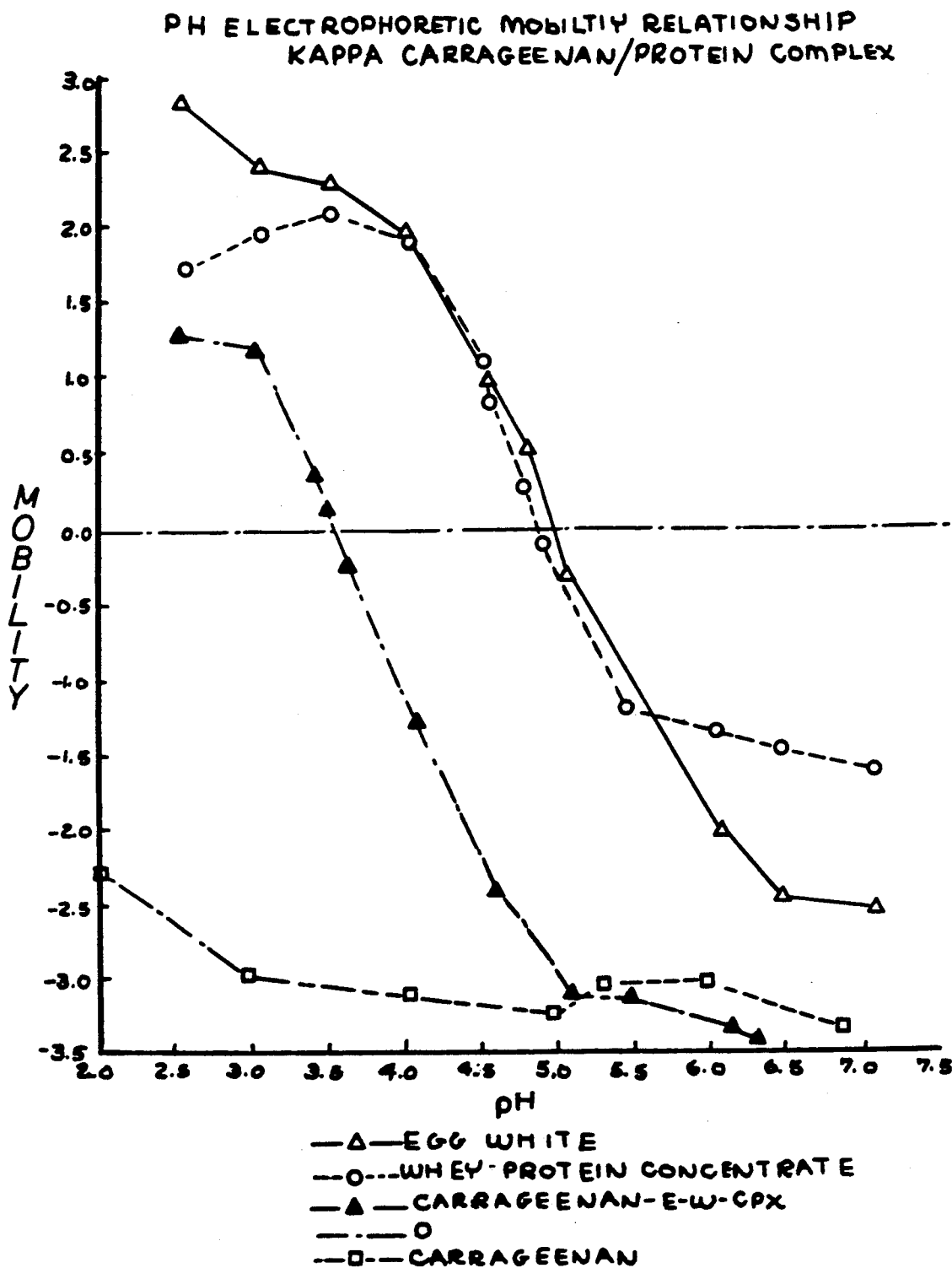
FIG. 36 is a graphical representation of the relationship of electrophoretic mobility of a carrageenan/egg white/whey protein complex as a function of pH, together with the respective mobilities of the individual components.

A carrageenan—egg white—whey protein complex was prepared in a manner substantially similar to that of Example 17, except that kappa carrageenan was used instead of carboxymethyl cellulose. The complex was boiled for 5 minutes, cooled, washed and fluidized by using a CD150 cell disruptor. This fluidized carrageenan—egg white—whey protein complex was adjusted to pH 4.0 and then centrifuged at 10,000×g. and at 10° C. for 20 minutes. The fluidized carrageenan-protein complex (after centrifugation) was white, smooth, creamy and had fat-like characteristics. A photomicrograph of the kappa carrageenan/protein complex dispersion particles is shown in FIG. 35. A graphical representation of the relationship of electrophoretic mobility of a carrageenan/egg white/whey protein complex as a function of pH, together with the respective mobilities of the individual components is shown in FIG. 36.

EXAMPLE 21—Gellan

Figure 37:
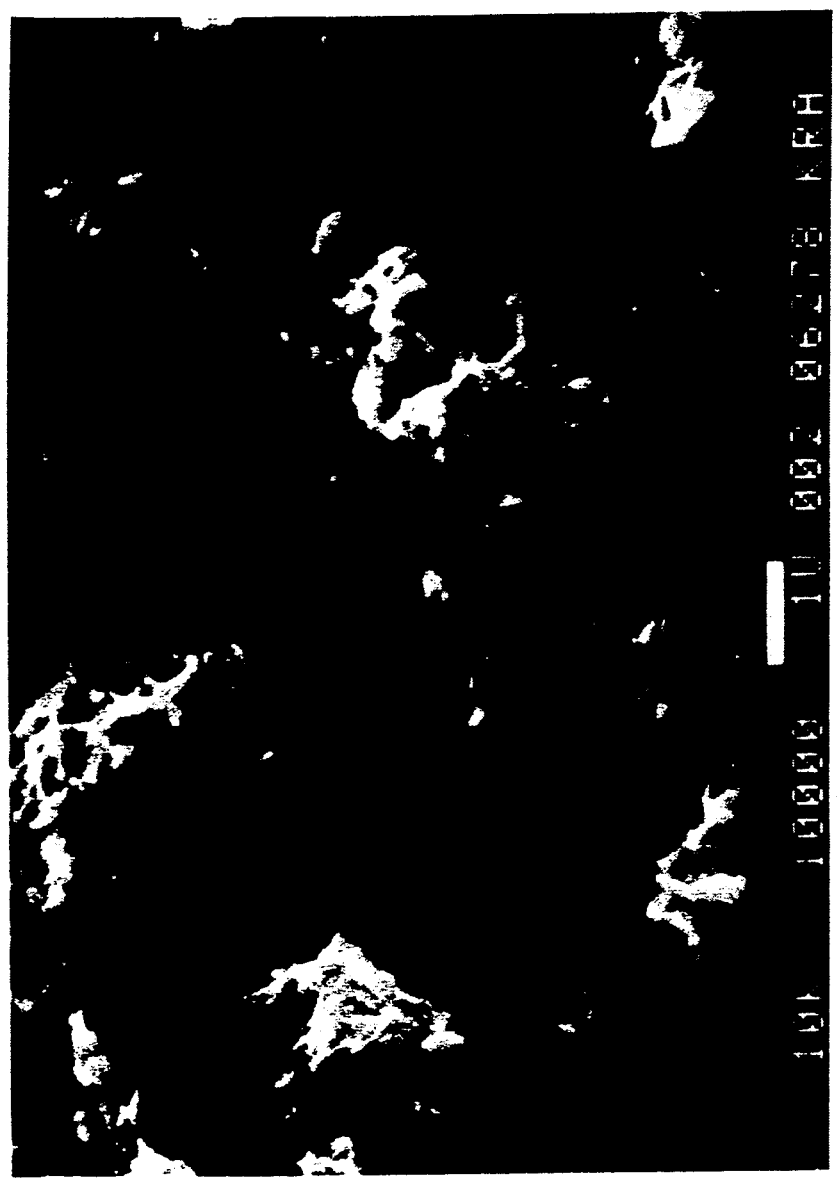
FIG. 37 is a scanning electron photomicrograph of a microfragmented gellan/xanthan protein complex at a magnification of 10,000.
Figure 38:
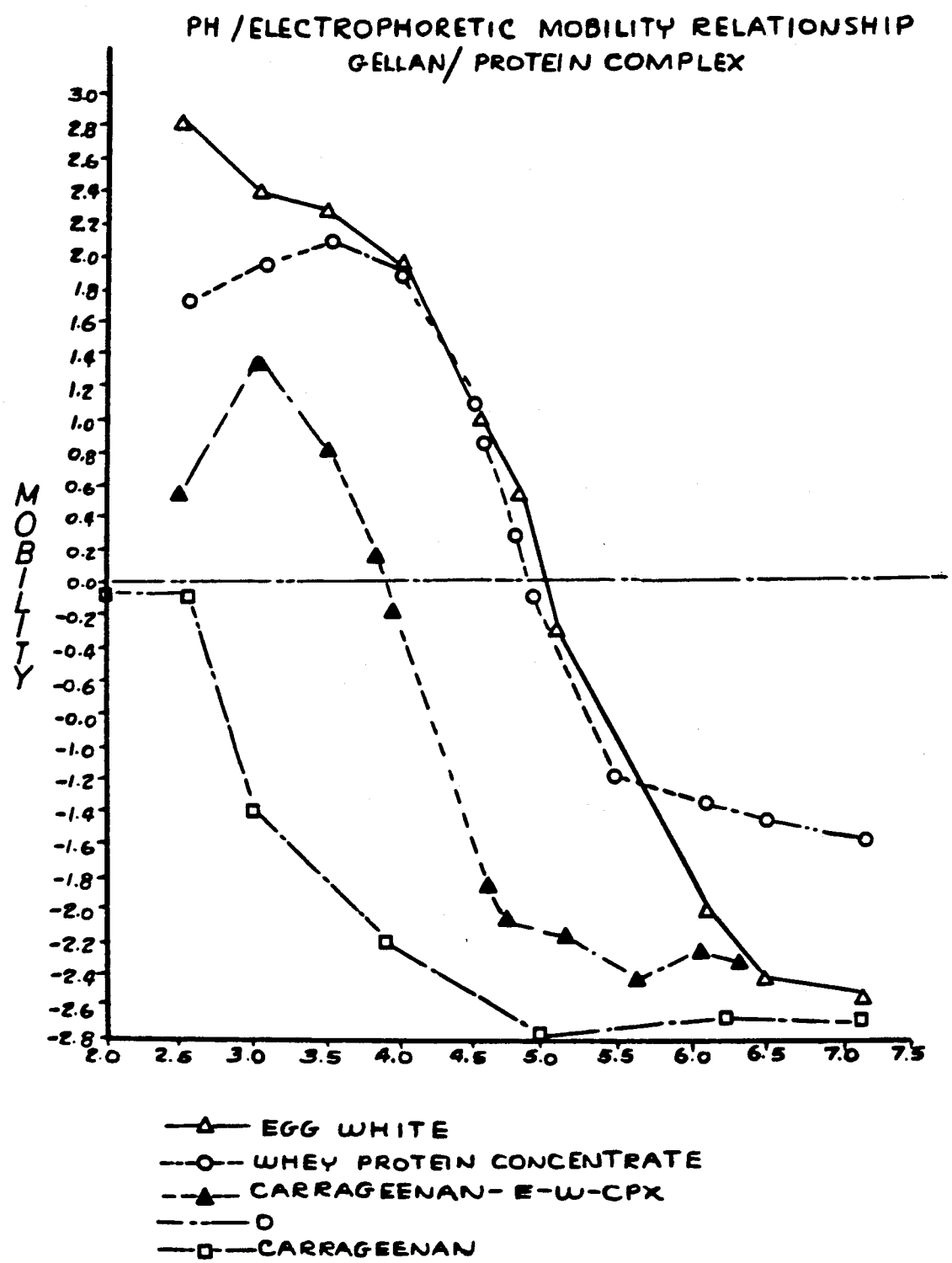
FIG. 38 is a graphical representation of the relationship of electrophoretic mobility of a gellan/egg white/whey protein complex as a function of pH, together with the respective mobilities of the individual components.

A gellan—egg white—whey protein complex was prepared in a manner substantially similar to that of Example 17, except that gellan was used instead of carboxymethyl cellulose. The complex was boiled for 5 minutes, cooled, washed and fluidized by using a CD150 cell disruptor. This fluidized gellan—egg white—whey protein complex was adjusted to pH 4.0 and then centrifuged at 10,000×g. and at 10° C. for 20 minutes. The fluidized gellan-protein complex (after centrifugation) was white, smooth, creamy and has fat-like characteristics. A photomicrograph of the gellan/protein complex is shown in FIG. 37. The graphical representation of the relationship of electrophoretic mobility of a gellan/egg white/whey protein complex as a function of pH, together with the respective mobilities of the individual components is shown in FIG. 38.

EXAMPLE 21A

The microfragmented ionic polysaccharide/protein dispersions prepared in Examples 17-21 were subjected to analysis of protein/polysaccharide ratio, maximum particle size and shape, and protein denaturation as follows: (Dntd OVa and Dntd BLG are abbreviations for denatured and cross-linked ovalbumin and beta-lactoglobulin, respectively.)

| Protein:Gum Ratio | Protein Denaturation | Particle Maximum Dimension |
|---|---|---|
| Carboxymethyl Cellulose/Protein Complex | | |
| 8:1 (7.9:1) | Dntd OVA 54% | 0.5-3.0 μm by SEM |
|  | Dntd BLG 18% | 1 × 2 μm common |
| Kappa Carrageenan/Protein Complex | | |
| 8:1 (8.3:1) | Dntd OVA 69% | 0.2 × 1.0 μm by SEM |
|  | Dntd BLG 43% | 0.4 μm common |
| Gellan/Protein Complex | | |
| 5:1 (4.6:1) | Dntd OVA 81% | 0.1 × 1.0 μm by SEM |
| Chitosan/Protein | | |
| n.d. | Dntd OVA 90% | 0.1-0.2 μm by SEM |

EXAMPLE 21B

Mayonnaise-like salad dressings and frozen desserts were prepared using each of the concentrated, 5 microfragmented aqueous dispersions of Examples 18-21, by substitutinq the concentrated microfragmented dispersion for the major portion of the fat components. The preparation of the model mayonnaise emulsion of Example 18A has been described herein above. The respective, microfragmented dispersions of Examples 19, 20 and 21 were each formulated in model mayonnaise emulsion in the same manner as described in Example 18A, with substitution of the respective concentrated dispersion of each Example for the CMC/protein dispersion. The mayonnaise products had the following viscosity.

| Polysaccharide | Mayonnaise Emulsion Droplet Size (Microns) | Viscosity (Haake Units) |
|---|---|---|
| Xanthan gum/protein control | 4.48 | 1860 |
| CMC/protein Example 18 | 3.89 | 780 |
| Carrageenan/protein Example 20 | 6.32 | 500 |
| Gellan/protein Example 21 | 10.9 | 380 |
| Chitosan/protein Example 19 | 8.03 | 320 |

EXAMPLE 22

In order to prepare a polysaccharide/protein complex by emulsification in a hydrophobic working liquid, a water-in-oil emulsion was prepared from the following components:

| | |
|---|---|
| Soybean Oil | 1382 g. |
| Emulsifier component | 118 g. |
| Aqueous Phase component | 1140 g. |
| 0.1 M HCl | 360 g. |
| | 3000 g. |

| Emulsifier Component | | Aqueous Phase (complex Forming) Component | |
|---|---|---|---|
| Soy Lecithin | 6 g. | Xanthan Gum | 6.25 g. |
| Myverol 1892 | 12 g. | Kraft dried egg white | 25 g. |
| Soybean Oil | 100 g. | WPC | 25 g. |
| | 118 g. | Water | 2150 g. |
| | | | 2206.25 g. |

The emulsifier component was prepared by heating and stirring the emulsifiers with the soybean oil. The aqueous phase complex forming component was prepared by mixing water in Hobart Mixer (med, 55 on Variac), adding first WPC, then dried egg white and finally xanthan gum followed by thorough mixing. The emulsifier component was added to the major portion of soybean oil while stirring at 200 rpm using 2-blade (A310 & R500) agitator with a Lightnin mixer. The speed was increased to 600 rpm before addition of the aqueous phase was begun, and this speed was further increased to 900 rpm to produce emulsification. The resulting water-in-oil emulsion was stirred for about 10 minutes. The 0.1M HCl was added to the emulsion to acidify the aqueous phase and stirring continued at 900 rpm (5 min). Stirring was reduced to 600 rpm, then increased to 1200 rpm before stopping.

The amount of hydrochloric acid was chosen to exceed the optimum amount by a factor of 2 (based on the aqueous phase) to ensure that a pH level of 3-4 is achieved in substantially all aqueous phase drops. There will actually be a distribution of pH at any finite time after addition of HCl and it is desired to lower the pH adequately in all droplets.

Diluted hydrochloric acid was used to increase the volume of the acid-containing phase added, so as to ensure a more even distribution. Lecithin was used as an emulsification agent to lower interfacial tension, and Myverol 1892 was used to stabilize the emulsion.

Fibers were observed to form rapidly upon addition of acid. The emulsion began to separate slowly after agitation was stopped. This instability after complex precipitation is an advantage in product separation.

About 1100 g. of the mix was centrifuged at 10,000 rpm for 30 min at 10° C. Oil, water and pellets are obtained. Oil and water are poured off and the solid fibers isolated. The fibers were very creamy and without grittiness. The remainder of the mix was observed to separate over time to a water layer and a layer of oil plus fibers. Instead of hydrochloric acid, gluconodelta lactone may also be used as a slow acidulant. Similarly, an oil soluble edible acid, such as malic or acetic acid, or mixtures thereof may be used in the organic phase.

The size of the fibers is constrained by the size of the emulsion droplets in the method described in this Example. By controlling the size of the emulsion droplets, the size of the fiber particles may be readily controlled. The energy requirement for forming an emulsion is much lower than for microfragmentation of preformed fibers, and accordingly, less work is necessary to produce particles of a preselected volume through emulsification of the aqueous fiber forming solution utilized in high shear microfragmentation of the preformed fibers.

EXAMPLE 23

A xanthan gum/protein complex was prepared by emmulsification in oil using monoglyerides and solid lecithin as the emulsifer component, to provide a small droplet size in the emulsion. To reduce off-flavors associated with commercial grade lecithin, a purified solid lecithin (Centrolex F) was used with monoglyceride in the production of the emulsion. The resulting product had lower astringency, lower acid/sour flavor, and lower mouth drying than a control sample.

To prepare the complex, subcomponents A and B were utilized in the preparation procedure as follows:

Sub A - To 103g of soybean oil in a beaker were added 12g Myverol 1892 monoglyceride and 3g of solid lecithin (Centrolex F), which were heated gently to dissolve the components.

Sub B - To 2150 g of water in a blender container were added 20 g of diafiltered whey protein, 50 g Kraft dried egg white and 13 g xanthan gum while blending briefly after the addition of each component. The mixture was blended well after all the components were added.

In a three-neck flask were combined 1382 g soybean oil with 118 g of the emulsifier mix (Sub A). The mixture was stirred using a Tekmar homogenizer. The protein-gum mix (Sub B) was slowly added while continuing to homogenize the sample. The homogenizer was able to break the protein-gum mix into small droplets. When the emulsion looked quite milky, the acid component (Sub C) was added. As fibers were formed heating the sample with a heat mantle was begun. Heat to about 98° C. to denature the fibers. Stop heating and remove the mentle and immerse the flask in a bucket of ice to cool to room temperature. The xanthan gum/protein complex can be obtained by centrifugation to separate the oil and concentrate the solids as in the previous example.

The sample was analyzed as follows:

| | |
|---|---|
| Sample pH | 3.21 |
| Protein/Gum Ratio | 3.14 |
| % Solids | 22.84 |
| Dry Basis Comp. (%) | |
| Fat | 56.70 |
| Protein | 34.75 |
| Gum | 10.84 |
| Total Basis Comp. (%) | |
| Fat | 12.95 |
| Ash | 0.00 |
| Moisture | 77.16 |
| Nitrogen | 1.27 |
| Carbohydrate | 3.30 |
| Protein Comp. (%) | |
| cross-linked beta-lactoglobulin (% of total beta-lactoglobulin) | 10 |
| crosslined ovalbumin (% of total ovalbumin) | 50 |
| Ovalbumin | 53 |
| beta-lactoglobulin | 16 |
| alpha-lactalbumin | 8 |
| ovalbumin/beta-lactoglobulin ratio | 3.61 |

Analysis of this sample showed a moderate concentration of retained soybean oil in the product, which may be reduced by improving the efficiency of the centrifugation process.

The generation of complex fibers in this manner in situ in an oil phase may be used in the preparation of oil based products such as margarines and analog cheeses in which the complex-containing emulsion is used in product preparation to provide a product with reduced calorie content.

EXAMPLE 24

Xanthan gum/protein fibers were made from several proteins lacking sulfhydryl groups to provide low astringency fibrous complexes. The proteins used to prepare the complexes were lysozyme, polylysine and gelatin.

As indicated, lysozyme (a protein containing no sulfhydryl groups, but 4 disulfide bonds was used to prepare xanthan protein complexes as follows:
Formula
 450 ml distilled water
 1.0 g xanthan gum
 5.0 g lysozyme (from chicken egg white)

The xanthan gum was dissolved in the water in a blender. Fibers formed in the blender upon the addition of lysozyme (added slowly with blending) because of the high isoelectric point of lysozyme. The mixture was then placed in a beaker (the fibers floated to the top), and 5.5 ml of 1N HCl was added without stirring. The mixture was then stirred and poured onto cheesecloth in a collander. The fibers were collected and boiled 15 minutes in 150 ml distilled water. The fibers were placed on cheesecloth and rinsed extensively with distilled water. Excess water was squeezed out by hand.

The sample was tasted by an informal panel of persons having varying degrees of sensitivity to astringency. The panel detected very little astringency.

A second complex was prepared using polylysine (a protein containing only lysine residues and accordingly no sulfhydryl groups or disulfide bonds), according to the following procedure:

Formula
  90 ml. distilled water
  0.2 g xanthan gum
  1.0 g poly-DL-lysine hydrobromide The xanthan gum was dissolved in the water using a small blender. The polylysine was blended in for 4 minutes. Fibers formed without adding acid to lower the pH because of the high isoelectric point of the polylysine. The mixture was poured onto cheesecloth and the fibers were collected and boiled in 30 ml distilled water for 5 minutes. The fibers were placed on cheesecloth and rinsed extensively with distilled water. Excess water was squeezed out by hand. Informal taste panel testing detected little or no astringency.

A third complex was prepared using gelatin (a protein containing substantially no sulfhydryl groups or disulfide bonds) according to the following procedure:

Formula
  2800 ml. distilled water
  6.25 g xanthan gum
  31.9 g gelatin (Type B, 225 bloom)

The xanthan gum was dissolved in the water in a large blender. The gelatin was added and blended for 5 minutes. The mixture was poured into a beaker and 100 ml of 1N HCl was added. The mixture was stirred and allowed to sit one hour. Fibers were not boiled and were placed in the cold overnight, resulting in gelling. The gel-like material was washed on cheesecloth with deionized water, resulting in dissolution of most of the gelatinous material, and leaving material having more of a fibrous nature (but not as fibrous as xanthan/protein complexes as described herein). Excess water was squeezed out by hand. The sample was tasted by an informal taste panel. Most of the panel detected little or no astringency in the sample.

EXAMPLE 25

Proteolysis may also be utilized to provide polysaccharide/protein complexes possessing reduced astringency. In this regard, treatment of an egg-white/whey protein concentrate protein blend with the proteolytic enzyme Pronase brought about changes in the material which allowed fibers to be made with xanthan gum which had reduced astringency, in accordance with the following procedure:

Proteolysis Formula
  2000 ml tap water, 35° C.
  50 g dried egg white (Kraft)
  50 g whey protein concentrate
  0.2 g Type XXV Pronase E (Streptomyces Griseus proteolytic enzyme from Sigma Chemical Company.)

The dried egg white, whey protein concentrate and Pronase proteolytic enzyme were dissolved in the water and incubated at 35° C. for 5 hours to provide a proteolyzed egg white/whey protein solution. The proteolyzed protein solution was used to prepare fibers with xanthan gum, in accordance with the following formula and procedure:

Fiber Formula
  1800 ml distilled water
  6.25 g xanthan gum
  1000 ml of the proteolyzed egg white-whey protein concentrate solution Two batches of xanthan/protein fibers were made from each proteolysis batch according to the following procedure. Xanthan gum was dissolved in the water in a blender and 1000 ml of the proteolyzed solution was added and mixed for 5 minutes. The mixture was placed in a beaker and 35 ml of 1N HCl was added and the mixture stirred gently while fibers were forming. After several minutes, the fibers were drained on cheesecloth, then boiled in distilled water. The fibers were placed on cheesecloth and rinsed with distilled water, squeezing out the excess water by hand.

Two batches of fibers were pooled and homogenized with a Tekmar homogenizer for 45 minutes, then microfluidized in the M110 microfragmentation homogenizer at high pressure, generally as described in Example 1 for 70 minutes. The pH of the microfluidized material was adjusted to 3.5 with 1N HCl before centrifuging and collectinq the pelleted material.

Both the fibers and the microfluidized fibers (the latter evaluated at 10% solids) were evaluated to be considerably less astringent than control xanthan/protein complex products prepared without proteolysis treatment.

EXAMPLE 26

Three batches of coated xanthan/protein microfragmented emulsion coated fibers were prepared in accordance with a method similar to that illustrated in FIG. 1, but including various coating components. The respective batches had soybean oil (5 weight percent dry basis), sodium stearoyl lactylate (SSL, 5 weight percent dry basis), and soybean oil (2.5 weight percent dry basis) in combination with SSL (2.5 weight percent dry basis) added in the last chamber of the (Pentax) mixer prior to microfragmentation with a high shear homogenizer (CD 150 cell disruptor). A substantial improvement in drying in the mouth was found for the SSL coated sample. Acid/sour flavor and acid aftertaste was most improved in the combination coating.

Model emulsions of viscous products were prepared and tasted informally. Some tasters thought that astringency was reduced in the coated materials while others noted no improvement.

Other food grade surfactants may be utilized to provide a surface coating, such as monoglycerides, ethoxylated monoglycerides and polyglycerol esters. Higher melting and oxidatively stable fats.

EXAMPLE 27

Xanthan/protein fibers prepared generally in accordance with the method of FIG. 1 were boiled for 5 minutes in sodium phosphate buffer (50 mM, pH 8.0) or in buffer containing 100 micro moles L-cystine per gram of fibers (dry basis), approximately a five-fold excess over the theoretical level of sulfhydryl groups in the protein. After cooling, the fibers were reacidified to about pH 3, washed and subjected to partial homogenization but not full microfluidization. Only 5% of the sulfhydryl groups remained in the cystine treated samples whereas 35% remained when boiled alone. An informal taste panel scored the cystine treated samples as less astringent than boiled without cystine. Boiling alone caused a slight reduction in astringency.

EXAMPLE 28

A microfluidized aqueous dispersion of xanthan/whey protein+egg white complex as prepared in accordance with Example 1 (without thin film concentration) having a total solids content of about 5 weight percent was well mixed with a 2 weight percent sodium alginate solution in a 2:1 weight:weight ratio of the complex dispersion to the alginate solution, to provide 15 kg of blended mixture. A 20 weight percent calcium acetate solution (250 grams) was added slowly to the 15 kg of the blended mixture. The mixture formed a gel, which was reduced to small particle size by a Tekmar high speed rotary homogenizer. The broken gel was passed twice through a CD 30 Cell Disruptor at about 12,000 PSI to yield a calcium alginate coated, microfragmented xanthan/protein complex dispersion.

The coated dispersion was treated with a protease (P-7026 protease from Aspergillus Sojoe, purchased from Sigma) to determine the accessibility of the protein component of the coated microfragments of the dispersion. The water soluble peptides and amino acids released by protease hydrolysis were determined by absorption measurement at 280 nanometers wavelength. An untreated control sample of the xanthan/whey protein+egg white protein complex was also treated with the protease and subjected to absorption measurement at 280 nanometers to measure peptide and amino acid concentration in solutions following proteolysis.

The calcium alginate coated microfragments produced significantly less peptides and amino acids than the control. The absorption at 280 nanometers with the control sample was more than 10 times greater than the absorption of the calcium alginate coated sample at 280 nanometers. Calcium pectinate-coated dispersions may similarly be prepared, using pectin, instead of alginate.

It is noted that mild proteolytic treatment of both the coated and the uncoated microfragmented aqueous dispersions may produce microfragments having fragment surfaces which have a reduced concentration of protein sulfhydryl groups at the surface of the fragments. Direct proteolytic treatment of aqueous dispersions of ionic polysaccharide/protein complexes containing a nonionic polysaccharide component such as cornstarch, which is not affected by the enzyme, may particularly benefit from such treatment.

EXAMPLE 29

A reduced calorie, substantially fat-free frozen dessert product was prepared utilizing a microfragmented xanthan/protein complex prepared in a manner similar to that of Example 3, except that the complex is prepared from xanthan gum, egg white and skim milk. Xanthan gum, skim milk or ultrafiltered skim milk and dried egg white or frozen egg whites are suspended in water at a temperature in the range of 70°-80° F. to provide a solution solids content of 2.7 percent in the fiber forming solution. The formulation of the starting material is calculated to obtain a xanthan to egg protein to milk protein ratio of 1:1.55:2.3 or 1:1.5:3.0. Two typical formulations follows: (a) xanthan gum, 1.35 lbs; frozen egg whites, 19 lbs; skim milk, 78 lbs; and water, 237 lbs or (b) xanthan gum 1.35 lbs, dried egg whites, 2.69 lbs, ultrafiltered skim milk 26 lbs, and water 289 lbs.

Processing

The processing procedures for preparing such bland dispersions are substantially the same as Example 3 with the following exceptions: The pH of fiber formation is targeted at pH 3.7; and the total solids in the starting mix is about 2.7 percent. The concentration of solids after stabilization and draining is typically between 7.5 percent and 11.5 percent. The fibers are microfragmented at this concentration using a Gaulin cell disruptor at high pressure. The resulting material is either used at the above solids content or is concentrated by centrifugation.

The complex has a protein to gum ratio of 2.5 to 3.5. The proteins as determined from gel electrophoresis include caseins (@67 percent), whey proteins (@10 percent) and ovalbumin (@7 percent). The crosslinked ovalbumin was greater than 80 percent. The aqueous microfragmented dispersion is quite bland. The frozen dessert product had the following composition:

| Ingredients | Wt. % |
| --- | --- |
| Water | 65.3 |
| Milk Solids not Fat | 12.5 |
| Sucrose Solids | 12.0 |
| Corn Syrup Solids | 8.1 |
| Microfragmented xanthan/protein complex | 2.0 |
| Butter Flavor | 0.1 |
| | 100.0 |

In preparing the frozen dessert mix, the water, milk solids not fat (in the form of condensed skim milk having 35% by weight total solids), sucrose, corn syrup and flavorings were blended in a Lanco high shear mixer. After mixing, the blended ingredients were preheated to 150° F. and homogenized by passing the mixture under pressure through a two-stage homogenizer at a pressure drop of 2000 psi in the first stage and 500 psi in the second stage of the homogenizer. The homogenized mix was then pasteurized at 185° F. for 30 seconds in a high temperature short time (HTST) processing unit of Crepaco, Cedar Rapids, Iowa. The homogenized, pasteurized mix was next cooled to 40° F. and discharged into a storage container. The mix was aged for four hours at 40° F. before freezing.

The unflavored white mix was frozen in an Emery Thompson (Bronx, N.Y.) batch freezer. The unflavored frozen mix (100% overrun - 50% air) was discharged into packaging containers at 19°-23° F. and hardened at −20° F. It had desirable, creamy characteristics provided by the xanthan/protein microfragmented complex dispersion component.

EXAMPLE 30

A reduced fat buttermilk-type dressing was prepared using a microfragmented xanthan/egg white-skim milk complex dispersion like that used in Example 29. The buttermilk dressing was made using the following ingredients:

| Ingredients | Wt. % |
| --- | --- |
| Water | 44.863 |
| Sugar | 2.000 |
| Fluid Buttermilk | 20.000 |

| Ingredients | Wt. % |
|---|---|
| 25 DE Corn Syrup | 15.000 |
| Salt | 1.800 |
| Gums | 0.900 |
| Sorbic Acid | 0.200 |
| Lactic Acid/Vinegar | 3.250 |
| Food Grade Coloring Agent | 0.200 |
| Flavorings | 4.700 |
| Xanthan/egg white-skim milk complex | 4.000 |
| EDTA | 0.007 |
| Spices | 0.080 |
| Hydrogenated Soybean Oil | 3.000 |

The dressing was prepared by first dry blending the gums, coloring agent and sugar. The dry blended gum/coloring agent/sugar mixture was then slowly added to the xanthan/skim milk protein complex dispersion in a Hobart mixer. The buttermilk, flavorings, salt, EDTA, sorbic acid, water and corn syrup were then added to the xanthan/protein complex blend, followed by mixing for two minutes. The lactic acid and vinegar were next added to the blend, followed by mixing for one minute. The hydrogenated soybean oil was added, followed by homogenization or mixing using a high shear mixing device. The spices were blended in after emulsification to produce a buttermilk-type dressing product having only about 3 weight percent fat, but having the rich, fat-like mouthfeel and texture of a product substantially higher in fat content.

EXAMPLE 31

A reduced calorie, substantially fat-free French dressing was prepared using a microfragmented xanthan/egg white-skim milk complex dispersion like that used in Example 29. The French dressing was made using the following ingredients:

| Ingredients | Wt. % |
|---|---|
| Water | 53.689 |
| Sugar | 10.500 |
| 25 DE Corn Syrup | 20.000 |
| Salt | 1.850 |
| Tomato Paste | 1.500 |
| Garlic Juice | 1.000 |
| Gums | 0.550 |
| Sorbic Acid | 0.200 |
| Vinegar | 6.000 |
| Food Grade Coloring Agent | 0.020 |
| Spices/Flavorings | 0.685 |
| Xanthan/egg white-skim milk complex | 4.000 |
| EDTA | 0.006 |

The reduced calorie French dressing was prepared by dry blending the gums, coloring agent and sugar. The dry blended mixture was slowly added to the aqueous xanthan/egg white-skim milk microfragmented dispersion in a Hobart mixer. The spices/flavorings, salt, EDTA, sorbic acid, water and corn syrup were then added to the resulting blend, followed by mixing for two minutes. The tomato paste, garlic juice and vinegar were then added to the blend and mixed for one minute. The finished blend was homogenized or mixed using a high shear mixing device, to provide a reduced calorie fat-free French dressing having a rich texture and mouthfeel similar to that conventionally provided by a substantial vegetable oil component.

EXAMPLE 32

A number of Complexes of xanthan with egg white and whey protein were prepared with equal proportions of xanthan gum, dried egg whites (KDEW, Blue Label), and whey protein concentrate (containing 35% by weight protein). To prepare the complexes, 18.75 grams of whey protein concentrate were dispersed in 2,800 ml of deionized water in a Waring blender (while blending at 1200 rpm and 22° C.), followed by adding 18.75 g dried egg white in the whey protein concentrate dispersion while blending in the Waring blender under the same conditions. Subsequently, 18.75 g xanthan gum was added to the mixture while blending, followed by blending the gum/protein mixture for 5 minutes. Thirty-five milliliters of 1 molar hydrochloric acid was added to the mixture while blending under the same conditions to obtain gel-like complex. The xanthan/protein complex to was allowed to synerese. The gel-like complex was separated from the supernatant and boiled for 5 minutes. The gel-like xanthan/protein complex was smooth, creamy, had a fat-like mouthfeel and was less astringent than the xanthan/protein complex of the type generally described in Example 3. This boiled and drained gel-like xanthan/protein complex was centrifuged at 10,000×g and 5° C. for 20 minutes. This centrifuged pellet of the complex was even creamier than the microfragmented complex and had little astringency.

The microfluidized xanthan/egg white gel was found to be blander than the microfluidized xanthan/egg white/whey protein concentrate gel. Both microfluidized gel-like complexes were smoother and blander than a product like that of Example 3. The electrophoretic mobility of the xanthan/egg white gel as a function of pH is shown in FIG. 16, as compared to a product like that of Example 3.

Both gel-like xanthan/dried egg white-whey protein concentrate and xanthan/KDEW/WPC complexes were microfluidized using a microfluidizer Model 110Y of Biotechnology Development Corporation, at an input pressure of about 15–18,000 psi as described in Example 3. The microfragments of these two complexes were micro rod-like, and very negatively charged (i.e., pI<2.0). They dispersed readily in water. The high negativity of these microfragments may account for their high dispersability and smoothness.

EXAMPLE 33

A xanthan/egg white-caseinate gel complex is made in the same manner as described in Example 32 from xanthan gum, egg white and skim milk at a 1:1:1 weight ratio of xanthan gum, egg white and skim milk protein. The undenatured microfragmented xanthan/egg white-skim milk gel was formed into a model mayonnaise emulsion like that of Example 18 at a 50 weight percent oil replacement level, and compared to a control model mayonnaise emulsion using a heat stabilized microfragmented xanthan/egg white-whey protein concentrate (1:4:4) like that of Example 3.

Figure 40:
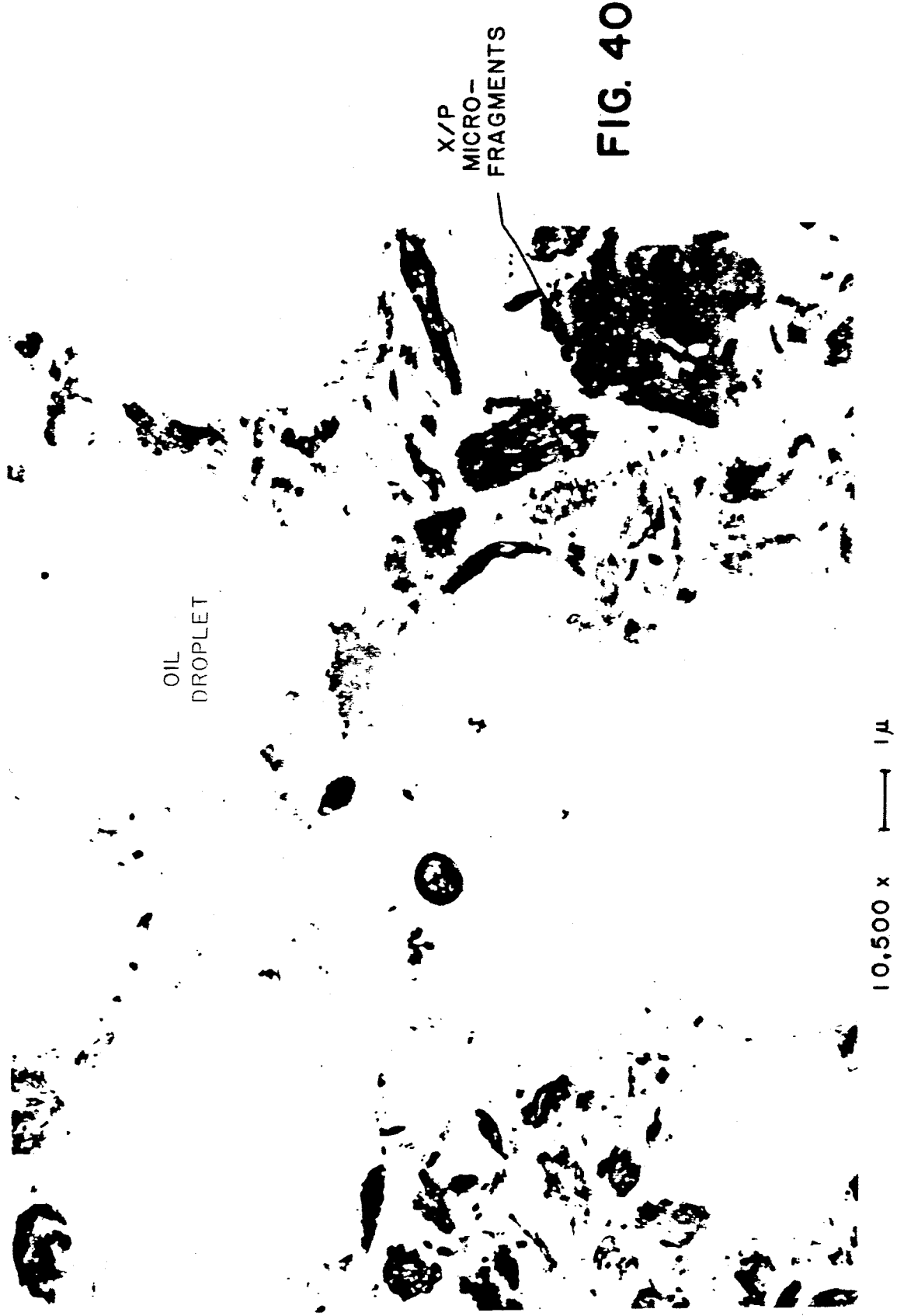
FIG. 40 is a photomicrograph of a reduced fat (50%) model mayonnaise emulsion containing a microfragmented xanthan/protein fiber complex dispersion at a magnification of 10,500×.

Photomicrographs of the heat stabilized fibrous xanthan/protein complex control (FIG. 40) with the non-heat stabilized xanthan/egg white-whey protein concentrate (1:1:1) microfragmented gel (FIG. 41) show the gel product has a smooth, relatively uniform dispesion of the xanthan/protein complex between the oil droplets of the mayonnaise emulsion.

EXAMPLE 34

A low fat comminuted meat hot dog product was prepared utilizing a microfragmented xanthan/egg white-whey protein complex dispersion like that of Example 3, from the following ingredients:

| Ingredient | Grams |
|---|---|
| Pork | 57.0 |
| Beef chuck | 106.0 |
| Pork fat | 17.0 |
| Salt | 9.0 |
| White pepper | .4 |
| Ginger | .3 |
| Onion powder | .2 |
| Nonfat dairy milk solids | 8.0 |
| Dry mustard | .5 |
| Ground coriander seed | .6 |
| Nitrite | .7 |
| Hickory smoke | 2.0 |
| Xanthan gum | 3.0 |
| xanthan/egg white-whey protein complex | 30.0 |
| Ice | 20.0 |

The hot dogs were prepared by blending the pork, beef and fat in a food processor about 40 seconds (until it formed a cohesive mass) followed by the ice and blending for another 30 seconds. The xanthan/protein complex microfragment dispersion was then blended in for another 30 seconds, followed by the spices, nonfat dairy milk solids and gum with blending about 30 seconds. The nitrite was then blended well for 20 seconds. The meat emulsion was then put in a pastry bag and squeezed into hog casing in the form of hot dogs, removing all air bubbles. The resulting hot dogs were then boiled 10 minutes in 190° F. water.

| Analytical Information | | | |
|---|---|---|---|
| Low Fat Hot Dogs | | Control Hot Dogs | |
| 69.20% | Moisture | 55.50% | Moisture |
| 2.53% | Nitrogen | 1.94% | Nitrogen |
| 11.00% | Fat | 28.00% | Fat |
| 15.80% | Protein | 12.00% | Protein |

EXAMPLE 35

A reduced fat peanut butter having a triglyceride content of only 35 weight percent was prepared using a microfragmented xanthan/egg white-whey protein complex dispersions like that of Example 3. The ingredients used were as follows:

| 80.0 g | Peanut Flour #174 (Seabrooks) |
|---|---|
| 100.0 g | Peanut Flour #160 (Seabrooks) |
| 12.0 g | Peanut Flour #251 (Seabrooks) |
| 140.0 g | Water |

These components were blended in a food processor and let standing 10 minutes to soften the flour. The following ingredients were then blended in the food processor with the flour/water mixture until smooth (approximately 45 seconds).

| 89.5 g | Xanthan/egg white-whey protein concentrate (15% solids) |
|---|---|
| 60.0 g | Glucose (bakery) |
| 12.0 g | Sucrose (white sugar) |
| 6.5 g | salt |
| 3.8 g | baking soda |
| 2.5 g | peanut butter flavor |
| 100.0 g | unstabilized peanut butter |

An 80% fat reduced peanut butter was similarly maade from the following ingredients:

| 80.0 g | Peanut Flour #174 (Seabrooks) |
|---|---|
| 112.0 g | Peanut Flour #160 (Seabrooks) |
| 144.5 g | Water |
| 89.5 g | xanthan/egg white-whey protein concentrate (21% solids) |
| 37.0 g | Dextrose |
| 15.0 g | White granulated sugar |
| 7.5 g | Salt |
| 3.8 g | Baking soda |
| 2.5 g | Peanut butter flavor |

In preparing the 80% fat reduced peanut butter, the peanut butter flour is blended with water in a food processor and permitted to stand for 10 minutes to soften the flour. The microfragmented xanthan/protein complex and flavorings are then well blended into the mixture, to provide a blend having the following composition:
20.0% Protein
13.3% Fat
22.4% Carbohydrate
44.3% Water
778 calories/490.8 g

EXAMPLE 36

A cream of mushroom soup was prepared using a microfragmented xanthan/egg white-whey protein complex dispersion like that of Example 3, from the following ingredients:

| 2.00 g | Olive Oil (6% Fat) |
|---|---|
| 60.00 g | Onion |
| 30.00 g | Celery |
| 4.00 g | Minced garlic |
| 200.00 g | Sliced mushrooms |
| 3.00 g | Dried Porcini mushrooms |
| 30.00 g | White Wine |
| .15 g | Black pepper |
| 3.00 g | Salt |
| 4.00 g | Sugar |
| .40 g | Thyme |
| 450.00 g | Chicken stock |
| 46.30 g | Xanthan/egg white-whey protein complex (16.6% solids) |
| 245.00 g | Skim milk |
| 18.00 g | All purpose flour |
| 1.20 g | Butter buds |
| 6.00 g | Nonfat dairy milk solids (low heat) |
| 1.50 g | Chopped Parsley |

The onion, garlic and celery are sauteed in oil over medium heat for 3 minutes The mushrooms and Porcini are added and are sauteed 5 minutes or until mushrooms release all moisture and begin to brown, and the mixture is deglazed with white wine. The pepper, salt, sugar, thyme and stock are added and simmered for 15 minutes Separately, milk and the xanthan complex are mixed in a blender until smooth, and the nonfat milk solids, flour and butter buds are combined with mixing in the xanthan complex mixture. The sauteed components and the xanthan complex blend are combined and boiled for 3 minutes. Parsley is added.

EXAMPLE 37

Less leavened baked goods such as baked brownies having reduced fat may be made using microfragmented ionic polysaccharide/protein complexes as described herein. In this regard, brownies having 0.4 weight percent fat were prepared from microfragmented xanthan/egg white-egg protein concentrates of the type described in Example 3, using the following ingredients:

| Amount | Ingredient |
|---|---|
| 70.0 g | Condensed skim milk |
| 1.0 g | GP 911 FMC gum |
| 26.0 g | Cocoa powder (Gerkins 10–12%) |
| 187.0 g | Glucose |
| 20.0 g | Granulated sugar (sucrose) |
| 2.7 g | Water |
| 55.3 g | Xanthan/protein complex dispersion (20% solids) |
| 3.7 g | Vanilla |
| 10.0 g | Creme de cocoa |
| 1.0 g | Carmi chocolate flavor |
| 40.0 g | Granulated sugar |
| 36.0 g | Egg white |
| 40.0 g | Cake flour |
| 11.0 g | All purpose flour |
| 25.0 g | Chopped walnuts |
| 20.0 g | Granulated sugar |

To prepare the brownies, the gum was thoroughly dissolved in the milk, and the cocoa powder, glucose and 20 g sugar were added, followed by water and the xanthan/protein complex. The ingredients were whisked thoroughly. The vanilla, creme de cocoa and chocolate flavor were then added. Egg whites were beaten 20 seconds, and 40 g sugar were added until soft peaks formed. Flour was sifted into the chocolate mix, and folded in until not completely incorporated. Egg whites were folded in until still slightly ribbony. The mix was baked at 350° F. in an oven for 24 minutes.

EXAMPLE 38

A reduced fat chocolate cake (1.0% fat) was similarly prepared using a microfragmented xanthan/egg white-whey protein complex like that of Example 3, using the following ingredients:

| Amount | Ingredient |
|---|---|
| 28.0 g | Gerkins cocoa |
| 65.0 g | Concentrated skim milk |
| 75.0 g | Sucrose |
| 50.0 g | Glucose syrup |
| 40.0 g | Dextrose (Staley 300) |
| 58.0 g | Xanthan/egg white-whey protein concentrate complex (15% Solids) |
| 62.0 g | Cake flour |
| 2.0 g | Instant starch |
| 4.0 g | Vanilla |
| 10.0 g | Creme de cocoa |
| 5.5 g | Baking powder |
| 48.0 g | Egg whites |
| 40.0 g | Sugar |

To prepare the leavened cake, the xanthan/protein complex was blended with the milk, in which was also blended the cocoa, sugars, glucose syrup, vanilla and creme de cocoa. The dry ingredients (baking powder, starch, flour) were sifted into the cocoa mixture and very gently stirred into the bowl. The egg whites were then folded in with care not to overwhip. The mix was placed in 9" round cake pan sprayed with a pan release agent baked and at 360° F. for 23 minutes.

EXAMPLE 39

Sweet Dough Product

A sweet dough product was prepared utilizing a microfragmented anisotropic xanthan/protein complex dispersion containing hydrated xanthan/whey protein concentrate-egg protein complex microfragments of the type described in Example 1 in aqueous dispersion and having a solids content of 20.0 weight percent, based on the total weight of the dispersion. In preparing the sweet dough product, the following ingredients were utilized:

| Ingredients | Weight % |
|---|---|
| Sponge | |
| Flour, bread | 30.00 |
| Yeast, compressed | 2.00 |
| Yeast food | 0.25 |
| Water (75° F.) | 16.00 |
| Dough | |
| Flour, bread | 17.00 |
| Water (45° F.) | 10.00 |
| Yeast, compressed | 1.00 |
| Salt | 1.00 |
| Sugar | 7.00 |
| Dextrose | 3.00 |
| Nonfat dry milk | 2.00 |
| Xanthan/protein Dispersion | 7.00 |
| Emulsifier (Mono-Diglycerides) | .25 |
| Egg Yolk Solids | 3.25 |
| Flavor | .25 |
| Total | 100.00 |

To produce the sweet dough product, the sponge ingredients were mixed together for 3 minutes on low speed in a N-50 Hobart mixer using a dough hook. The sponge (78° F.) was set for one hour. To mix the dough, an A-200 Hobart mixer was used with a 12 quart bowl and dough hook. The dough flour, water, yeast, sugar, dextrose, milk, emulsifier, egg yolk solids and flavor and sponge were placed in the bowl and mixed for 30 seconds on low, then 7 minutes on 2nd speed. The salt and microfragmented anisotropic xanthan/protein dispersion was then added to the bowl, and mixed for 30 seconds on low, then 2 minutes on 2nd speed to full development. Dough temperature—80° F.

The dough was divided into 284 gram pieces which were given a 10 minute rest period after rounding. The dough pieces were then made up into typical bread-type loaves and placed in a lightly greased loaf pan of appropriate size. The molded dough pieces were then placed in a proof box at 95° F. temperature and 80% relative humidity for 60 minutes till top of dough was ¾" above pan. The proofed dough pieces were then baked in a reel oven at 400° F. for 21 minutes. The loaves were depanned immediately and cooled for 1 hour.

The sweet dough product was analyzed to have the following composition:

| | |
|---|---|
| Moisture | 39.35% |
| Fat | 4.62 |
| Aw (water activity) | .94 |
| pH | 5.54 |

The sweet dough product had a finer grain, darker crust color, increased volume and somewhat softer texture than a typical control product utilizing shortening (fat) in place of the microfragmented anisotropic xanthan/protein dispersion. The sweet dough product also has a reduction in calories and fat content compared to the typical control product.

EXAMPLE 40

Improved Sweet Dough Product

An improved sweet dough product was prepared utilizing a microfragmented anisotropic xanthan/protein complex dispersion containing hydrated xanthan/whey protein-egg white protein complex microfragments in aqueous dispersion and having a solids content of 20.0 weight percent, based on the total weight of the dispersion. This dispersion is added to a typical, fat containing control formulation as a dough product improver, which includes, but not limited to, the attributes of dough strengthening, volume enhancing, crumb softening, moisture retention and shelf life extending. In preparing the new improved sweet dough product, the following ingredients were utilized:

| Ingredients | Weight % |
|---|---|
| Sponge | |
| Flour, bread | 30.00 |
| Yeast, compressed | 2.00 |
| Yeast food | 0.25 |
| Water (75° F.) | 16.00 |
| Dough | |
| Flour, bread | 17.00 |
| Water (45° F.) | 10.00 |
| Yeast, compressed | 1.00 |
| Salt | 1.00 |
| Sugar | 7.00 |
| Dextrose | 3.00 |
| Nonfat dry milk | 2.00 |
| Shortening | 7.00 |
| Emulsifier (Mono-Diglycerides) | .25 |
| Egg Yolk Solids | 3.25 |
| Flavor | .25 |
| | 100.00 |
| Microfragmented Anisotropic Xanthan/Protein Dispersion | 3.00 |
| Total | 103.00 |

To produce the improved sweet dough product, the sponge ingredients were mixed together for 3 minutes on low speed in a N-50 Hobart mixer using a dough hook. The sponge (78° F.) was set for one hour. To mix the dough, an A-200 Hobart mixer was used with a 12 quart bowl and dough hook. The dough flour, water, yeast, sugar, dextrose, milk, emulsifier, egg yolk solids, flavor and sponge were placed in the bowl and mixed for 30 seconds on low, then 7 minutes on 2nd speed. The salt and shortening and microfragmented anisotropic xanthan/protein dispersion were then added to the bowl, and mixed for 30 seconds on low, then 2 minutes on 2nd speed to full development. Dough temperature—80° F.

The dough was divided into 284 gram pieces which were given a 10 minute rest period after rounding. The dough pieces were then made up into typical bread-type loaves and placed in a lightly greased loaf pan of appropriate size. The molded dough pieces were then placed in a proof box at 95° F. and 80% relative humidity for 70 minutes until the top of dough was ¾" above the pan. The proofed dough pieces were then baked in a reel oven at 400° F. for 21 minutes. The loaves were depanned immediately and cooled for one hour.

The improved sweet dough product was analyzed to have the following composition:

| Moisture | 35.06% |
|---|---|
| Fat | 10.79% |
| Aw (water activity) | .93 |
| pH | 5.56 |

The improved sweet dough product had a somewhat finer grain, darker crust color, increased volume and softer texture than a typical control product not utilizing the beneficial attributes of the microfragmented anisotropic xanthan/protein dispersion added as a dough/product improver.

An improved baked goods product was prepared utilizing a microfragmented anisotropic xanthan/protein complex dispersion of the type described in Example 1 containing the hydrated xanthan/whey protein-egg white protein complex microfragments in aqueous dispersion and having a solids content of 20.0 weight percent, based on the total weight of the dispersion. This dispersion is added to a typical, fat containing control formulation as a dough product improver, which includes, but not limited to, the attributes of dough strengthening, volume enhancing, crumb softening, moisture retention and shelf life extending. In preparing the new improved sweet dough product, the following ingredients were utilized:

| Ingredients | Weight % |
|---|---|
| Sponge | |
| Flour, bread | 30.00 |
| Yeast, compressed | 2.00 |
| Yeast food | 0.25 |
| Water (75° F.) | 16.00 |
| Dough | |
| Flour, bread | 17.00 |
| Water (45° F.) | 10.00 |
| Yeast, compressed | 1.00 |
| Salt | 1.00 |
| Sugar | 7.00 |
| Dextrose | 3.00 |
| Nonfat dry milk | 2.00 |
| Shortening | 7.00 |
| Emulsifier (Mono-Diglycerides) | .25 |
| Egg Yolk Solids | 3.25 |
| Flavor | .25 |
| | 100.00 |
| Microfragmented Anisotropic Xanthan/Protein Dispersion | 3.00 |
| Total | 103.00 |

To produce the improved baked goods product, the sponge ingredients were mixed together for 3 minutes on low speed in a N-50 Hobart mixer using a dough hook. The sponge (78° F.) was set for one hour. To mix the dough, an A-200 Hobart mixer was used with a 12 quart bowl and dough hook. The dough flour, water, yeast, sugar, dextrose, milk, emulsifier, egg yolk solids, flavor and sponge were placed in the bowl and mixed for 30 seconds on low, then 7 minutes on 2nd speed. The salt and shortening and microfragmented anisotropic xanthan/protein dispersion were then added to the bowl, and mixed for 30 seconds on low, then 2 minutes on 2nd speed to full development. Dough temperature—80° F.

The dough was divided into 284 gram pieces which were given a 10 minute rest period after rounding. The dough pieces were then made up into typical bread-type loaves and placed in a lightly greased loaf pan of appropriate size. The molded dough pieces were then placed in a proof box at 95° F. and 80% relative humidity for 70 minutes until the top of dough was ⅜" above the pan. The proofed dough pieces were then baked in a reel oven at 400° F. for 21 minutes. The loaves were depanned immediately and cooled for one hour.

The improved baked goods product was analyzed to have the following composition:

| | |
|---|---|
| Moisture | 35.06% |
| Fat | 10.79% |
| Aw (water activity) | .93 |
| pH | 5.56 |

The improved baked goods product had a somewhat finer grain, darker crust color, increased volume and softer texture than a typical control product not utilizing the beneficial attributes of the microfragmented anisotropic xanthan/protein dispersion added as a dough/product improver.

EXAMPLE 41

Danish Product/Danish Roll-In Product

Danish products are sweet dough products, but with a portion of their fat content rolled-in as layers (roll-in) between dough. This has a layering, leavening effect which produces a flaky product. The cell structure is oval and horizontal, as opposed to round as in the sweet dough product.

A danish roll-in product for danish product was prepared utilizing a microfragmented anisotropic xanthan/whey protein-egg protein complex dispersion of the type described in Example 1 containing the hydrated xanthan/protein complex microfragments in aqueous dispersion and having a solids content of 20.0 weight percent, based on the total weight of the dispersion. In preparing the new danish product/danish roll-in product, the following ingredients were utilized:

| | Weight % | |
|---|---|---|
| Danish Product | | |
| Dough | 85.00 | - 75.00 |
| Roll-In | 15.00 | - 25.00 |
| | 100.00 | - 100.00 |
| Dough | | |
| Flour, Patent | 47.00 | |
| Sugar | 8.00 | |
| Shortening, all purpose | 8.00 | |
| Egg yolk solids | 3.00 | |
| Yeast, compressed | 3.00 | |
| Nonfat dry milk | 2.00 | |
| Flavor | .50 | |
| Water (45° F.) | 26.75 | |
| Mono & Diglycerides | 1.00 | |
| | 100.00 | |
| Roll-In | | |
| Shortening, all purpose | 46.00 | |
| Microfragmented anisotropic xanthan/protein dispersion | 50.00 | |
| Polysaccharides | 4.00 | |
| | 100.00 | |

To produce the danish roll-in product, the polysaccharides were mixed into the shortening on a Hobart N-50 mixer with paddle. The microfragmented anisotropic xanthan/protein dispersion was then added and thoroughly blended in. This mixture will now be referred to as the "roll-in". It was then set aside to attain a temperature of 65° F. The dough ingredients were all added to a 12 quart bowl and mixed on low speed for 6 minutes on an A-200 Hobart mixer with dough hook. Dough temperature was about 65° F. The dough pieces was dropped out on a floured bench top and formed to a rectangular shape. The dough was rolled out by hand using a wooden rolling pin to a size of approximately 15" by 30". The "roll-in" was applied to the right ⅔'s of the dough in an even manner to form a continuous sheet of "roll-in". The left ⅓ of the plain dough was then folded over the center ⅓. The right ⅓ (with roll-in) was then folded over and on top of the already folded 1st and 2nd thirds. This 3-fold process was repeated 3 more times with a 20 minute rest period in a 38° F. retarded after the last 3 folds. This is a typical procedure for production of dough pieces for danish baked goods. The dough piece was then sheeted (rolled) out to approximately ¼" thick and cut into 3"×8" test strips and placed on sheet pans. The danish product was allowed to rise in a proof box at 95° F. temperature and 80% relative humidity for 60 minutes. They were then baked at 380° F. for 12 minutes and cooled.

The danish product (roll-in) was analyzed to have the following composition:

| | |
|---|---|
| Moisture | 26.15% |
| Fat | 20.65% |
| Aw (water activity) | .94 |
| pH | 5.28 |

The danish product/danish roll-in product exhibited a somewhat oval grain structure and layering effect similar to that of a typical danish control product using a full fat roll-in. The danish product/danish roll-in product, however, has a reduction in calories and fat content compared to the typical control product.

EXAMPLE 42

Bread-Type Product

Bread-type products are yeast and chemically leavened baked goods including, but not limited to, white bread, hearth breads, variety breads, ethnic breads, buns, rolls, english muffins, bagels and pizza-type products.

A bread-type product was prepared utilizing a microfragmented anisotropic xanthan/whey protein-egg white protein complex dispersion of the type described in Example 1 containing the hydrated xanthan/protein complex microfragments in aqueous dispersion and having a solids content of 20.0 weight percent, based on the total weight of the dispersion. In preparing the new bread-type product, the following ingredients were utilized:

| Ingredients | Weight % |
|---|---|
| Flour, patent | 54.57 |
| Water (65° F.) | 35.47 |
| Yeast, compressed | 1.64 |
| Yeast food | .13 |
| Salt | 1.09 |
| Sugar, granulated | 3.82 |

| Ingredients | Weight % |
|---|---|
| milk, non-fat, dry | 1.64 |
| microfragmented anisotropic xanthan/protein dispersion | 1.64 |
| | 100.00 |

To produce the bread type product, the straight dough method was used wherein all the ingredients were mixed together at one time using a 12 quart bowl with dough hook on an A-200 Hobart mixer. Mix times were: low for 1 minutes, then 2nd speed for 8 minutes to development. Dough temperature—81° F. The dough was allowed to ferment in a 90° F. fermentation box for 90 minutes. The dough was punched down and divided into 454 gram dough pieces and rounded. Following a 10 minute rest period, the dough pieces were made up into typical bread-type loaves and placed in a lightly greased loaf pan of appropriate size. The molded dough pieces were then placed in a proof box at 95° F. temperature and 80% relative humidity for 60 minutes until the top of the dough was 1" above pan. The proof dough pieces were then baked in a reel oven at 430° F. for 22 minutes. The loaves were depanned immediately and cooled for 1 hour.

The bread type product was analyzed to have the following composition:

| Moisture | 43.75% |
|---|---|
| Fat | 6.84% |
| Aw | .95 |
| pH | 5.32 |

The bread-type product had a coarser grain and reduced volume in comparison to a typical control product utilizing shortening (fat) in place of the microfragmented anisotropic xanthan/protein dispersion. The bread-type product would have a reduction in calories and fat content compared to the typical control product.

EXAMPLE 43—Cake Product

Cake products are chemically and mechanically leavened baked goods including, but not limited to sheet cakes, loaf cakes, pound cakes, sponge cakes, angel food cakes, muffins, snack cakes, doughnuts and eclairs.

A cake product was prepared utilizing a microfragmented anisotropic xanthan/whey protein-egg white protein complex dispersion containing the hydrated xanthan/protein complex microfragments in aqueous dispersion and having a solids content of 20.0 weight percent, based on the total weight of the dispersion. In preparing the new cake product, the following ingredients were utilized:

| Ingredients | Weight % |
|---|---|
| Sugar | 28.0 |
| Flour, cake | 24.0 |
| Microfragmented anisotropic xanthan/protein dispersion | 11.0 |
| emulsifier (mono & diglycerides) | 1.0 |
| Eggs, whole | 12.50 |
| Nonfat, dry milk | 2.00 |
| Water | 19.25 |
| Baking powder | 1.00 |
| Salt | .75 |
| Flavor, vanilla | .50 |
| | 100.00 |

To produce the cake product, a 12 quart bowl with paddle was used on a Hobart A-200 mixer. The flour, sugar, milk, baking powder and salt were placed in a bowl and dry blended. The microfragmented anisotropic xanthan/whey protein-egg white protein dispersion, emulsifier, flavors and ⅓rd of the water were added and the components were mixed to a paste in low. The eggs and remaining water were gradually mixed in at law and second blending speed, and batter was blended smooth. Deposit 454 grams of batter in lightly greased 8" cake pan, baked in reel oven at 350° F. for 35 minutes. Cool cake product in the pan for 1 hour.

The cake product was analyzed to have the following composition:

| Moisture | 36.12% |
|---|---|
| Fat | 4.29% |
| Aw (water activity) | .90 |
| pH | 6.83 |

The cake product had a finer, dense grain, lighter crust color, decreased volume and a very firm texture in comparison to a typical control product utilizing shortening (fat) in place of the microfragmented anisotropic xanthan/protein dispersion. The cake product would also have a reduction in calories and fat content compared to a typical control product.

EXAMPLE 44

Pie shell products are baked goods for, but not limited to, fruit pies, filled pies, tarts, pie shells, fried pies and meat pies.

A pie shell product was prepared utilizing a microfragmented anisotropic xanthan/protein complex dispersion containing the hydrated xanthan/protein complex microfragments in aqueous dispersion and having a solids content of 20.0 weight percent, based on the total weight of the dispersion. In preparing the new pie shell product, the following ingredients were utilized.

| Ingredients | Weight % |
|---|---|
| Flour, pastry | 54.00 |
| Salt | .50 |
| Dextrose | 1.50 |
| Microfragmented anisotropic xanthan/protein dispersion | 14.00 |
| Water (40° F.) | 16.00 |
| Shortening, all purpose | 14.00 |
| | 100.00 |

To produce the pie shell product, a N-50 Hobart mixer was used with a cutter paddle. The flour, dextrose, salt and microfragmented anisotropic xanthan/protein dispersion and shortening were placed in a bowl and dry blended. Mix with cutter blade in low was carried out until shortening is in very fine lumps. All water was incorporated and mixed to form an even mass which was then divided into 4 pieces. Each piece was rolled out to approximately ⅛" thick and laid over a 9" pie pan. Another pie pan was placed on top. Excess dough was cut off. Shells were baked in a reel oven at 400° F. for 10 minutes. Shells then turned upside down, bottom pan removed and baked another 10

The pie shell product was analyzed to have the following composition:

| | |
|---|---|
| Moisture | 13.64% |
| Fat | 20.41% |
| Aw (water activity) | .86 |
| pH | 5.43 |

The pie shell product had a dense, tough texture in comparison to a typical full fat pie shell. The pie shell product would have a reduction in calories and fat content compared to a typical control product.

EXAMPLE 45

Cookie Product

Cookie products include, but are not limited to drop cookies, wire-cut cookies, cutting machine cookies, rotary molded cookies and filled cookies.

A cookie product was prepared utilizing a microfragmented anisotropic xanthan/whey protein-egg white protein complex dispersion of the type described in Example containing the hydrated xanthan/protein complex microfragments in aqueous dispersion and having a solids content of 20.0 weight percent, based on the total weight of the dispersion. In preparing the new cookie product, the following ingredients were utilized:

| Ingredients | Weight % |
|---|---|
| Sugar | 29.00 |
| Salt | .50 |
| Baking Soda | .25 |
| Flavor | .25 |
| Shortening, all purpose | 15.00 |
| Microfragmented anisotropic xanthan/protein dispersion | 5.00 |
| Eggs | 10.00 |
| Flour, pastry | 40.00 |
| | 100.00 |

To produce the cookie product, the sugar, salt, baking soda, flavor, shortening and microfragmented anisotropic xanthan/protein dispersion were placed in a 5 quart bowl and mixed with a paddle on a N-50 Hobart mixer for 2 minutes on low. The eggs were added and mixed for 1 minute on low. The flour was added and mixed for 2 minutes on low.

The dough was rolled into tube-like dough pieces about 1" in diameter, ten gram pieces were cut off and placed on baking paper on a cookie baking pan. Cookies were baked at 420 F. for 8 minutes and then cooled.

The cookie product was analyzed to have the following composition:

| | |
|---|---|
| Moisture | 8.33% |
| Fat | 19.64% |
| Aw (water activity) | .52 |
| pH | 8.39 |

The cookie product had approximately the same spread diameter, a slightly darker bottom color and a more spongy, open grain texture than a typical full fat control product. The cookie products also had a reduction in calories and fat content compared to the typical control product.

EXAMPLE 46

Icing Product

Icing products include, but are not limited to, icings for baked products, "buttercream" icings, flat icings or any other glazings, frostings.

An icing product was prepared utilizing a microfragmented anisotropic xanthan/whey protein-egg white protein complex dispersion containing the hydrated xanthan/protein complex microfragments in aqueous dispersion and having a solids content of 20.0 weight percent, based on the total weight of the dispersion. In preparing the new icing product, the following ingredients were utilized:

| Ingredients | Weight % |
|---|---|
| Powdered sugar | 55.60 |
| Nonfat dry milk | 4.00 |
| Salt | .20 |
| Flavor | .20 |
| Microfragmented anisotropic xanthan/protein dispersion | 22.50 |
| Shortening, all purpose | 17.50 |
| | 100.00 |

To produce the icing product, the powdered sugar, dry milk and salt were dry blended in a 5 quart bowl on a N-50 Hobart mixer with paddle for 10 seconds on low. The flavor, shortening and microfragmented anisotropic xanthan/protein dispersion were added and mixed 1 minute on low, then 1 minute on 2nd speed to smooth the icing.

The icing product was analyzed to have the following composition:

| | |
|---|---|
| Moisture | 15.08% |
| Fat | 17.10% |
| Aw (water activity) | .7 |
| pH | 5.37 |

The icing product was similar, but softer in texture than a typical full fat icing. The icing product had a reduction in calories and fat content compared to the typical control

EXAMPLE 47

Filling-Topping Product

Filling-topping products for baked goods include, but are not limited to, crumb fillings, sugar/flour/fat fillings, creme or cream fillings, cheese fillings, fruit fillings, crumb toppings, sugar/fat/flour toppings, creme or cream toppings, cheese toppings and fruit toppings.

A filling-topping product was prepared utilizing a microfragmented anisotropic xanthan/whey protein-egg white protein complex dispersion containing the hydrated xanthan/protein complex microfragments in aqueous dispersion and having a solids content of 20.0 weight percent, based on the total weight of the dispersion. In preparing the filling-topping product, the following ingredients were utilized:

| Ingredients | Weight % |
|---|---|
| Sugar | 25.00 |
| Molasses | 4.00 |
| Salt | .50 |
| Shortening, all purpose | 12.50 |

-continued

| Ingredients | Weight % |
|---|---|
| Microfragmented anisotropic xanthan/protein dispersion | 12.50 |
| Flavor/spice | .50 |
| Flour pastry | 44.00 |
| Water | 1.00 |
| | 100.00 |

To produce the filling-topping product, the sugar, molasses, salt, shortening, flavor/spice and microfragmented anisotropic xanthan/protein dispersion were added to a 5 quart bowl and mixed for 2 minutes on low on a N-50 Hobart mixer with paddle. The flour and water were then added and mixed in for 30 seconds until a general incorporation had taken place suitable for a topping. Continued mixing and increased water content would result in a less viscous, smooth material suitable as a filling.

The filling-topping product was analyzed to have the following composition:

| Moisture | 15.78% |
|---|---|
| Fat | 11.33% |
| Aw (water activity) | .77 |
| pH | 5.28 |

The filling-topping product was drier and more dense than a typical filling-topping control product. The filling-topping product tended to spread and liquify more and seemed tougher than a control product when baked. The filling-topping product would also have a reduction in calories and fat content compared to the typical control product.

EXAMPLE 48

In order to determine the effects of coating of ionic polysaccharide/protein complexes with polysaccharides and lipids, an aqueous microfragmented dispersion of xanthan/egg white-whey protein concentrate complex of the type described in Example 3 was coated with a variety of gums and lipid components in a number of separate runs. In each run, the microfragmented xanthan/protein complex having a solids content of 8.48% weight percent was combined with water and the indicated gums, lipid or combination of gum and lipid to give a final concentration of 8.00% weight percent total solids in the aqueous dispersion:

Run 1) microfragmented xanthan/protein complex+iota carrageenan (10:1 weight ratio)

Run 2) microfragmented xanthan/protein complex+locust bean gum (10:1 weight ratio)

Run 3) microfragmented xanthan/protein complex+lecithin (5:1 weight ratio)

Run 4) microfragmented xanthan/protein complex+locust bean gum (10:0.67 weight ratio)+xanthan (10:0.33 Weight ratio)

Run 5) microfragmented xanthan/protein complex+xanthan (10:0.67 weight ratio)+iota carrageenan (10:0.33 weight ratio)

Run 6) microfragmented xanthan/protein complex+lecithin (25:1.4 weight ratio)+xanthan (25:1.1 weight ratio)

The weight ratio of microfragmented xanthan/protein complex solids to the respective gum and/or lipid coating agent for each of the above runs is given in parenthesis. To prepare the coated samples of each run, the gums were mixed with the microfragmented xanthan/protein complex by placing the microfragmented xanthan/protein complex in a blender and mixing while slowly adding the dry gum. Mixing was continued for 15 minutes to allow sufficient time for hydration of the gum. When lecithin was added, the mixing was done with a Tekmar homogenizer at approximatgely 100° F. The lecithin was added slowly to prevent clumping. The pH of all samples was adjusted to 4.0.

The mixture of the microfragmented xanthan/protein complex with the indicated gums and/or lecithin were evaluated by a panel trained in quantitative descriptive analysis. A control sample of the microfragmented xanthan/protein complex without coating agent(s), but diluted with water from 8.48 to 8 percent total solids content was also evaluated for comparison purposes. The point scale used was continuous and was scored using a full-scale value of 60 points. Differences in mean scores were evaluated by ANOVA followed by the Bonferroni test for multiple comparisons. A wide variety of attributes were evaluated by the panel, the following is a selection which illustrates some of the improvements made by coating the microfragmented xanthan/protein complex with gums and/or lecithin:

| | Wet Paper Odor weak→strong | Acid/Sour Flavor weak→strong | Chalky Flavor weak→strong | Astringent slightly→extremely |
|---|---|---|---|---|
| Control | 6.6 — | 16.2 — | 9.3 — | 6.7 a |
| Run 1 with Iota carrageenan | 2.8 b | 6.5 b | 1.4 a | 2.2 b |
| Run 2 with Locust bean gum | 7.1 | 16.3 | 8.8 | 5.0 |
| Run 3 with Lecithin | 4.9 | 21.7 | 2.3 a | 7.3 |
| Run 4 with Iota Carrageenan + Xanthan | 6.1 | 11.7 | 3.8 b | 2.8 c |
| Run 5 with Locust Bean Gum + Xanthan | 3.3 c | 10.4 | 5.3 | 4.3 |
| Run 6 with Lecithin + Xanthan | 4.2 | 11.3 | 3.0 b | 4.9 |

| | Initial Response | | Response after 3 Minutes | |
|---|---|---|---|---|
| | Chalky Mouthfeel slightly→extremely | Drying in the Mouth slightly→extremely | Astringent slightly→extremely | Drying in the Mouth slightly→extremely |
| Control | 12.0 — | 27.8 — | 3.2 — | 9.8 a |
| Iota Carrageenan | 1.6 a | 14.3 a | 1.8 b | 3.5 a |
| Locust Bean Gum | 1.8 a | 19.3 b | 1.4 a | 4.9 b |
| Lecithin | 3.8 a | 18.4 a | 1.8 b | 6.5 |
| I-Carrageenan + Xanthan | 2.1 a | 17.1 a | 1.4 a | 5.8 c |
| Locust Bean Gum + Xanthan | 3.1 a | 12.0 a | 1.6 a | 5.1 b |
| Lecithin + Xanthan | 3.3 a | 18.8 b | 2.3 c | 4.9 b |

The letters following the mean values for the various coated microfragmented xanthan/protein complexes indicate they are significantly different from the value for the microfragmented xanthan/protein complex control by the following level of significance: a (p<0.01), b (p<0.05), c (p<0.10). No letter indicates that there was no significant difference from the control.

It is noted that all of the coatings significantly reduced chalky mouthfeel, drying in the mouth and astringent aftertaste (3 minutes).

In order to provide data to determine whether coating the microfragmented xanthan/protein complex with a polysaccharide reduces drying mouthfeel at neutral pH as well as at acidic pH, the microfragmented xanthan/protein complex was adjusted to pH 6.5 with dilute sodium hydroxide and a portion was then coated with xanthan gum. In addition, another portion of the microfragmented xanthan/protein complex was coated with xanthan gum and part of this mixture was adjusted to pH 6.5 with dilute sodium hydroxide. The adjustment of pH was done by slow addition of 0.1M NaOH while mixing the microfragmented xanthan/protein complex rapidly. Xanthan was added slowly as a dry powder while mixing, and mixing was continued for 15 minutes to allow for hydration of the xanthan. The solids of all the mixtures was adjusted to about 4.5%, and the untreated microfragmented xanthan/protein complex was adjusted to pH 4.0 and 4.5% solids.

A research laboratory panel tasted the mixtures (including the untreated control) blind, in random order, and rated them on the characteristics of drying in the mouth, astringency and off-flavors on a scale from 0 to 7 (indicating none to severe). The mean scores for drying in the mouth were as follows:

|  | Mean Score | Significant Level of Difference | |
| --- | --- | --- | --- |
|  | Drying in the Mouth none >extreme | from uncoated xanthan/protein at pH 4 | from uncoated xanthan/protein at pH 6.5 |
| Uncoated, pH 4.0 | 5.5 | — | 0.10 |
| Uncoated, pH 6.5 | 2.8 | 0.10 | — |
| +xanthan, pH 4.0 | 2.2 | 0.05 | none |
| +xanthan → pH 6.5 | 1.7 | 0.01 | none |
| → pH 6.5 + xanthan | 1.2 | 0.01 | 0.05 |

While the present invention has been particularly described with respect to various embodiments, it will be appreciated that various modifications and adaptations may be made based on the present disclosure, which are regarded to be within the spirit and scope of the present invention.

Various of the features of the invention are set forth in the following claims.

We claim:

1. A method for producing a microfragmented anisotropic xanthan/protein complex dispersion comprising the steps of forming an aqueous suspension of molecularly intimately complexed xanthan/protein fibers comprising at least 7 weight percent of xanthan gum based on the total solids weight of said fibers,
   conducting said aqueous fiber suspension through a zone of high shear to fragment the fibers under sufficient conditions of shear and duration to reduce substantially all of said fibers to xanthan/protein complex microfragments having a maximum dimension of less than about 15 microns.

2. A method in accordance with claim 1 wherein said fiber suspension comprises from about 1 to about 10% by weight of said xanthan/protein complex fibers.

3. A method in accordance with claim 1 wherein the microfragment dispersion is concentrated by centrifugation at a pH substantially approximating the isoelectric point of the fibrous complex.

4. A method in accordance with claim 1 wherein said microfragmented dispersion is concentrated by evaporation of at least a portion of the aqueous phase.

5. A method in accordance with claim 1 wherein said xanthan/protein fibers are heated to stabilize substantially all of said xanthan/protein complex.

6. A method for producing microfragmented ionic polysaccharide/protein complex dispersions comprising the steps of forming an aqueous suspension of a syneresed molecularly intimately entangled complexed ionic polysaccharide/protein complex precipitate, conducting said syneresed complex suspension through a zone of high shear to fragment the complex under sufficient conditions of shear and duration to reduce substantially all of said complex to ionic polysaccharide/protein complex microfragments having a maximum dimension of less than about 15 microns.

7. A method for producing a microfragmented ionic polysaccharide/protein complex dispersion in accordance with claim 6 wherein said dispersion is an anisotropic carboxymethyl cellulose/protein complex dispersion comprising the steps of forming an aqueous suspension of molecularly intimately complexed carboxymethyl cellulose/protein fibers comprising at least 10 weight percent of carboxymethyl cellulose gum based on the total solids weight of said fibers, conducting said aqueous fiber suspension through a zone of high shear to fragment the fibers under sufficient conditions of shear and duration to reduce substantially all of said fibers to carboxymethyl cellulose/protein complex microfragments having a maximum dimension of less than about 15 microns.

8. A method in accordance with claim 7 wherein said fiber suspension comprises from about 1 to about 10% by weight of said carboxymethyl cellulose/protein complex fibers, wherein said carboxymethyl cellulose/protein fibers are heated to stabilize substantially all of said carboxymethyl cellulose/protein complex, and wherein the microfragment dispersion is concentrated by centrifugation at a pH substantially approximating the isoelectric point of the fibrous complex, or by evaporation of at least a portion of the aqueous phase.

9. A method for producing a microfragmented ionic polysaccharide/protein complex dispersion in accordance with claim 6 wherein said dispersion is an anisotropic carrageenan/protein complex dispersion comprising the steps of forming an aqueous suspension of molecularly intimately complexed carrageenan/protein fibers comprising at least 10 weight percent of carrageenan based on the total solids weight of said fibers, conducting said aqueous fiber suspension through a zone of high shear to fragment the fibers under sufficient conditions of shear and duration to reduce substantially all of said fibers to carrageenan/protein complex microfragments having a maximum dimension of less than about 15 microns.

10. A method in accordance with claim 9 wherein said fiber suspension comprises from about 1 to about 10% by weight of said carrageenan/protein complex fibers, wherein said carrageenan/protein fibers are heated to stabilize substantially all of said carrageenan/- protein complex, and wherein the microfragment dispersion is concentrated by centrifugation at a pH substantially approximating the isoelectric point of the fibrous complex or by evaporation of at least a portion of the aqueous phase.

11. A method in accordance with claim 6 wherein said complex suspension comprises from about 1 to about 10% by weight of said ionic polysaccharide/protein complex fibers.

12. A method in accordance with claim 6 wherein the microfragmented dispersion is concentrated by centrifugation at a pH of less than about 4.5.

13. A method in accordance with claim 6 wherein the microfragment dispersion is concentrated by centrifugation at a pH substantially approximating the isoelectric point of the complex.

14. A method in accordance with claim 6 wherein said centrifugation concentration is enhanced by providing an effective concentration of one or more edible polyvalent cations in said aqueous dispersion.

15. A method in accordance with claim 6 wherein said microfragment dispersion is concentrated by evaporation of at least a portion of the aqueous phase by thin film swept surface evaporation under subatmospheric conditions.

16. A method in accordance with claim 6 wherein said ionic polysaccharide/protein complex is heated to stabilize substantially all of said ionic polysaccharide/protein complex.

17. A method in accordance with claim 6 wherein said microfragments are coated, at least in part, with calcium alginate, or calcium pectinate.

18. A method in accordance with claim 6 wherein said complex is a thermoreversible gel of kappa carrageenan and gelatin.

19. A method in accordance with claim 7 wherein said protein is partially protease-hydrolysed.

20. A method for preparing a smooth, creamy dispersion of ionic polysaccharide/protein complex particles of very small size comprising the steps of forming an aqueous complex generating solution of a solubilized protein component and a complexing ionic polysacchride component for the protein component, comprising from about 1 to about 30 weight percent solids based on the toal weight of the solution, providing a hydrophobic working liquid which is immiscible with the aqueous complex generating solution, forming a water-in-oil liquid emulsion of the aqueous-complex-generating solution in the hydrophobic working liquid, adjusting the pH of the emulsified aqueous complex-generating solution emulsified in the hydrophobic working liquid to form precipitated complex particles in the emulsified aqueous phase and separating the precipitated complex particles from the hydrophobic liquid to provide a polysaccharide/protein complex having a very small particle size.

21. A method for manufacturing edible lambda carrageenan/protein complex fibers comprising the steps of providing an aqueous fiber generating solution comprising a solubilized edible protein component and a solubilized lambda carrageenan component, the weight ratio of said carrageenan to said protein component being in the range of from about 1:2 to about 1:15 and wherein the total weight of said solubilized edible protein component and said solubilized lambda carrageenan component is in the range of from about 0.1 to about 8 weight percent, based on the total weight of said aqueous fiber generating solution, adjusting the pH of the fiber generating solution to the isoelectric point of an insoluble lambda carrageenan/protein complex while mixing said fiber generating solution to precipitate carrageenan/protein complex fibers and provide a whey solution, and separating the fibers from the whey solution.

22. A method for manufacturing edible carboxymethyl cellulose/protein complex fibers comprising the steps of providing an aqueous fiber generating solution comprising a solubilized edible protein component and a solubilized carboxymethyl cellulose component having a degree of substitution of about 0.9, the weight ratio of said carboxymethyl cellulose component to said protein component being in the range of from about 1:2 to about 1:15 and wherein the total weight of said solubilized edible protein component and said solubilized carboxymehtyl cellulose component is in the range of from about 0.1 to about 8 weight percent, based on the total weight of said aqueous fiber generating solution, adjusting the pH of the fiber generating solution to the isoelectric point of an insoluble carboxymethyl cellulose/protein complex while mixing said fiber generating solution to precipitate carboxymethyl cellulose/protein complex fibers and provide a whey solution, and separating the fibers from the whey solution.

23. An aqueous, microfragmented ionic polysaccharide/protein complex dispersion comprising from about 1 to about 50 weight percent of an insolubilized, hydrated, microfragmented ionic polysaccharide/protein complex discontinuous phase dispersed throughout a continuous aqueous phase, said discontinuous microfragmented ionic polysaccharide/protein complex phase comprising irregularly shaped microfragments of a hydrated complex having an ionic polysaccharide to protein weight ratio in the range of from about 2:1 to about 1:15, said ionic polysaccharide/protein microfragments having a particle size distribution such that substantially all of said microfragments have a maximum dimension of less than about 15 microns.

24. A microfragmented ionic polysaccharide/protein complex dispersion in accordance with claim 23 wherein said complex is a syneresed, molecularly intimately entangled interaction product of an ionic polysaccharide and a protein.

25. A microfragmented ionic polysaccharide/protein complex dispersion in accordance with claim 24 wherein said ionic polysaccharide is xanthan, carboxy methyl cellulose, carrageenan, gellan, chitosan, pectin, alginate or mixture thereof, and wherein at least about 90 percent by weight of hydrated microfragments of the aqueous dispersion have a volume of less than $5 \times 10^{10}$ cubic centimeters and have a maximum linear dimension of about 7 microns.

26. A microfragmented syneresed ionic polysaccharide/protein complex dispersion in accordance with claim 24 comprising microfragments having a mean maximum dimension in the range of from about 2 to about 10 microns.

27. A microfragmented syneresed ionic polysaccharide/protein complex dispersion in accordance with claim 24 wherein said ionic polysaccharide/protein complex is a whey protein complex.

28. A microfragmented ionic polysaccharide/protein complex dispersion in accordance with claim 23 wherein said ionic polysaccharide/protein complex is an ionic polysaccharide/egg albumen complex.

29. A microfragmented ionic polysaccharide/protein complex dispersion in accordance with claim 23 wherein said ionic polysaccharide/protein fibers are heated to stabilize substantially all of said ionic polysaccharide/protein complex.

30. An aqueous, microfragmented anisotropic xanthan/protein complex dispersion comprising from about 1 to about 50 weight percent of an insolubilized, hydrated, microfragmented anisotropic xanthan/protein discontinuous phase dispersed throughout a continuous aqueous phase, said discontinuous microfragmented xanthan/protein complex phase comprising irregularly shaped microfragments of an anisotropic hydrated complex having a xanthan to protein weight ratio in the range of from about 2:1 to about 1:15, said xanthan/protein microfragments having a particle size distribution such that substantially all of said microfragments have a maximum dimension of less than about 15 microns.

31. A microfragmented anisotropic xanthan/protein complex dispersion in accordance with claim 30 wherein said complex is a molecularly intimate interaction product of said xanthan and said protein.

32. A microfragmented anisotropic xanthan/protein complex dispersion in accordance with claim 30 wherein at least about 90 percent by weight of hydrated microfragments of the aqueous dispersion have a volume of less than $5 \times 10^{10}$ cubic centimeters and have a maximum linear dimension of about 7 microns.

33. A microfragmented anisotropic xanthan/protein complex dispersion in accordance with claim 30 comprising microfragments having a mean maximum dimension in the range of from about 2 to about 10 microns.

34. A microfragmented anisotropic xanthan/protein complex dispersion in accordance with claim 30 wherein said xanthan/protein complex is a whey protein complex.

35. A microfragmented anisotropic xanthan/protein complex dispersion in accordance with claim 30 wherein said xanthan/protein complex is a xanthan/egg albumen complex.

36. A method in accordance with claim 30 wherein said xanthan/protein fibers are heated to stabilize substantially all of said xanthan/protein complex.

37. A frozen dessert composition comprising from about 0 to about 10 percent edible fat, from about 1 to about 10 percent microfragmented xanthan/protein complex dispersion like that of claim 30, from about 1 to about 9 percent by weight of protein, from about 10 to about 30 percent by weight of a saccharide component, and from about 45 percent to about 85 percent water in homogenized, frozen form.

38. A frozen dessert composition in accordance with claim 37 wherein said fat component comprises from about 2 to about 5 weight percent fat frozen dessert composition.

39. A food dressing comprising from about 0.25 to about 30 percent by weight of a microfragmented xanthan/protein complex dispersion like that of claim 30, from about 0 to about 50 percent by weight of edible oil or fat, from about 20 to about 96 percent by weight water.

40. An aqueous, microfragmented anisotropic carboxymethyl cellulose/protein complex dispersion comprising from about 1 to about 50 weight percent of an insolubilized, hydrated, microfragmented anisotropic carboxymethyl cellulose/protein discontinuous phase dispersed throughout a continuous aqueous phase, said discontinuous microfragmented carboxymethyl cellulose/protein complex phase comprising irregularly shaped microfragments of an anisotropic hydrated complex having a carboxymethyl cellulose to protein weight ratio in the range of from about 2:1 to about 1:15, said carboxymethyl cellulose/protein microfragments having a particle size distribution such that substantially all of said microfragments have a maximum dimension of less than about 15 microns, and wherein at least about 90 percent by weight of hydrated microfragments of the aqueous dispersion have a volume of less than $5 \times 10^{10}$ cubic centimeters and have a maximum linear dimension of less than about 7 microns.

41. A microfragmented anisotropic carboxymethyl cellulose/protein complex dispersion in accordance with claim 20 comprising microfragments having a mean maximum dimension in the range of from about 2 to about 10 microns.

42. A frozen dessert composition comprising from about 10 percent edible fat, from about 1 to about 10 percent microfragmented carboxymethyl cellulose/protein complex dispersion or carrageenan/protein complex dispersion, from about 1 to about 9 percent by weight of protein, from about 10 to about 30 percent by weight of a saccharide component, and from about 45 percent to about 85 percent water.

43. A frozen dessert composition in accordance with claim 42 wherein said fat component comprises from about 2 to about 5 weight percent fat frozen dessert composition.

44. A food dressing comprising from about 0.25 to about 30 percent by weight of a microfragmented carboxymethyl cellulose/protein complex dispersion or carrageenan/protein complex dispersion, from about 0 to about 50 percent by weight of edible oil or fat, and from about 20 to about 96 percent by weight water.

45. A food dressing comprising from about 0.25 to about 30 percent by weight of a microfragmented ionic polysaccharide/protein complex dispersion like that of claim 42, from about 0 to about 50 percent by weight of edible oil or fat, and from about 20 to about 96 percent by weight water.

46. A microfragmented ionic polysaccharide/protein complex dispersion in accordance with claim 23 wherein said microfragments are coated, at least in part, with calcium alginate or a calcium pectinate.

47. A microfragmented ionic polysaccharide/protein complex dispersion in accordance with claim 23 wherein said microfragments are coated with stearoyl lactylate, mono- or diglycerides, lecithin, ionic gum, neutral gum or mixtures thereof for reducing astringency.

48. A method in accordance with claim 1 further comprising the step of combining said xanthan/protein complex microfragments in aqueous dispersion with from about 5 to about 20 weight percent of ionic or neutral gum or mixtures thereof, based on the total solids weight of said xanthan/protein complex microfragments.

49. A method in accordance with claim 48 wherein said gum or gum mixtures are xanthan gum, carboxymethyl cellulose, carrageenan, alginate, locust bean gum, guar gum and mixtures thereof.

50. A method in accordance with claim 6 further comprising the step of combining said ionic polysaccharide/protein complex microfragments in aqueous dispersion with from about 5 to about 20 weight percent of ionic or neutral gum or mixtures thereof, based on the total solids weight of said ionic polysaccharide/protein complex microfragments.

51. A method in accordance with claim 50 wherein said gum or gum mixtures are xanthan gum, carboxymethyl cellulose, carrageenan, alginate, locust bean gum, guar gum and mixtures thereof.

52. A method in accordance with claim 6 wherein said conducting of said complex suspension through a zone of high shear to fragment the complex is carried out by conducting the complex suspension through a very short high pressure to velocity conversion zone having a length of less than about 2 millimeters with a pressure drop across said conversion zone of at least about 10,000 psi, and impacting said complex suspension, after passage through said conversion zone, against a hard surface positioned at a distance of less than about 4 millimeters downstream from said conversion zone.

53. A method in accordance with claim 52 wherein the velocity of said complex suspension at said zone of highest velocity is at least about 1000 feet per second and wherein said zone of highest velocity is provided by a cylindrical knife edge homogenizer head forming a cylindrical pressure to velocity conversion zone less than about 1 millimeters in length along the flow-direction, surrounded by a cylindrical impact ring spaced less than about 3 millimeters from said cylindrical pressure to velocity Conversion zone.

54. A processed comminuted meat product comprising from about 5 to about 16 weight percent of meat or vegetable protein, from about 0 to about 25 weight percent animal or vegetable fat, from about 2 to about 30 weight percent of a microfragmented ionic polysaccharide/protein complex, and from about 35 to about 75 weiqht percent water, based on the total weight of said comminuted meat product.

55. A baked sweet dough product having reduced shortening content, comprising a product baked from a sweet dough comprising from about 15 to about 60 percent flour, from about 1 to about 3 percent yeast, from about 10 to about 15 to about 40 percent water, from a bout 3.5 to about 15 percent of a sugar, or mixture of sugars, and from about 1 to about 10 percent by weight of a microfragmented ionic polysaccharide/protein complex dispersion, less than about 5 weight percent of triglycerides, and having a water activity of greater than 0.9.

* * * * *

UNITED STATES PATENT AND TRADEMARK OFFICE
CERTIFICATE OF CORRECTION

| | | |
|---|---|---|
| PATENT NO. | : 5,104,674 | Page 1 of 1 |
| APPLICATION NO. | : 07/548950 | |
| DATED | : April 14, 1992 | |
| INVENTOR(S) | : Chen et al. | |

It is certified that error appears in the above-identified patent and that said Letters Patent is hereby corrected as shown below:

- On title page, under (75) Inventors:, change "Wehn-Sherng Chen" to - - Wen-Sherng Chen - -.

Signed and Sealed this

Twelfth Day of September, 2006

JON W. DUDAS
*Director of the United States Patent and Trademark Office*